(12) United States Patent
Orlowski

(10) Patent No.: US 12,200,298 B2
(45) Date of Patent: Jan. 14, 2025

(54) MEASURING VIDEO-PROGRAM VIEWING

(71) Applicant: COMCAST CABLE COMMUNICATIONS, LLC, Philadelphia, PA (US)

(72) Inventor: Robert Alan Orlowski, Centennial, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 14/020,778

(22) Filed: Sep. 6, 2013

(65) Prior Publication Data
US 2018/0146242 A1  May 24, 2018

(51) Int. Cl.
*H04N 21/442* (2011.01)
*H04N 21/24* (2011.01)
(Continued)

(52) U.S. Cl.
CPC ....... *H04N 21/442* (2013.01); *H04N 21/2408* (2013.01); *H04N 21/252* (2013.01);
(Continued)

(58) Field of Classification Search
CPC ....... H04N 21/44222; H04N 21/44204; H04N 21/6582; H04N 21/4532; H04N 21/812;
(Continued)

(56) References Cited

U.S. PATENT DOCUMENTS 5,374,951 A    12/1994  Welsh
5,589,892 A *  12/1996  Knee ....................... A63F 13/12
                                              348/E7.071

(Continued)

FOREIGN PATENT DOCUMENTS

CN    102236867 A    11/2011
EP     1995878 A2    11/2008
(Continued)

OTHER PUBLICATIONS

Tim Brooks, Stu Gray, Jim Dennison "The State Of Set-Top Box Viewing Data as of Dec. 2009" STB Committee of the Council for Research Excellence. Research Report Feb. 24, 2010 .
(Continued)

*Primary Examiner* — An Son P Huynh
(74) *Attorney, Agent, or Firm* — Banner & Witcoff, Ltd.

(57) ABSTRACT

A computer-implemented method of using video program viewing activity data as input to an aggregation engine built on the Hadoop MapReduce framework which calculates second-by-second video viewing activity for Linear, DVR, and VOD program level viewing including measuring trick play activity with results aggregated to the analyst's choice of program, program airing, channel, house attributes, device attributes, geographic area, demographic attributes, viewing date, or any combination of these fields, for each second of program content represented in the video program viewing data. The source data may be extracted from a database defined according to the Cable Television Laboratories, Inc. Media Measurement Data Model defined in "Audience Data Measurement Specification" as "Open-Cable™ Specifications, Audience Measurement, Audience Measurement Data Specification" document OC-SP-AMD-I01-130502 or any similar format. These metrics provide detailed data needed to calculate information on customer viewing behavior that can drive business decisions for service providers, advertisers, and content producers.

22 Claims, 44 Drawing Sheets

(51) Int. Cl.
  *H04N 21/25* (2011.01)
  *H04N 21/258* (2011.01)
  *H04N 21/466* (2011.01)
  *H04N 21/658* (2011.01)
  *H04N 21/845* (2011.01)

(52) U.S. Cl.
  CPC ............... *H04N 21/25883* (2013.01); *H04N 21/44226* (2020.08); *H04N 21/4667* (2013.01); *H04N 21/6582* (2013.01); *H04N 21/8456* (2013.01)

(58) Field of Classification Search
  CPC ............ H04N 21/25891; H04H 60/46; H04H 60/33; H04H 60/45
  See application file for complete search history.

(56) References Cited

U.S. PATENT DOCUMENTS

| | | |
|---|---|---|
| 5,790,935 A | 8/1998 | Payton |
| 5,872,588 A | 2/1999 | Aras et al. |
| 6,286,005 B1 | 9/2001 | Cannon |
| 6,449,350 B1 | 9/2002 | Cox |
| 6,820,277 B1 | 11/2004 | Eldering et al. |
| 7,383,243 B2 | 6/2008 | Conkwright et al. |
| 7,490,045 B1 | 2/2009 | Flores et al. |
| 7,509,663 B2 | 3/2009 | Maynard et al. |
| 7,590,993 B1 | 9/2009 | Hendricks et al. |
| 7,614,064 B2 | 11/2009 | Zigmond |
| 7,729,940 B2 | 6/2010 | Harvey et al. |
| 7,930,391 B1 | 4/2011 | Holt |
| 8,001,561 B2 | 8/2011 | Gibbs et al. |
| 8,079,054 B1* | 12/2011 | Dhawan ............... H04N 21/812 705/14.6 |
| 8,108,886 B1* | 1/2012 | Murahashi ........... H04N 21/812 725/9 |
| 8,214,867 B2 | 7/2012 | Hudspeth |
| 8,280,996 B2 | 10/2012 | Lu et al. |
| 8,351,645 B2 | 1/2013 | Srinivasan |
| 8,352,984 B2 | 1/2013 | Gogoi et al. |
| 8,365,212 B1* | 1/2013 | Orlowski ............... H04H 60/33 725/15 |
| 8,365,213 B1* | 1/2013 | Orlowski ............ G06Q 30/0251 725/15 |
| 8,453,173 B1 | 5/2013 | Anderson et al. |
| 8,548,991 B1 | 10/2013 | Zamir et al. |
| 8,694,396 B1 | 4/2014 | Craner et al. |
| 8,739,197 B1 | 5/2014 | Pecjak et al. |
| 8,745,647 B1 | 6/2014 | Shin et al. |
| 8,924,993 B1 | 12/2014 | Niebles Duque et al. |
| 8,949,873 B1* | 2/2015 | Bayer ............... H04N 21/44222 725/14 |
| 8,959,540 B1 | 2/2015 | Gargi et al. |
| 9,277,275 B1 | 3/2016 | Arini |
| 9,363,464 B2* | 6/2016 | Alexander ....... H04N 21/44213 |
| 9,420,320 B2* | 8/2016 | Doe ...................... H04H 60/66 |
| 2002/0055854 A1 | 5/2002 | Kurauchi et al. |
| 2002/0056087 A1* | 5/2002 | Berezowski ..... H04N 21/25891 348/E7.071 |
| 2002/0059576 A1 | 5/2002 | Feininger et al. |
| 2002/0062393 A1 | 5/2002 | Borger et al. |
| 2002/0083451 A1 | 6/2002 | Gill et al. |
| 2002/0104083 A1 | 8/2002 | Hendricks et al. |
| 2002/0129368 A1 | 9/2002 | Schlack et al. |
| 2002/0144262 A1* | 10/2002 | Plotnick ............... H04N 21/812 348/E7.071 |
| 2002/0194196 A1 | 12/2002 | Weinberg et al. |
| 2003/0020744 A1* | 1/2003 | Ellis ................ H04N 21/26283 348/E7.063 |
| 2003/0046696 A1 | 3/2003 | Mizuno et al. |
| 2003/0088715 A1 | 5/2003 | Chaudhuri et al. |
| 2003/0115585 A1 | 6/2003 | Barsness et al. |
| 2003/0145323 A1 | 7/2003 | Hendricks et al. |
| 2003/0149988 A1* | 8/2003 | Ellis .................... H04N 21/262 725/62 |
| 2003/0172374 A1 | 9/2003 | Vinson et al. |
| 2003/0174160 A1 | 9/2003 | Deutscher et al. |
| 2003/0237095 A1* | 12/2003 | Srinivas ................ H04H 60/46 725/46 |
| 2004/0019899 A1 | 1/2004 | Pelletier |
| 2004/0215698 A1 | 10/2004 | Bertin |
| 2004/0268226 A1 | 12/2004 | McMullin |
| 2005/0060745 A1 | 3/2005 | Riedl et al. |
| 2005/0086110 A1 | 4/2005 | Haley et al. |
| 2005/0149964 A1* | 7/2005 | Thomas ........... H04N 21/47211 348/E7.071 |
| 2005/0204387 A1* | 9/2005 | Knudson ............ H04N 7/17327 348/E7.071 |
| 2005/0229199 A1 | 10/2005 | Yabe |
| 2005/0235307 A1 | 10/2005 | Relan et al. |
| 2005/0286860 A1 | 12/2005 | Conklin |
| 2006/0015891 A1 | 1/2006 | Lazzaro et al. |
| 2006/0075420 A1 | 4/2006 | Ludvig et al. |
| 2006/0075421 A1 | 4/2006 | Roberts et al. |
| 2006/0168609 A1 | 7/2006 | Chen |
| 2006/0184961 A1 | 8/2006 | Lee et al. |
| 2006/0223495 A1 | 10/2006 | Cassett et al. |
| 2007/0067794 A1* | 3/2007 | Russell et al. .................. 725/25 |
| 2007/0074258 A1 | 3/2007 | Wood et al. |
| 2007/0092204 A1* | 4/2007 | Wagner ................. H04N 5/782 386/241 |
| 2007/0124756 A1 | 5/2007 | Covell et al. |
| 2007/0136753 A1* | 6/2007 | Bovenschulte ....... H04N 21/422 348/E7.071 |
| 2007/0157249 A1 | 7/2007 | Cordray et al. |
| 2007/0157260 A1* | 7/2007 | Walker ............. H04N 21/47214 725/86 |
| 2007/0186228 A1* | 8/2007 | Ramaswamy ......... H04H 60/37 725/14 |
| 2007/0214483 A1 | 9/2007 | Bou-Abboud |
| 2007/0271300 A1 | 11/2007 | Ramaswamy |
| 2007/0283409 A1 | 12/2007 | Golden |
| 2007/0288950 A1 | 12/2007 | Downey et al. |
| 2008/0077951 A1 | 3/2008 | Maggio et al. |
| 2008/0127252 A1 | 5/2008 | Eldering et al. |
| 2008/0300965 A1 | 12/2008 | Doe |
| 2009/0007171 A1 | 1/2009 | Casey et al. |
| 2009/0052864 A1* | 2/2009 | Ohde .................. H04N 5/44543 386/298 |
| 2009/0070798 A1 | 3/2009 | Lee et al. |
| 2009/0077577 A1 | 3/2009 | Allegrezza et al. |
| 2009/0077579 A1 | 3/2009 | Li et al. |
| 2009/0094630 A1* | 4/2009 | Brown ............................ 725/12 |
| 2009/0100456 A1 | 4/2009 | Hughes |
| 2009/0133614 A1* | 5/2009 | Lee et al. ....................... 725/10 |
| 2009/0150224 A1 | 6/2009 | Lu et al. |
| 2009/0150814 A1 | 6/2009 | Eyer et al. |
| 2009/0172725 A1 | 7/2009 | Heilbron et al. |
| 2009/0183210 A1* | 7/2009 | Andrade ........... H04N 21/44204 725/87 |
| 2009/0193460 A1 | 7/2009 | Barnett |
| 2009/0268905 A1 | 10/2009 | Matsushima et al. |
| 2009/0313232 A1* | 12/2009 | Tinsley et al. ..................... 707/5 |
| 2009/0327208 A1 | 12/2009 | Bittner et al. |
| 2010/0043021 A1 | 2/2010 | Torsiello et al. |
| 2010/0088716 A1 | 4/2010 | Ellanti et al. |
| 2010/0145791 A1 | 6/2010 | Canning et al. |
| 2010/0161492 A1 | 6/2010 | Harvey et al. |
| 2010/0169911 A1* | 7/2010 | Zhang .................... H04H 60/59 725/19 |
| 2010/0211439 A1 | 8/2010 | Marci et al. |
| 2010/0235852 A1 | 9/2010 | Mears |
| 2010/0262986 A1* | 10/2010 | Adimatyam ....... H04N 21/8405 725/9 |
| 2010/0330954 A1 | 12/2010 | Manning Cassett et al. |
| 2011/0069940 A1* | 3/2011 | Shimy .................. G11B 27/105 386/296 |
| 2011/0072448 A1 | 3/2011 | Stiers et al. |
| 2011/0110515 A1 | 5/2011 | Tidwell et al. |
| 2011/0126241 A1 | 5/2011 | Beattie, Jr. et al. |

(56) References Cited

U.S. PATENT DOCUMENTS

| | | | |
|---|---|---|---|
| 2011/0145847 A1* | 6/2011 | Barve | H04H 60/64 725/9 |
| 2011/0289524 A1 | 11/2011 | Toner et al. | |
| 2011/0307913 A1 | 12/2011 | Wang et al. | |
| 2011/0321077 A1 | 12/2011 | Wang et al. | |
| 2012/0005527 A1* | 1/2012 | Engel et al. | 714/15 |
| 2012/0079518 A1 | 3/2012 | Wan et al. | |
| 2012/0151511 A1* | 6/2012 | Bernard | H04H 60/37 725/10 |
| 2012/0191815 A1* | 7/2012 | Tabbal | G06Q 30/0269 709/218 |
| 2012/0222058 A1* | 8/2012 | el Kaliouby et al. | 725/10 |
| 2012/0240143 A1* | 9/2012 | Mathews | 725/14 |
| 2012/0254911 A1* | 10/2012 | Doe | H04H 60/31 725/14 |
| 2012/0260278 A1 | 10/2012 | Lambert et al. | |
| 2012/0278161 A1 | 11/2012 | Lazzaro | |
| 2012/0278179 A1* | 11/2012 | Campbell | G06Q 30/0255 705/14.69 |
| 2012/0278828 A1* | 11/2012 | Yazdani | H04H 60/39 725/19 |
| 2012/0296909 A1 | 11/2012 | Cao et al. | |
| 2012/0304210 A1 | 11/2012 | Zaslavsky et al. | |
| 2012/0304211 A1 | 11/2012 | Berezowski et al. | |
| 2013/0007789 A1 | 1/2013 | Wang et al. | |
| 2013/0024901 A1 | 1/2013 | Sharif-Ahmadi et al. | |
| 2013/0124309 A1 | 5/2013 | Traasdahl et al. | |
| 2013/0145385 A1* | 6/2013 | Aghajanyan et al. | 725/10 |
| 2013/0173765 A1* | 7/2013 | Korbecki | H04N 21/42209 709/221 |
| 2013/0198125 A1 | 8/2013 | Oliver et al. | |
| 2013/0254787 A1 | 9/2013 | Cox et al. | |
| 2013/0283304 A1 | 10/2013 | Wan et al. | |
| 2014/0075465 A1* | 3/2014 | Petrovic | H04N 21/4223 725/14 |
| 2014/0109124 A1 | 4/2014 | Morales et al. | |
| 2014/0150005 A1* | 5/2014 | Kalmes et al. | 725/14 |
| 2014/0181019 A1 | 6/2014 | Bajaria et al. | |
| 2014/0351835 A1* | 11/2014 | Orlowski | H04N 21/4532 725/9 |
| 2014/0359649 A1 | 12/2014 | Cronk et al. | |
| 2015/0113153 A1 | 4/2015 | Lin | |
| 2015/0128162 A1 | 5/2015 | Ionescu | |
| 2019/0058917 A1* | 2/2019 | Orlowski | H04N 21/252 |

FOREIGN PATENT DOCUMENTS

| | | |
|---|---|---|
| WO | 98/31114 A1 | 7/1998 |
| WO | 2012162693 A1 | 11/2012 |
| WO | 2013033123 A2 | 3/2013 |

OTHER PUBLICATIONS

FourthWall Media Product information from web page MassiveDataTM http://www.fourthwallmedia.tv Oct. 18, 2013.

RENTRAK Corporation Reaching Your Target Audience Using Viewership Segments Rentrak Case Studies http://rentrak.com/downloads/Viewership_Segment_Case_Study.pdf Oct. 18, 2013.

RENTRAK Corporation Reaching Your Target Audience Using Comercial Ratings and Pod Analysis Rentrak Case Studies http://www.rentrak.com/downloads/Commercial_and_Pod_Analysis_Case_Study.pdf Oct. 18, 2013.

RENTRAK Corporation Rentrak Overview: Exact Commercial Ratings® http://www.rentrak.com/downloads/Exact_Commercial_Ratings_Presentation.pdf Jan. 22, 2013 p. 1-30.

Extended European Search Report—EP 14183827.6—Mailing date: Oct. 23, 2014.

Welch T A: "A Technique for High-Performance Data Compression", Computer. IEEE. US, vol. 17. No. 6. Jun. 1, 1984 (Jun. 1, 1984), XP000673349.

Extended European Search Report, EP Application 14186382.9, Dated Feb. 4, 2015.

Extended European Search Report—EP 14182927.5—Mailing date: Dec. 16, 2014.

Cisco Systems, Inc., "Channel Viewership Analyzer", Web page: http://www.cisco.com/en/US/prod/collateral/video/ps9119/ps9883/7016867.pdf, pp. 1-2 File: CISCO-ChannelViewershipAnalyzer.pdf.

Ineoquest Technologies, Inc., "Switched Digital Video Solutions", http://www.ineoquest.com/switched-digital-video-solutions, Dec. 28, 2010, pp. 1-2 File: IneoQuest-Switched-Digital-Video-Solutions.pdf.

Motorola, Inc., Solutions Paper, "Implementing Switched Digital Video Solutions" http://www.motorola.com/staticfiles/Business/Products/_Documents/_Static%20files/SDV%20Implementation%20Solutions%20paper%20-555998-001-a.pdf?localeId=33, Copyright 2008, p. 6 File: Motorola-SDV_Implementation_Solutions_paper_-555998-001-a.pdf.

Strickland, Jonathan, "How Switched Digital Video Works", Nov. 20, 2007. HowStuffWorks.com. < http://electronics.howstuffworks.com/switched-digital-video.htm>, pp. 1-4 File: HowSwitched-DigitalVideoWorks.pdf.

RENTRAK Corporation, Television, TV Essentials, Web source: http://www.rentrak.com/section/media/tv/linear.html, Feb. 1, 2011, p. 1.

Wayne Friedman, Rentrak's 'Stickiness' Mines TV Value On Granular Level , MediaPost, Jan. 27, 2010, p. 1 of attached file Web source: http://www.tvb.org/media/file/TVB_Measurement_Rentraks_Stickiness_Mines_TV_Value_on_Granular_Level_1-27-10.pdf File: Rentraks_Stickiness_Mines_TV_Value_on_Granular_Level_1-27-10.pdf.

Cisco Systems, Inc., "Network Efficiency with Switched Digital", Web page: http://www.cisco.com/en/US/products/ps9258/index.html, accessed Oct. 13, 2014, 2 pages.

Cisco Systems, Inc., "Access Viewership Data, Monitor Performance", Web page: http://www.cisco.com/en/US/products/ps9122/index.html, accessed May 20, 2013, 1 page.

Response to European Search Report—EP Appl. 14182927.5—submitted Sep. 4, 2015.

Response to European Search Report—EP 14183827.6—Dated Sep. 10, 2015.

Response to EP Search Report—EP 14186382.9—Dated Sep. 29, 2015.

EP Office Action—EP App 14182927.5—Mailed Mar. 31, 2016.

Konstantin Shvachko et al.: "The Hadoop Distributed File System", Mass Storage Systems and Technologies (MSST), 2010 IEEE 26th Symposium On, IEEE, Piscataway, NJ, USA, May 3, 2010 (May 3, 2010), pp. 1-10, XP031698650, ISBN: 978-1-4244-7152-2.

Anonymous: "Apache Hadoop", Sep. 5, 2013 (Sep. 5, 2013), XP055394634, Retrieved from the Internet: URL: https://en.wikipedia.org/w/index.php?title=Apache_Hadoop&oldid=571641303 [retrieved on Jul. 28, 2017].

Aug. 4, 2017—(EP) Office Action—App No. 14183827.6.

May 2, 20182—European Office Action—EP 14183827.6.

Mark Landler, Digital TV Converter Boxes to Expand Cable Offerings, 1996, The New York Times.

Jan. 12, 2021—Canadian Office Action—CA 2,860,802.

Jan. 13, 2021—Canadian Office Action—CA 2,861,861.

Nov. 10, 2020—CA Office Action—CA 2,864,621.

Nov. 6, 2020—EP Office Action—EP 14186382.9.

Jun. 23, 2021—Canadian Office Action—CA 2,864,621.

Jun. 22, 2021—European Office Action—EP 14186382.9.

Nov. 3, 2021—Canadian Office Action—CA 2,860,802.

Nov. 5, 2021—Canadian Office Action—CA 2,861,861.

Dec. 9, 2021—European Office Action—14186382.9.

Jan. 3, 2023—EP Office Action—EP App. No. 14186382.9.

Mar. 22, 2019—EP Office Action—EP 14186382.9.

* cited by examiner

FIG. 3A

Summary Information

| Specification Name: | Video Program Viewing Activity Data File 130 |
|---|---|
| Record description: | The Video Program Viewing Activity Data contains video program viewing activity data from a Media Measurement Data Base or a similar input source. This video program viewing activity data can then be exploded into the individual Video Program Viewing Detail records which will be processed by the MapReduce Aggregation Engine 200.<br><br>The video program viewing activity can be sourced from sessionized linear viewing activity (LVA), digital video recording viewing activity (DVR), or video on demand viewing activity (VOD). The Video Program Viewing Activity Data can hold all 3 of these formats with the Program Airing and Channel information left blank for VOD.<br><br>There are numerous ways to analyze this data. I will teach how to create a foundation upon which various analytics may be created.<br><br>The Video Program Viewing Activity Data may encompass whatever viewing activity the analyst needs to analyze. Non-limiting examples include: a single video program, a segment of a video program, a commercial, an hour of the viewing day, a primetime television viewing period, an entire 24 hour day of viewing, a week of viewing, a weekly program schedule time slot, or another time period decided by the analyst.<br><br>The analyst may leave one or more of the identifier fields in this record null. This would cause the aggregation process to not create any detail breakouts for that identifier. |

FIG. 3B

Data Structure

| NAME 1000 | TYPE 1002 | SIZE 1004 | DESCRIPTION 1006 |
|---|---|---|---|
| | | | Notes: By putting the Program Info 1010 in this record, this enables the Data Explosion Process 140 to write the Program Info to the Video Program Viewing Detail File 150 for aggregation by any user defined value such as those in the Description below. |
| | | | Notes: By putting the Program Airing Info 1020 in this record, this enables the Data Explosion Process 140 to write the Program Airing Info to the Video Program Viewing Detail File 150 for aggregation by any user defined value such as those in the Description below. |
| | | | Notes: By putting the Channel Info 1030 in this record, this enables the Data Explosion Process 140 to write the Channel Info to the Video Program Viewing Detail File 150 for aggregation by any user defined value such as those in the Description below. |
| | | | Notes: By Putting the House Info 1040 in this record, this enables the Data Explosion Process 140 to write the House Info to the Video Program Viewing Detail File 150 for aggregation by any user defined value such as those in the Description below. |
| | | | Notes: By Putting the Device Info 1050 in this record, this enables the Data Explosion Process 140 to write the Device Info to the Video Program Viewing Detail File 150 for aggregation by any user defined value such as those in the Description below. |
| | | | Notes: By Putting the the Viewer Info 1060 in this record, this enables the Data Explosion Process 140 to write the Viewer Info to the Video Program Viewing Detail File 150 for aggregation by any user defined value such as those in the Description below. |
| | | | Notes: By Putting the Geographic Information 1070 in this record, this enables the Data Explosion Process 140 to write the Geographic Info to the Video Program Viewing Detail File 150 for aggregation by any user defined value such as those in the Description below. |

FIG. 3B - Data Structure - Continued

Notes: By Putting the Demographic Information 1080 in this record, this enables the Data Explosion Process 140 to write the Demographic Info to the Video Program Viewing Detail File 150 for aggregation by any user defined value such as those in the Description below.

Notes: By Putting the Viewing Type 1090 in this record, this enables the Data Explosion Process 140 to write the Viewing Type to the Video Program Viewing Detail File 150 for aggregation by any user defined value such as those in the Description below.

Notes: By Putting the Viewing Date 1100 in this record, this enables the Data Explosion Process 140 to write the Viewing Date to the Video Program Viewing Detail File 150 for aggregation by any user defined value such as those in the Description below. By including viewing data from multiple dates in this file, this enables the aggregation process to aggregate viewing of video content across a period of time. A non-limiting example would be to aggregate sessionized linear viewing and DVR viewing played back over a week for purposes of counting ad viewership.

Notes: By Putting the Playback Mode 1110 in this record, this enables the Data Explosion Process 140 to write the Playback Mode to the Video Program Viewing Detail File 150 for aggregation by any user defined value such as those in the Description below. A non-limiting example would be to aggregate sessionized linear viewing and DVR viewing played back in PL mode over a week for purposes of counting ad viewership; an alternative would be to aggregate F4 viewing to measure the amount of fast forward 4x viewing that is happening for a set of ads.

Notes: By Putting the Presentation Information 1150 in this record, this enables the Data Explosion Process 140 to write the Presentation Information to the Video Program Viewing Detail File 150 for aggregation by any user defined value such as those in the Description below. A non-limiting example would be to aggregate viewing activity where the audio is Muted or the Percent of content visible is less than 50%.

Notes: By Putting the Video Server Information 1160 in this record, this enables the Data Explosion Process 140 to write the Video Server Information to the Video Program Viewing Detail File 150 for aggregation by any user defined value such as those in the Description below. A non-limiting example would be to aggregate viewing activity for a particular server and also measure the System Health.

FIG. 3B - Data Structure - Continued

| | | | | |
|---|---|---|---|---|
| | Notes: By Putting the System Health Information 1170 in this record, this enables the Data Explosion Process 140 to write the System Health Information to the Video Program Viewing Detail File 150 for aggregation by any user defined value such as those in the Description below. | | | |
| | Note: Those skilled in the art will readily be able to identify the entities in the Cable Television Laboratories, Inc. Media Measurement Data Model which can be used to populate the fields listed below. | | | |
| 1010~ | PROGRAM_INFO | CHAR | 12 | The Program Information field records information about the program. As a non-limiting example, it may contain any of the following:<br>a) Program identifier<br>b) Program type (news, sports, sitcom, etc.)<br>c) Program genre (romance, mystery, etc.)<br>d) Program name or partial name<br>e) Program rating (G, PG, PG17, etc.)<br>f) Program duration<br>g) Program series flag (Y or N)<br>h) Program season code<br>i) Program episode number<br>j) An online learning course video identifier |
| 1020~ | PROGRAM_AIRING_INFO | CHAR | 12 | The Program Airing Information field records information about an airing of a program. As a non-limiting example, it may contain any of the following:<br>a) Program airing identifier<br>b) Program airing begin date and time<br>c) Program airing end date and time<br>d) Original airing or replay indicator<br>e) Program identifier + Program airing begin date and time<br>f) A lesson identifier in an online video learning course |

FIG. 3B - Data Structure - Continued

| | | | | |
|---|---|---|---|---|
| 1030~ | CHANNEL_INFO | CHAR | 40 | The Channel Information field records information about the channel or network on which the video content aired. As a non-limiting example, it may contain any of the following:<br>a) Actual Channel call sign (this is the network identifier with any High Definition or Standard Definition information; i.e.: DISCHD and DISC)<br>b) Channel call sign (this is the network identifier without any High Definition or Standard Definition information; i.e.: DISC)<br>c) Channel source identifier (a numeric channel identifier)<br>d) Network identifier<br>e) Entertainment Identifier Registry (EIDR) video service identifier (See http://eidr.org/)<br>f) The internet uniform resource locator<br>g) The web address or internet protocol address |
| 1040~ | HOUSE_INFO | CHAR | 40 | The House Information field records information about a house that is linked with the viewing activity that is being measured. As a non-limiting example, it may contain any of the following:<br>a) House identifier<br>b) Residential, commercial, multi-family, or hotel indicator<br>c) Customer service package accessible by the house<br>d) School or classroom identifier in an online learning environment |

FIG. 3B - Data Structure - Continued

| | | | | |
|---|---|---|---|---|
| 1050~ | DEVICE_INFO | CHAR | 40 | The Device Information field records information about a device which was used to view the content for which viewing activity is being measured. As a non-limiting example, it may contain any of the following:<br>a) Device identifier (media access control address, serial number, etc.)<br>b) Device type (TV, smart phone, set top box, etc.)<br>c) Device characteristic (single tuner, dual tuner, manufacturer, high definition, DVR enabled, etc.) |
| 1060~ | VIEWER_INFO | CHAR | 40 | The Viewer Information field records information about the viewer whose viewing activity is being measured. As a non-limiting example, it may contain any of the following:<br>a) Viewer identifier<br>b) Student identifier in an online learning environment<br>c) Viewer type (parent, child, student, etc.)<br>d) Grade level in an online learning environment<br>e) School name in an online learning environment<br><br>There may be multiple viewers associated with a house. This can identify a specific viewer in the house. Alternatively, it can identify an attribute applicable to multiple viewers. |

FIG. 3B - Data Structure - Continued

| | | | | |
|---|---|---|---|---|
| 1070~ | GEOGRAPHIC_INFO | CHAR | 40 | The Geographic Information field records information about the geolocation where the viewing activity that is being measured occurred. As a non-limiting example, it may contain any of the following:<br>a) A marketing area<br>b) A zip code<br>c) A cable operator region<br>d) A state<br>e) A county<br>f) A census tract<br>g) Cell phone tower identifier<br>h) Advertising zone<br>i) Satellite television service area<br>See Geographic information in the DEFINITIONS section for a description of the kinds of geographic values that may be linked with a viewing activity. |
| 1080~ | DEMOGRAPHIC_INFO | CHAR | 40 | The Demographic Information field records demographic data about the viewer whose viewing activity is being measured. As a non-limiting example, it may contain any of the following:<br>a) Age<br>b) Income level<br>c) Education level<br>d) Languages spoken<br>e) National origin<br>f) Occupation<br>g) Home value<br>h) Viewing interests<br>i) Gender<br>j) Marital status<br>k) Ages of children in home<br>l) Proprietary demographic grouping<br>See Demographic information in the DEFINITIONS section for a description of the kinds of demographic values that may be assigned to a viewer. |

FIG. 3B - Data Structure - Continued

| | | | | |
|---|---|---|---|---|
| 1090~ | VIEWING_TYPE | CHAR | 3 | The Viewing Type records the the type of viewing activity which is being measured. As a non-limiting example, it may contain any of the following:<br>a) LVA for sessionized linear viewing activity<br>b) DVR for content being played back from a digital video recording.<br>c) VOD for content being played from a Video On Demand lease<br>d) EDU for material from an online educational course<br>e) LIV for live programming content |
| 1100~ | VIEWING_DATE | DATE | 8 | The Viewing Date records the date of the viewing activity.<br><br>This can also be represented as the UNIX epoch time which is the number of seconds since Jan 1, 1970. |
| 1110~ | PLAYBACK_MODE | CHAR | 2 | The Playback Mode records information about the speed and direction of the video content during viewing. Suggested values include:<br>a) PL for Play<br>b) F1 for Fast Forward at 1x speed<br>c) F2 for Fast Forward at 2x speed<br>d) F3 for Fast Forward at 3x speed<br>e) F4 for Fast Forward at 4x speed<br>f) R1 for Reverse at 1x speed<br>g) R2 for Reverse at 2x speed<br>h) R3 for Reverse at 3x speed<br>i) R4 for Reverse at 4x speed<br>j) PA for Pause<br>k) ST for Stop<br>l) RE for Resume |

FIG. 3B - Data Structure - Continued

| 1120~ | PLAYBACK_BEG_POSITION | Number | 5 | The Playback Begin Position records the starting point (beginning) of the viewing activity represented by PLAYBACK_MODE based on the actual location in the content from a fixed reference point in the content. The fixed reference point is normally the first second (or frame) of the content (second 0), but it can be any fixed reference point. Having all viewing activity normalized to a fixed reference point enables consistent measurement across many devices operated by many viewers, even when their individual recordings (in the case of DVR) or viewing activity did not begin at the start of the content.<br><br>This is also referred to as the Beginning Offset Second from the True Beginning.<br><br>This value is used as the beginning point in a looping process which creates one record for every second of the viewing activity.<br><br>In an alternative embodiment, the Playback Begin Position may be replaced with a video frame number visible at time of activity start. |

FIG. 3B - Data Structure - Continued

| | | | | |
|---|---|---|---|---|
| 1130~ | PLAYBACK_END_POSITION | Number | 5 | The Playback End Position records the ending point of the viewing activity represented by PLAYBACK_MODE based on the actual location in the content from a fixed reference point in the content. The fixed reference point is normally the first second (or frame) of the content (second 0), but it can be any fixed reference point. Having all viewing activity normalized to a fixed reference point enables consistent measurement across many devices operated by many viewers, even when their individual recordings (in the case of DVR) or viewing activity did not begin at the start of the content.<br><br>This is also referred to as the Ending Offset Second from the True Beginning.<br><br>This value is used as the ending point in a looping process which creates one record for every second of the viewing activity.<br><br>In an alternative embodiment, the Playback End Position may be replaced with a video frame number visible at time of activity end. |
| 1140~ | ACTIVITY_DURATION_SECONDS | Number | 5 | The Activity Duration field records the duration of the activity represented by the Playback Mode. As a non-limiting example, this may record that the viewer was in Play mode for 20 seconds or 200 frames.<br>Activity Duration Seconds provides an alternative way to control the looping process which creates one record for every second of the activity duration. It is used to loop 'Activity Duration Seconds' times beginning with the Playback Begin Position.<br>Activity Duration includes the beginning and ending seconds of the activity in its count.<br>As noted, the duration may be expressed in frames of content. |

FIG. 3B - Data Structure - Continued

| | | | | |
|---|---|---|---|---|
| 1150~ | PRESENTATION_I NFO | CHAR | 4 | The Presentation Information field records information about the presentation of the video content for which viewing activity is being measured. As a non-limiting example, it may contain any of the following:<br>    a) Volume level<br>    b) Muting<br>    c) Closed captioning<br>    d) Picture in picture active indicator<br>    e) Percent of content visible<br>    f) Percent of screen used by content |
| 1160~ | VIDEO_SERVER_I NFO | CHAR | 40 | The Video Server Information field records information about the video server that served the video stream for which viewing activity is being measured. As a non-limiting example, it may contain any of the following:<br>    a) A computer system identifier<br>    b) A headend identifier<br>    c) A hub identifier<br>    d) A satellite identifier<br>    e) A web server<br>    f) A content delivery system identifier |
| 1170~ | SYSTEM_HEALTH_ INFO | CHAR | 40 | The System Health Information field records information about the health of the video server that served the video stream for which viewing activity is being measured. As a non-limiting example, it may contain any of the following:<br>    a) A system status indicator<br>    b) An error code |

FIG. 3C - Sample Data

Note: Field references are shown below field names.

Linear: Program 1 Airing 1

| PRO-GRAM | PROGRAM AIRING | CHAN-NEL INFO | HOUSE | VIEWING DEVICE | VIEWER | GEO-GRAPHIC INFO | DEMO-GRAPHIC INFO | VIEWING TYPE | VIEWING DATE | PLAY-BACK MODE | PLAY-BACK BEGIN POSITION | PLAY-BACK END POSITION | ACTIVITY DURATION SECONDS | PRESENT-ATION INFO | VIDEO SERVER INFO | SYSTEM HEALTH INFO |
|---|---|---|---|---|---|---|---|---|---|---|---|---|---|---|---|---|
| 1010 | 1020 | 1030 | 1040 | 1050 | 1060 | 1070 | 1080 | 1090 | 1100 | 1110 | 1120 | 1130 | 1140 | 1150 | 1160 | 1170 |
| PGM1 | PGM1AIR1 | HIST | H20 | D20 | V21 | DENV | 40-60k | LIN | 2013-08-31 | PL | 3 | 7 | 5 | NORM | SRV-01 | A+ |
| PGM1 | PGM1AIR1 | HIST | H20 | D20 | V21 | DENV | 40-60k | LIN | 2013-08-31 | F1 | 8 | 11 | 4 | NORM | SRV-01 | A+ |
| PGM1 | PGM1AIR1 | HIST | H20 | D20 | V21 | DENV | 40-60k | LIN | 2013-08-31 | PL | 12 | 15 | 4 | NORM | SRV-01 | A+ |
| PGM1 | PGM1AIR1 | HIST | H20 | D20 | V21 | DENV | 40-60k | LIN | 2013-08-31 | F1 | 16 | 18 | 3 | NORM | SRV-01 | A+ |
| PGM1 | PGM1AIR1 | HIST | H20 | D20 | V21 | DENV | 40-60k | LIN | 2013-08-31 | PL | 19 | 19 | 1 | NORM | SRV-01 | A+ |
| PGM1 | PGM1AIR1 | HIST | H21 | D21 | V21 | DENV | 40-60k | LIN | 2013-08-31 | PL | 2 | 6 | 5 | NORM | SRV-01 | A+ |
| PGM1 | PGM1AIR1 | HIST | H21 | D21 | V21 | DENV | 40-60k | LIN | 2013-08-31 | F2 | 7 | 12 | 6 | NORM | SRV-01 | A+ |
| PGM1 | PGM1AIR1 | HIST | H21 | D21 | V21 | DENV | 40-60k | LIN | 2013-08-31 | PL | 13 | 19 | 7 | NORM | SRV-01 | A+ |
| PGM1 | PGM1AIR1 | HIST | H22 | D22 | V22 | DENV | 80-110K | LIN | 2013-08-31 | PL | 0 | 5 | 6 | NORM | SRV-01 | A+ |
| PGM1 | PGM1AIR1 | HIST | H22 | D22 | V22 | DENV | 80-110K | LIN | 2013-08-31 | F1 | 6 | 12 | 7 | NORM | SRV-01 | A+ |
| PGM1 | PGM1AIR1 | HIST | H22 | D22 | V22 | DENV | 80-110K | LIN | 2013-08-31 | F2 | 13 | 16 | 4 | NORM | SRV-01 | A+ |
| PGM1 | PGM1AIR1 | HIST | H22 | D22 | V22 | DENV | 80-110K | LIN | 2013-08-31 | PL | 17 | 19 | 3 | NORM | SRV-01 | A+ |

FIG. 3D  Linear: Program 1 Airing 2

| PRO-GRAM | PROGRAM AIRING | CHAN-NEL INFO | HOUSE | VIEWING DEVICE | VIEWER | GEO-GRAPHIC INFO | DEMO-GRAPHIC INFO | VIEWING TYPE | VIEWING DATE | PLAY-BACK MODE | PLAY-BACK BEGIN POSITION | PLAY-BACK END POSITION | ACTIVITY DURATION SECONDS | PRESENT-ATION INFO | VIDEO SERVER INFO | SYSTEM HEALTH INFO |
|---|---|---|---|---|---|---|---|---|---|---|---|---|---|---|---|---|
| 1010 | 1020 | 1030 | 1040 | 1050 | 1060 | 1070 | 1080 | 1090 | 1100 | 1110 | 1120 | 1130 | 1140 | 1150 | 1160 | 1170 |
| PGM1 | PGM1AIR2 | HIST | H23 | D23 | V23 | DENV | 80-110K | DVR | 2013-09-01 | PL | 1 | 7 | 7 | NORM | SRV-01 | A+ |
| PGM1 | PGM1AIR2 | HIST | H23 | D23 | V23 | DENV | 80-110K | DVR | 2013-09-01 | R1 | 3 | 6 | 4 | NORM | SRV-01 | A+ |
| PGM1 | PGM1AIR2 | HIST | H23 | D23 | V23 | DENV | 80-110K | DVR | 2013-09-01 | PL | 4 | 12 | 9 | NORM | SRV-01 | A+ |
| PGM1 | PGM1AIR2 | HIST | H23 | D23 | V23 | DENV | 80-110K | DVR | 2013-09-01 | R1 | 7 | 11 | 5 | NORM | SRV-01 | A+ |
| PGM1 | PGM1AIR2 | HIST | H23 | D23 | V23 | DENV | 80-110K | DVR | 2013-09-01 | R2 | 3 | 6 | 4 | NORM | SRV-01 | A+ |
| PGM1 | PGM1AIR2 | HIST | H23 | D23 | V23 | DENV | 80-110K | DVR | 2013-09-01 | PL | 4 | 15 | 12 | NORM | SRV-01 | A+ |
| PGM1 | PGM1AIR2 | HIST | H24 | D24 | V24 | DENV | 80-110K | DVR | 2013-09-01 | PL | 3 | 7 | 5 | NORM | SRV-01 | A+ |
| PGM1 | PGM1AIR2 | HIST | H24 | D24 | V24 | DENV | 80-110K | DVR | 2013-09-01 | F1 | 8 | 12 | 5 | NORM | SRV-01 | A+ |
| PGM1 | PGM1AIR2 | HIST | H24 | D24 | V24 | DENV | 80-110K | DVR | 2013-09-01 | F2 | 13 | 16 | 4 | NORM | SRV-01 | A+ |
| PGM1 | PGM1AIR2 | HIST | H24 | D24 | V24 | DENV | 80-110K | DVR | 2013-09-01 | R1 | 7 | 15 | 9 | NORM | SRV-01 | A+ |
| PGM1 | PGM1AIR2 | HIST | H24 | D24 | V24 | DENV | 80-110K | DVR | 2013-09-01 | PL | 8 | 17 | 10 | NORM | SRV-01 | A+ |

FIG. 3E - Sample Data - Continued

Note: Field references are shown below field names.

DVR: Program 1 Airing 1

| PRO-GRAM | PROGRAM AIRING | CHAN-NEL INFO | HOUSE | VIEWING DEVICE | VIEWER | GEO-GRAPHIC INFO | DEMO-GRAPHIC INFO | VIEWING TYPE | VIEWING DATE | PLAY-BACK MODE | PLAY-BACK BEGIN POSITION | PLAY-BACK END POSITION | ACTIVITY DURATION SECONDS | PRESENT-ATION INFO | VIDEO SERVER INFO | SYSTEM HEALTH INFO |
|---|---|---|---|---|---|---|---|---|---|---|---|---|---|---|---|---|
| 1010 | 1020 | 1030 | 1040 | 1050 | 1060 | 1070 | 1080 | 1090 | 1100 | 1110 | 1120 | 1130 | 1140 | 1150 | 1160 | 1170 |
| PGM1 | PGM1AIR1 | HIST | H1 | D1 | V1 | DENV | 40-60k | DVR | 2013-09-01 | PL | 0 | 5 | 5 | NORM | SRV-01 | A+ |
| PGM1 | PGM1AIR1 | HIST | H1 | D1 | V1 | DENV | 40-60k | DVR | 2013-09-01 | F1 | 6 | 9 | 4 | NORM | SRV-01 | A+ |
| PGM1 | PGM1AIR1 | HIST | H1 | D1 | V1 | DENV | 40-60k | DVR | 2013-09-01 | PL | 10 | 13 | 4 | NORM | SRV-01 | A+ |
| PGM1 | PGM1AIR1 | HIST | H1 | D1 | V1 | DENV | 40-60k | DVR | 2013-09-01 | F1 | 14 | 16 | 3 | NORM | SRV-01 | A+ |
| PGM1 | PGM1AIR1 | HIST | H1 | D1 | V1 | DENV | 40-60k | DVR | 2013-09-01 | PL | 17 | 19 | 3 | NORM | SRV-01 | A+ |
| PGM1 | PGM1AIR1 | HIST | H2 | D2 | V2 | DENV | 40-60k | DVR | 2013-09-01 | PL | 0 | 7 | 8 | NORM | SRV-01 | A+ |
| PGM1 | PGM1AIR1 | HIST | H2 | D2 | V2 | DENV | 40-60k | DVR | 2013-09-01 | F2 | 8 | 14 | 7 | NORM | SRV-01 | A+ |
| PGM1 | PGM1AIR1 | HIST | H2 | D2 | V2 | DENV | 40-60k | DVR | 2013-09-01 | PL | 15 | 19 | 5 | NORM | SRV-01 | A+ |
| PGM1 | PGM1AIR1 | HIST | H3 | D3 | V3 | DENV | 40-60k | DVR | 2013-09-01 | PL | 0 | 19 | 20 | NORM | SRV-01 | A+ |
| PGM1 | PGM1AIR1 | HIST | H4 | D4 | V4 | DENV | 80-110K | DVR | 2013-09-01 | PL | 0 | 3 | 4 | NORM | SRV-01 | A+ |
| PGM1 | PGM1AIR1 | HIST | H4 | D4 | V4 | DENV | 80-110K | DVR | 2013-09-01 | F1 | 4 | 8 | 5 | NORM | SRV-01 | A+ |
| PGM1 | PGM1AIR1 | HIST | H4 | D4 | V4 | DENV | 80-110K | DVR | 2013-09-01 | F2 | 9 | 16 | 8 | NORM | SRV-01 | A+ |
| PGM1 | PGM1AIR1 | HIST | H4 | D4 | V4 | DENV | 80-110K | DVR | 2013-09-01 | PL | 17 | 19 | 3 | NORM | SRV-01 | A+ |

FIG. 3F  DVR: Program 1 Airing 2

| PRO-GRAM | PROGRAM AIRING | CHAN-NEL INFO | HOUSE | VIEWING DEVICE | VIEWER | GEO-GRAPHIC INFO | DEMO-GRAPHIC INFO | VIEWING TYPE | VIEWING DATE | PLAY-BACK MODE | PLAY-BACK BEGIN POSITION | PLAY-BACK END POSITION | ACTIVITY DURATION SECONDS | PRESENT-ATION INFO | VIDEO SERVER INFO | SYSTEM HEALTH INFO |
|---|---|---|---|---|---|---|---|---|---|---|---|---|---|---|---|---|
| 1010 | 1020 | 1030 | 1040 | 1050 | 1060 | 1070 | 1080 | 1090 | 1100 | 1110 | 1120 | 1130 | 1140 | 1150 | 1160 | 1170 |
| PGM1 | PGM1AIR2 | HIST | H5 | D5 | V5 | DENV | 80-110K | DVR | 2013-09-01 | PL | 3 | 8 | 6 | NORM | SRV-01 | A+ |
| PGM1 | PGM1AIR2 | HIST | H5 | D5 | V5 | DENV | 80-110K | DVR | 2013-09-01 | R1 | 4 | 7 | 4 | NORM | SRV-01 | A+ |
| PGM1 | PGM1AIR2 | HIST | H5 | D5 | V5 | DENV | 80-110K | DVR | 2013-09-01 | PL | 4 | 16 | 13 | NORM | SRV-01 | A+ |
| PGM1 | PGM1AIR2 | HIST | H5 | D5 | V5 | DENV | 80-110K | DVR | 2013-09-01 | R1 | 8 | 15 | 8 | NORM | SRV-01 | A+ |
| PGM1 | PGM1AIR2 | HIST | H5 | D5 | V5 | DENV | 80-110K | DVR | 2013-09-01 | R2 | 5 | 7 | 3 | NORM | SRV-01 | A+ |
| PGM1 | PGM1AIR2 | HIST | H5 | D5 | V5 | DENV | 80-110K | DVR | 2013-09-01 | PL | 5 | 19 | 15 | NORM | SRV-01 | A+ |
| PGM1 | PGM1AIR2 | HIST | H6 | D6 | V6 | DENV | 80-110K | DVR | 2013-09-01 | PL | 2 | 5 | 4 | NORM | SRV-01 | A+ |
| PGM1 | PGM1AIR2 | HIST | H6 | D6 | V6 | DENV | 80-110K | DVR | 2013-09-01 | F1 | 6 | 10 | 5 | NORM | SRV-01 | A+ |
| PGM1 | PGM1AIR2 | HIST | H6 | D6 | V6 | DENV | 80-110K | DVR | 2013-09-01 | F2 | 11 | 14 | 4 | NORM | SRV-01 | A+ |
| PGM1 | PGM1AIR2 | HIST | H6 | D6 | V6 | DENV | 80-110K | DVR | 2013-09-01 | R1 | 8 | 13 | 6 | NORM | SRV-01 | A+ |
| PGM1 | PGM1AIR2 | HIST | H6 | D6 | V6 | DENV | 80-110K | DVR | 2013-09-01 | PL | 8 | 15 | 8 | NORM | SRV-01 | A+ |
| PGM1 | PGM1AIR2 | HIST | H6 | D7 | V6 | DENV | 80-110K | DVR | 2013-09-01 | PL | 16 | 18 | 3 | NORM | SRV-01 | A+ |

FIG. 3G - Sample Data - Continued

VOD: Viewer group 1

Note: Field references are shown below field names.

| PRO-GRAM | PROGRAM AIRING | CHAN-NEL INFO | HOUSE | VIEWING DEVICE | VIEWER | GEO-GRAPHIC INFO | DEMO-GRAPHIC INFO | VIEWING TYPE | VIEWING DATE | PLAY-BACK MODE | PLAY-BACK BEGIN POSITION | PLAY-BACK END POSITION | ACTIVITY DURATION SECONDS | PRESENT-ATION INFO | VIDEO SERVER INFO | SYSTEM HEALTH INFO |
|---|---|---|---|---|---|---|---|---|---|---|---|---|---|---|---|---|
| 1010 | 1020 | 1030 | 1040 | 1050 | 1060 | 1070 | 1080 | 1090 | 1100 | 1110 | 1120 | 1130 | 1140 | 1150 | 1160 | 1170 |
| PGM1 | | | H10 | D10 | V1 | DENV | 40-60k | VOD | 2013-09-02 | PL | 0 | 12 | 13 | NORM | SRV-02 | A+ |
| PGM1 | | | H10 | D10 | V1 | DENV | 40-60k | VOD | 2013-09-02 | F1 | 13 | 16 | 4 | NORM | SRV-02 | A+ |
| PGM1 | | | H10 | D10 | V1 | DENV | 40-60k | VOD | 2013-09-02 | PL | 17 | 19 | 3 | NORM | SRV-02 | A+ |
| PGM1 | | | H11 | D11 | V2 | DENV | 40-60k | VOD | 2013-09-02 | PL | 0 | 6 | 7 | NORM | SRV-02 | A+ |
| PGM1 | | | H11 | D11 | V2 | DENV | 40-60k | VOD | 2013-09-02 | F2 | 7 | 12 | 6 | NORM | SRV-02 | A+ |
| PGM1 | | | H11 | D11 | V2 | DENV | 40-60k | VOD | 2013-09-02 | PL | 13 | 17 | 5 | NORM | SRV-02 | A+ |
| PGM1 | | | H12 | D12 | V3 | DENV | 80-110K | VOD | 2013-09-02 | PL | 0 | 11 | 12 | NORM | SRV-02 | A+ |
| PGM1 | | | H12 | D12 | V3 | DENV | 80-110K | VOD | 2013-09-02 | F1 | 12 | 16 | 5 | NORM | SRV-02 | A+ |
| PGM1 | | | H12 | D12 | V3 | DENV | 80-110K | VOD | 2013-09-02 | F2 | 17 | 18 | 2 | NORM | SRV-02 | A+ |
| PGM1 | | | H12 | D12 | V3 | DENV | 80-110K | VOD | 2013-09-02 | PL | 19 | 19 | 1 | NORM | SRV-02 | A+ |

FIG. 3H VOD: Viewer group 2

| PRO-GRAM | PROGRAM AIRING | CHAN-NEL INFO | HOUSE | VIEWING DEVICE | VIEWER | GEO-GRAPHIC INFO | DEMO-GRAPHIC INFO | VIEWING TYPE | VIEWING DATE | PLAY-BACK MODE | PLAY-BACK BEGIN POSITION | PLAY-BACK END POSITION | ACTIVITY DURATION SECONDS | PRESENT-ATION INFO | VIDEO SERVER INFO | SYSTEM HEALTH INFO |
|---|---|---|---|---|---|---|---|---|---|---|---|---|---|---|---|---|
| 1010 | 1020 | 1030 | 1040 | 1050 | 1060 | 1070 | 1080 | 1090 | 1100 | 1110 | 1120 | 1130 | 1140 | 1150 | 1160 | 1170 |
| PGM1 | | | H13 | D13 | V13 | DENV | 40-60k | VOD | 2013-09-02 | PL | 0 | 12 | 13 | NORM | SRV-02 | A+ |
| PGM1 | | | H13 | D13 | V13 | DENV | 40-60k | VOD | 2013-09-02 | F1 | 13 | 16 | 4 | NORM | SRV-02 | A+ |
| PGM1 | | | H13 | D13 | V13 | DENV | 40-60k | VOD | 2013-09-02 | R1 | 9 | 15 | 7 | NORM | SRV-02 | A+ |
| PGM1 | | | H13 | D13 | V13 | DENV | 40-60k | VOD | 2013-09-02 | R2 | 3 | 8 | 6 | NORM | SRV-02 | A+ |
| PGM1 | | | H13 | D13 | V13 | DENV | 40-60k | VOD | 2013-09-02 | PL | 3 | 15 | 13 | NORM | SRV-02 | A+ |
| PGM1 | | | H14 | D14 | V14 | DENV | 40-60k | VOD | 2013-09-02 | PL | 0 | 9 | 10 | NORM | SRV-02 | A+ |
| PGM1 | | | H14 | D14 | V14 | DENV | 40-60k | VOD | 2013-09-02 | R1 | 2 | 8 | 7 | NORM | SRV-02 | A+ |
| PGM1 | | | H14 | D14 | V14 | DENV | 40-60k | VOD | 2013-09-02 | PL | 2 | 12 | 11 | NORM | SRV-02 | A+ |
| PGM1 | | | H14 | D14 | V14 | DENV | 40-60k | VOD | 2013-09-02 | F1 | 13 | 15 | 3 | NORM | SRV-02 | A+ |
| PGM1 | | | H14 | D14 | V14 | DENV | 40-60k | VOD | 2013-09-02 | F2 | 16 | 19 | 4 | NORM | SRV-02 | A+ |
| PGM1 | | | H15 | D15 | V15 | DENV | 80-110K | VOD | 2013-09-02 | PL | 0 | 11 | 12 | NORM | SRV-02 | A+ |
| PGM1 | | | H15 | D15 | V15 | DENV | 80-110K | VOD | 2013-09-02 | R1 | 6 | 10 | 5 | NORM | SRV-02 | A+ |
| PGM1 | | | H15 | D15 | V15 | DENV | 80-110K | VOD | 2013-09-02 | PL | 6 | 16 | 11 | NORM | SRV-02 | A+ |
| PGM1 | | | H15 | D15 | V15 | DENV | 80-110K | VOD | 2013-09-02 | R2 | 3 | 15 | 8 | NORM | SRV-02 | A+ |
| PGM1 | | | H15 | D15 | V15 | DENV | 80-110K | VOD | 2013-09-02 | PL | 9 | 17 | 9 | NORM | SRV-02 | A+ |

FIG. 4A

Summary Information

| Specification Name: | Video Program Viewing Detail File 150 |
|---|---|
| Record description: | The Video Program Viewing Detail File contains video program viewing detail records which have been formatted for use by the MapReduce Aggregation Engine 200. These detail records may be derived from sessionized linear viewing activity (LVA), digital video recording viewing activity (DVR), or video on demand viewing activity (VOD). The Video Program Viewing Detail File can hold all 3 of these formats with the Program Airing information left blank for VOD. |

FIG. 4B

Data Structure

| NAME 1200 | TYPE 1202 | SIZE 1204 | DESCRIPTION 1206 |
|---|---|---|---|
| \multicolumn{4}{l}{Notes: By putting PLAYBACK_POSITION 1380 in this record, this enables aggregation of all the viewing activity for any combination of the other fields in this record. The aggregation is done to the second of the program content represented in PLAYBACK_POSITION 1380. In an alternative embodiment, Playback Position 1380 may be used to record video frame.} | | | |
| \multicolumn{4}{l}{Notes: By putting the Count of 1, this allows MapReduce to count all the viewing activity during the second of the program content represented in PLAYBACK_POSITION 1380 for any combination of the other fields in this record.} | | | |
| PROGRAM_INFO (1210~) | CHAR | 12 | The Program Information field. See 1010 for definition. |
| PROGRAM_AIRING _INFO (1220~) | CHAR | 12 | The Program Airing Information field. See 1020 for definition. |

FIG. 4B - Data Structure - Continued

| | | | | |
|---|---|---|---|---|
| 1230~ | CHANNEL_INFO | CHAR | 40 | The Channel Information field. See 1030 for definition. |
| 1240~ | HOUSE_INFO | CHAR | 40 | The House Information field. See 1040 for definition. |
| 1250~ | DEVICE_INFO | CHAR | 40 | The Device Information field. See 1050 for definition. |
| 1260~ | VIEWER_INFO | CHAR | 40 | The Viewer Information field. See 1060 for definition. |
| 1270~ | GEOGRAPHIC_INFO | CHAR | 40 | The Geographic Information field. See 1070 for definition. |
| 1280~ | DEMOGRAPHIC_INFO | CHAR | 40 | The Demographic Information field. See 1080 for definition. |
| 1290~ | VIEWING_TYPE | CHAR | 3 | The Viewing Type. See 1090 for definition. |
| 1300~ | VIEWING_DATE | DATE | 8 | The Viewing Date. See 1100 for definition. |
| 1310~ | PLAYBACK_MODE | CHAR | 2 | The Playback Mode. See 1110 for definition. |
| 1350~ | PRESENTATION_INFO | CHAR | 4 | The Presentation Information. See 1150 for definition. |
| 1360~ | VIDEO_SERVER_INFO | CHAR | 40 | The Video Server Information. See 1160 for definition. |
| 1370~ | SYSTEM_HEALTH_INFO | CHAR | 40 | The System Health Information. See 1170 for definition. |

FIG. 4B  - Data Structure - Continued

| | | | | |
|---|---|---|---|---|
| 1380~ | PLAYBACK_POSITION | Number | 5 | The Playback Position records the actual location in the content of the viewing activity based upon a fixed reference point in the content. The fixed reference point is normally the first second (frame) of the content (second 0), but it can be any fixed reference point. Having all viewing activity normalized to a fixed reference point enables consistent measurement across many devices operated by many viewers.<br><br>Note: In Video Program Viewing Detail File 150, there is one record for each second of viewing activity.<br><br>As a non-limiting example, represented in seconds, a commercial may air beginning at PLAYBACK_POSITION 60 and run for 30 seconds with its last second of viewing happening at PLAYBACK_POSITION 89; in this example, there would be 30 records needed to cover this 30 second commercial. |
| 1390~ | COUNT_OF_1 | Number | 1 | Contains the value 1 which will then be aggregated in the MapReduce process. |

FIG. 4C

Linear: Program 1 Airing 1

| PRO-GRAM | PROGRAM AIRING | CHAN-NEL INFO | GEO-GRAPHIC INFO | DEMO-GRAPHIC INFO | VIEWING TYPE | VIEWING DATE | PLAYBACK MODE | PRESENT-ATION INFO | VIDEO SERVER INFO | SYSTEM HEALTH INFO | PLAYBACK POSITION | COUNT OF 1 |
|---|---|---|---|---|---|---|---|---|---|---|---|---|
| 1210 | 1220 | 1230 | 1270 | 1280 | 1290 | 1300 | 1310 | 1350 | 1360 | 1370 | 1380 | 1390 |

This record set is from House H20

| PGM1 | PGM1AIR1 | HIST | DENV | 40-60k | LIN | 2013-08-31 | PL | NORM | SRV-01 | A+ | 3 | 1 |
|---|---|---|---|---|---|---|---|---|---|---|---|---|
| PGM1 | PGM1AIR1 | HIST | DENV | 40-60k | LIN | 2013-08-31 | PL | NORM | SRV-01 | A+ | 4 | 1 |
| PGM1 | PGM1AIR1 | HIST | DENV | 40-60k | LIN | 2013-08-31 | PL | NORM | SRV-01 | A+ | 5 | 1 |
| PGM1 | PGM1AIR1 | HIST | DENV | 40-60k | LIN | 2013-08-31 | PL | NORM | SRV-01 | A+ | 6 | 1 |
| PGM1 | PGM1AIR1 | HIST | DENV | 40-60k | LIN | 2013-08-31 | PL | NORM | SRV-01 | A+ | 7 | 1 |
| PGM1 | PGM1AIR1 | HIST | DENV | 40-60k | LIN | 2013-08-31 | F1 | NORM | SRV-01 | A+ | 8 | 1 |
| PGM1 | PGM1AIR1 | HIST | DENV | 40-60k | LIN | 2013-08-31 | F1 | NORM | SRV-01 | A+ | 9 | 1 |
| PGM1 | PGM1AIR1 | HIST | DENV | 40-60k | LIN | 2013-08-31 | F1 | NORM | SRV-01 | A+ | 10 | 1 |
| PGM1 | PGM1AIR1 | HIST | DENV | 40-60k | LIN | 2013-08-31 | F1 | NORM | SRV-01 | A+ | 11 | 1 |
| PGM1 | PGM1AIR1 | HIST | DENV | 40-60k | LIN | 2013-08-31 | PL | NORM | SRV-01 | A+ | 12 | 1 |
| PGM1 | PGM1AIR1 | HIST | DENV | 40-60k | LIN | 2013-08-31 | PL | NORM | SRV-01 | A+ | 13 | 1 |
| PGM1 | PGM1AIR1 | HIST | DENV | 40-60k | LIN | 2013-08-31 | PL | NORM | SRV-01 | A+ | 14 | 1 |
| PGM1 | PGM1AIR1 | HIST | DENV | 40-60k | LIN | 2013-08-31 | PL | NORM | SRV-01 | A+ | 15 | 1 |
| PGM1 | PGM1AIR1 | HIST | DENV | 40-60k | LIN | 2013-08-31 | F1 | NORM | SRV-01 | A+ | 16 | 1 |
| PGM1 | PGM1AIR1 | HIST | DENV | 40-60k | LIN | 2013-08-31 | F1 | NORM | SRV-01 | A+ | 17 | 1 |
| PGM1 | PGM1AIR1 | HIST | DENV | 40-60k | LIN | 2013-08-31 | F1 | NORM | SRV-01 | A+ | 18 | 1 |
| PGM1 | PGM1AIR1 | HIST | DENV | 40-60k | LIN | 2013-08-31 | PL | NORM | SRV-01 | A+ | 19 | 1 |

This record set is from House H21

| PGM1 | PGM1AIR1 | HIST | DENV | 40-60k | LIN | 2013-08-31 | PL | NORM | SRV-01 | A+ | 2 | 1 |
|---|---|---|---|---|---|---|---|---|---|---|---|---|
| PGM1 | PGM1AIR1 | HIST | DENV | 40-60k | LIN | 2013-08-31 | PL | NORM | SRV-01 | A+ | 3 | 1 |
| PGM1 | PGM1AIR1 | HIST | DENV | 40-60k | LIN | 2013-08-31 | PL | NORM | SRV-01 | A+ | 4 | 1 |
| PGM1 | PGM1AIR1 | HIST | DENV | 40-60k | LIN | 2013-08-31 | PL | NORM | SRV-01 | A+ | 5 | 1 |
| PGM1 | PGM1AIR1 | HIST | DENV | 40-60k | LIN | 2013-08-31 | PL | NORM | SRV-01 | A+ | 6 | 1 |
| PGM1 | PGM1AIR1 | HIST | DENV | 40-60k | LIN | 2013-08-31 | F2 | NORM | SRV-01 | A+ | 7 | 1 |
| PGM1 | PGM1AIR1 | HIST | DENV | 40-60k | LIN | 2013-08-31 | F2 | NORM | SRV-01 | A+ | 8 | 1 |
| PGM1 | PGM1AIR1 | HIST | DENV | 40-60k | LIN | 2013-08-31 | F2 | NORM | SRV-01 | A+ | 9 | 1 |
| PGM1 | PGM1AIR1 | HIST | DENV | 40-60k | LIN | 2013-08-31 | F2 | NORM | SRV-01 | A+ | 10 | 1 |
| PGM1 | PGM1AIR1 | HIST | DENV | 40-60k | LIN | 2013-08-31 | F2 | NORM | SRV-01 | A+ | 11 | 1 |
| PGM1 | PGM1AIR1 | HIST | DENV | 40-60k | LIN | 2013-08-31 | F2 | NORM | SRV-01 | A+ | 12 | 1 |
| PGM1 | PGM1AIR1 | HIST | DENV | 40-60k | LIN | 2013-08-31 | PL | NORM | SRV-01 | A+ | 13 | 1 |
| PGM1 | PGM1AIR1 | HIST | DENV | 40-60k | LIN | 2013-08-31 | PL | NORM | SRV-01 | A+ | 14 | 1 |
| PGM1 | PGM1AIR1 | HIST | DENV | 40-60k | LIN | 2013-08-31 | PL | NORM | SRV-01 | A+ | 15 | 1 |
| PGM1 | PGM1AIR1 | HIST | DENV | 40-60k | LIN | 2013-08-31 | PL | NORM | SRV-01 | A+ | 16 | 1 |
| PGM1 | PGM1AIR1 | HIST | DENV | 40-60k | LIN | 2013-08-31 | PL | NORM | SRV-01 | A+ | 17 | 1 |
| PGM1 | PGM1AIR1 | HIST | DENV | 40-60k | LIN | 2013-08-31 | PL | NORM | SRV-01 | A+ | 18 | 1 |
| PGM1 | PGM1AIR1 | HIST | DENV | 40-60k | LIN | 2013-08-31 | PL | NORM | SRV-01 | A+ | 19 | 1 |

FIG. 4C - Sample Data - Continued

Linear: Program 1 Airing 1 - Continued

| PRO-GRAM | PROGRAM AIRING | CHAN-NEL INFO | GEO-GRAPHIC INFO | DEMO-GRAPHIC INFO | VIEWING TYPE | VIEWING DATE | PLAY-BACK MODE | PRESENT-ATION INFO | VIDEO SERVER INFO | SYSTEM HEALTH INFO | PLAY-BACK POSIT-ION | COUNT OF 1 |
|---|---|---|---|---|---|---|---|---|---|---|---|---|
| 1210 | 1220 | 1230 | 1270 | 1280 | 1290 | 1300 | 1310 | 1350 | 1360 | 1370 | 1380 | 1390 |
| This record set is from House H22 | | | | | | | | | | | | |
| PGM1 | PGM1AIR1 | HIST | DENV | 80-110K | LIN | 2013-08-31 | PL | NORM | SRV-01 | A+ | 0 | 1 |
| PGM1 | PGM1AIR1 | HIST | DENV | 80-110K | LIN | 2013-08-31 | PL | NORM | SRV-01 | A+ | 1 | 1 |
| PGM1 | PGM1AIR1 | HIST | DENV | 80-110K | LIN | 2013-08-31 | PL | NORM | SRV-01 | A+ | 2 | 1 |
| PGM1 | PGM1AIR1 | HIST | DENV | 80-110K | LIN | 2013-08-31 | PL | NORM | SRV-01 | A+ | 3 | 1 |
| PGM1 | PGM1AIR1 | HIST | DENV | 80-110K | LIN | 2013-08-31 | PL | NORM | SRV-01 | A+ | 4 | 1 |
| PGM1 | PGM1AIR1 | HIST | DENV | 80-110K | LIN | 2013-08-31 | PL | NORM | SRV-01 | A+ | 5 | 1 |
| PGM1 | PGM1AIR1 | HIST | DENV | 80-110K | LIN | 2013-08-31 | F1 | NORM | SRV-01 | A+ | 6 | 1 |
| PGM1 | PGM1AIR1 | HIST | DENV | 80-110K | LIN | 2013-08-31 | F1 | NORM | SRV-01 | A+ | 7 | 1 |
| PGM1 | PGM1AIR1 | HIST | DENV | 80-110K | LIN | 2013-08-31 | F1 | NORM | SRV-01 | A+ | 8 | 1 |
| PGM1 | PGM1AIR1 | HIST | DENV | 80-110K | LIN | 2013-08-31 | F1 | NORM | SRV-01 | A+ | 9 | 1 |
| PGM1 | PGM1AIR1 | HIST | DENV | 80-110K | LIN | 2013-08-31 | F1 | NORM | SRV-01 | A+ | 10 | 1 |
| PGM1 | PGM1AIR1 | HIST | DENV | 80-110K | LIN | 2013-08-31 | F1 | NORM | SRV-01 | A+ | 11 | 1 |
| PGM1 | PGM1AIR1 | HIST | DENV | 80-110K | LIN | 2013-08-31 | F1 | NORM | SRV-01 | A+ | 12 | 1 |
| PGM1 | PGM1AIR1 | HIST | DENV | 80-110K | LIN | 2013-08-31 | F2 | NORM | SRV-01 | A+ | 13 | 1 |
| PGM1 | PGM1AIR1 | HIST | DENV | 80-110K | LIN | 2013-08-31 | F2 | NORM | SRV-01 | A+ | 14 | 1 |
| PGM1 | PGM1AIR1 | HIST | DENV | 80-110K | LIN | 2013-08-31 | F2 | NORM | SRV-01 | A+ | 15 | 1 |
| PGM1 | PGM1AIR1 | HIST | DENV | 80-110K | LIN | 2013-08-31 | F2 | NORM | SRV-01 | A+ | 16 | 1 |
| PGM1 | PGM1AIR1 | HIST | DENV | 80-110K | LIN | 2013-08-31 | PL | NORM | SRV-01 | A+ | 17 | 1 |
| PGM1 | PGM1AIR1 | HIST | DENV | 80-110K | LIN | 2013-08-31 | PL | NORM | SRV-01 | A+ | 18 | 1 |
| PGM1 | PGM1AIR1 | HIST | DENV | 80-110K | LIN | 2013-08-31 | PL | NORM | SRV-01 | A+ | 19 | 1 |

FIG. 4D  Linear: Program 1 Airing 2

| PRO-GRAM | PROGRAM AIRING | CHAN-NEL INFO | GEO-GRAPHIC INFO | DEMO-GRAPHIC INFO | VIEWING TYPE | VIEWING DATE | PLAY-BACK MODE | PRESENT-ATION INFO | VIDEO SERVER INFO | SYSTEM HEALTH INFO | PLAY-BACK POSIT-ION | COUNT OF 1 |
|---|---|---|---|---|---|---|---|---|---|---|---|---|
| 1210 | 1220 | 1230 | 1270 | 1280 | 1290 | 1300 | 1310 | 1350 | 1360 | 1370 | 1380 | 1390 |
| This record set is from House H23 | | | | | | | | | | | | |
| PGM1 | PGM1AIR2 | HIST | DENV | 80-110K | DVR | 2013-09-01 | PL | NORM | SRV-01 | A+ | 1 | 1 |
| PGM1 | PGM1AIR2 | HIST | DENV | 80-110K | DVR | 2013-09-01 | PL | NORM | SRV-01 | A+ | 2 | 1 |
| PGM1 | PGM1AIR2 | HIST | DENV | 80-110K | DVR | 2013-09-01 | PL | NORM | SRV-01 | A+ | 3 | 1 |
| PGM1 | PGM1AIR2 | HIST | DENV | 80-110K | DVR | 2013-09-01 | PL | NORM | SRV-01 | A+ | 4 | 1 |
| PGM1 | PGM1AIR2 | HIST | DENV | 80-110K | DVR | 2013-09-01 | PL | NORM | SRV-01 | A+ | 5 | 1 |
| PGM1 | PGM1AIR2 | HIST | DENV | 80-110K | DVR | 2013-09-01 | PL | NORM | SRV-01 | A+ | 6 | 1 |
| PGM1 | PGM1AIR2 | HIST | DENV | 80-110K | DVR | 2013-09-01 | PL | NORM | SRV-01 | A+ | 7 | 1 |
| PGM1 | PGM1AIR2 | HIST | DENV | 80-110K | DVR | 2013-09-01 | R1 | NORM | SRV-01 | A+ | 3 | 1 |
| PGM1 | PGM1AIR2 | HIST | DENV | 80-110K | DVR | 2013-09-01 | R1 | NORM | SRV-01 | A+ | 4 | 1 |
| PGM1 | PGM1AIR2 | HIST | DENV | 80-110K | DVR | 2013-09-01 | R1 | NORM | SRV-01 | A+ | 5 | 1 |
| PGM1 | PGM1AIR2 | HIST | DENV | 80-110K | DVR | 2013-09-01 | R1 | NORM | SRV-01 | A+ | 6 | 1 |
| PGM1 | PGM1AIR2 | HIST | DENV | 80-110K | DVR | 2013-09-01 | PL | NORM | SRV-01 | A+ | 4 | 1 |
| PGM1 | PGM1AIR2 | HIST | DENV | 80-110K | DVR | 2013-09-01 | PL | NORM | SRV-01 | A+ | 5 | 1 |
| PGM1 | PGM1AIR2 | HIST | DENV | 80-110K | DVR | 2013-09-01 | PL | NORM | SRV-01 | A+ | 6 | 1 |

FIG. 4D - Sample Data - Continued

Linear: Program 1 Airing 2 - Continued

| PRO-GRAM | PROGRAM AIRING | CHAN-NEL INFO | GEO-GRAPHIC INFO | DEMO-GRAPHIC INFO | VIEWING TYPE | VIEWING DATE | PLAY-BACK MODE | PRESENT-ATION INFO | VIDEO SERVER INFO | SYSTEM HEALTH INFO | PLAY-BACK POSIT-ION | COUNT OF 1 |
|---|---|---|---|---|---|---|---|---|---|---|---|---|
| 1210 | 1220 | 1230 | 1270 | 1280 | 1290 | 1300 | 1310 | 1350 | 1360 | 1370 | 1380 | 1390 |

This record set is from House H23 continued

| PGM1 | PGM1AIR2 | HIST | DENV | 80-110K | DVR | 2013-09-01 | PL | NORM | SRV-01 | A+ | 7 | 1 |
| PGM1 | PGM1AIR2 | HIST | DENV | 80-110K | DVR | 2013-09-01 | PL | NORM | SRV-01 | A+ | 8 | 1 |
| PGM1 | PGM1AIR2 | HIST | DENV | 80-110K | DVR | 2013-09-01 | PL | NORM | SRV-01 | A+ | 9 | 1 |
| PGM1 | PGM1AIR2 | HIST | DENV | 80-110K | DVR | 2013-09-01 | PL | NORM | SRV-01 | A+ | 10 | 1 |
| PGM1 | PGM1AIR2 | HIST | DENV | 80-110K | DVR | 2013-09-01 | PL | NORM | SRV-01 | A+ | 11 | 1 |
| PGM1 | PGM1AIR2 | HIST | DENV | 80-110K | DVR | 2013-09-01 | PL | NORM | SRV-01 | A+ | 12 | 1 |
| PGM1 | PGM1AIR2 | HIST | DENV | 80-110K | DVR | 2013-09-01 | R1 | NORM | SRV-01 | A+ | 7 | 1 |
| PGM1 | PGM1AIR2 | HIST | DENV | 80-110K | DVR | 2013-09-01 | R1 | NORM | SRV-01 | A+ | 8 | 1 |
| PGM1 | PGM1AIR2 | HIST | DENV | 80-110K | DVR | 2013-09-01 | R1 | NORM | SRV-01 | A+ | 9 | 1 |
| PGM1 | PGM1AIR2 | HIST | DENV | 80-110K | DVR | 2013-09-01 | R1 | NORM | SRV-01 | A+ | 10 | 1 |
| PGM1 | PGM1AIR2 | HIST | DENV | 80-110K | DVR | 2013-09-01 | R1 | NORM | SRV-01 | A+ | 11 | 1 |
| PGM1 | PGM1AIR2 | HIST | DENV | 80-110K | DVR | 2013-09-01 | R2 | NORM | SRV-01 | A+ | 3 | 1 |
| PGM1 | PGM1AIR2 | HIST | DENV | 80-110K | DVR | 2013-09-01 | R2 | NORM | SRV-01 | A+ | 4 | 1 |
| PGM1 | PGM1AIR2 | HIST | DENV | 80-110K | DVR | 2013-09-01 | R2 | NORM | SRV-01 | A+ | 5 | 1 |
| PGM1 | PGM1AIR2 | HIST | DENV | 80-110K | DVR | 2013-09-01 | R2 | NORM | SRV-01 | A+ | 6 | 1 |
| PGM1 | PGM1AIR2 | HIST | DENV | 80-110K | DVR | 2013-09-01 | PL | NORM | SRV-01 | A+ | 4 | 1 |
| PGM1 | PGM1AIR2 | HIST | DENV | 80-110K | DVR | 2013-09-01 | PL | NORM | SRV-01 | A+ | 5 | 1 |
| PGM1 | PGM1AIR2 | HIST | DENV | 80-110K | DVR | 2013-09-01 | PL | NORM | SRV-01 | A+ | 6 | 1 |
| PGM1 | PGM1AIR2 | HIST | DENV | 80-110K | DVR | 2013-09-01 | PL | NORM | SRV-01 | A+ | 7 | 1 |
| PGM1 | PGM1AIR2 | HIST | DENV | 80-110K | DVR | 2013-09-01 | PL | NORM | SRV-01 | A+ | 8 | 1 |
| PGM1 | PGM1AIR2 | HIST | DENV | 80-110K | DVR | 2013-09-01 | PL | NORM | SRV-01 | A+ | 9 | 1 |
| PGM1 | PGM1AIR2 | HIST | DENV | 80-110K | DVR | 2013-09-01 | PL | NORM | SRV-01 | A+ | 10 | 1 |
| PGM1 | PGM1AIR2 | HIST | DENV | 80-110K | DVR | 2013-09-01 | PL | NORM | SRV-01 | A+ | 11 | 1 |
| PGM1 | PGM1AIR2 | HIST | DENV | 80-110K | DVR | 2013-09-01 | PL | NORM | SRV-01 | A+ | 12 | 1 |
| PGM1 | PGM1AIR2 | HIST | DENV | 80-110K | DVR | 2013-09-01 | PL | NORM | SRV-01 | A+ | 13 | 1 |
| PGM1 | PGM1AIR2 | HIST | DENV | 80-110K | DVR | 2013-09-01 | PL | NORM | SRV-01 | A+ | 14 | 1 |
| PGM1 | PGM1AIR2 | HIST | DENV | 80-110K | DVR | 2013-09-01 | PL | NORM | SRV-01 | A+ | 15 | 1 |

This record set is from House H24

| PGM1 | PGM1AIR2 | HIST | DENV | 80-110K | DVR | 2013-09-01 | PL | NORM | SRV-01 | A+ | 3 | 1 |
| PGM1 | PGM1AIR2 | HIST | DENV | 80-110K | DVR | 2013-09-01 | PL | NORM | SRV-01 | A+ | 4 | 1 |
| PGM1 | PGM1AIR2 | HIST | DENV | 80-110K | DVR | 2013-09-01 | PL | NORM | SRV-01 | A+ | 5 | 1 |
| PGM1 | PGM1AIR2 | HIST | DENV | 80-110K | DVR | 2013-09-01 | PL | NORM | SRV-01 | A+ | 6 | 1 |
| PGM1 | PGM1AIR2 | HIST | DENV | 80-110K | DVR | 2013-09-01 | PL | NORM | SRV-01 | A+ | 7 | 1 |
| PGM1 | PGM1AIR2 | HIST | DENV | 80-110K | DVR | 2013-09-01 | F1 | NORM | SRV-01 | A+ | 8 | 1 |
| PGM1 | PGM1AIR2 | HIST | DENV | 80-110K | DVR | 2013-09-01 | F1 | NORM | SRV-01 | A+ | 9 | 1 |
| PGM1 | PGM1AIR2 | HIST | DENV | 80-110K | DVR | 2013-09-01 | F1 | NORM | SRV-01 | A+ | 10 | 1 |
| PGM1 | PGM1AIR2 | HIST | DENV | 80-110K | DVR | 2013-09-01 | F1 | NORM | SRV-01 | A+ | 11 | 1 |
| PGM1 | PGM1AIR2 | HIST | DENV | 80-110K | DVR | 2013-09-01 | F1 | NORM | SRV-01 | A+ | 12 | 1 |
| PGM1 | PGM1AIR2 | HIST | DENV | 80-110K | DVR | 2013-09-01 | F2 | NORM | SRV-01 | A+ | 13 | 1 |
| PGM1 | PGM1AIR2 | HIST | DENV | 80-110K | DVR | 2013-09-01 | F2 | NORM | SRV-01 | A+ | 14 | 1 |
| PGM1 | PGM1AIR2 | HIST | DENV | 80-110K | DVR | 2013-09-01 | F2 | NORM | SRV-01 | A+ | 15 | 1 |
| PGM1 | PGM1AIR2 | HIST | DENV | 80-110K | DVR | 2013-09-01 | F2 | NORM | SRV-01 | A+ | 16 | 1 |

FIG 4D - Sample Data - Continued

Linear: Program 1 Airing 2 - Continued

| PRO-GRAM | PROGRAM AIRING | CHAN-NEL INFO | GEO-GRAPHIC INFO | DEMO-GRAPHIC INFO | VIEWING TYPE | VIEWING DATE | PLAY-BACK MODE | PRESENT-ATION INFO | VIDEO SERVER INFO | SYSTEM HEALTH INFO | PLAY-BACK POSIT-ION | COUNT OF 1 |
|---|---|---|---|---|---|---|---|---|---|---|---|---|
| 1210 | 1220 | 1230 | 1270 | 1280 | 1290 | 1300 | 1310 | 1350 | 1360 | 1370 | 1380 | 1390 |

This record set is from House H24 continued

| | | | | | | | | | | | | |
|---|---|---|---|---|---|---|---|---|---|---|---|---|
| PGM1 | PGM1AIR2 | HIST | DENV | 80-110K | DVR | 2013-09-01 | R1 | NORM | SRV-01 | A+ | 7 | 1 |
| PGM1 | PGM1AIR2 | HIST | DENV | 80-110K | DVR | 2013-09-01 | R1 | NORM | SRV-01 | A+ | 8 | 1 |
| PGM1 | PGM1AIR2 | HIST | DENV | 80-110K | DVR | 2013-09-01 | R1 | NORM | SRV-01 | A+ | 9 | 1 |
| PGM1 | PGM1AIR2 | HIST | DENV | 80-110K | DVR | 2013-09-01 | R1 | NORM | SRV-01 | A+ | 10 | 1 |
| PGM1 | PGM1AIR2 | HIST | DENV | 80-110K | DVR | 2013-09-01 | R1 | NORM | SRV-01 | A+ | 11 | 1 |
| PGM1 | PGM1AIR2 | HIST | DENV | 80-110K | DVR | 2013-09-01 | R1 | NORM | SRV-01 | A+ | 12 | 1 |
| PGM1 | PGM1AIR2 | HIST | DENV | 80-110K | DVR | 2013-09-01 | R1 | NORM | SRV-01 | A+ | 13 | 1 |
| PGM1 | PGM1AIR2 | HIST | DENV | 80-110K | DVR | 2013-09-01 | R1 | NORM | SRV-01 | A+ | 14 | 1 |
| PGM1 | PGM1AIR2 | HIST | DENV | 80-110K | DVR | 2013-09-01 | R1 | NORM | SRV-01 | A+ | 15 | 1 |
| PGM1 | PGM1AIR2 | HIST | DENV | 80-110K | DVR | 2013-09-01 | PL | NORM | SRV-01 | A+ | 8 | 1 |
| PGM1 | PGM1AIR2 | HIST | DENV | 80-110K | DVR | 2013-09-01 | PL | NORM | SRV-01 | A+ | 9 | 1 |
| PGM1 | PGM1AIR2 | HIST | DENV | 80-110K | DVR | 2013-09-01 | PL | NORM | SRV-01 | A+ | 10 | 1 |
| PGM1 | PGM1AIR2 | HIST | DENV | 80-110K | DVR | 2013-09-01 | PL | NORM | SRV-01 | A+ | 11 | 1 |
| PGM1 | PGM1AIR2 | HIST | DENV | 80-110K | DVR | 2013-09-01 | PL | NORM | SRV-01 | A+ | 12 | 1 |
| PGM1 | PGM1AIR2 | HIST | DENV | 80-110K | DVR | 2013-09-01 | PL | NORM | SRV-01 | A+ | 13 | 1 |
| PGM1 | PGM1AIR2 | HIST | DENV | 80-110K | DVR | 2013-09-01 | PL | NORM | SRV-01 | A+ | 14 | 1 |
| PGM1 | PGM1AIR2 | HIST | DENV | 80-110K | DVR | 2013-09-01 | PL | NORM | SRV-01 | A+ | 15 | 1 |
| PGM1 | PGM1AIR2 | HIST | DENV | 80-110K | DVR | 2013-09-01 | PL | NORM | SRV-01 | A+ | 16 | 1 |
| PGM1 | PGM1AIR2 | HIST | DENV | 80-110K | DVR | 2013-09-01 | PL | NORM | SRV-01 | A+ | 17 | 1 |

FIG. 4E - Sample Data

DVR: Program 1 Airing 1

| PRO-GRAM | PROGRAM AIRING | CHAN-NEL INFO | GEO-GRAPHIC INFO | DEMO-GRAPHIC INFO | VIEWING TYPE | VIEWING DATE | PLAY-BACK MODE | PRESENT-ATION INFO | VIDEO SERVER INFO | SYSTEM HEALTH INFO | PLAY-BACK POSIT-ION | COUNT OF 1 |
|---|---|---|---|---|---|---|---|---|---|---|---|---|
| 1210 | 1220 | 1230 | 1270 | 1280 | 1290 | 1300 | 1310 | 1350 | 1360 | 1370 | 1380 | 1390 |

This record set is from House H1

| PGM1 | PGM1AIR1 | HIST | DENV | 40-60k | DVR | 2013-09-01 | PL | NORM | SRV-01 | A+ | 0 | 1 |
|---|---|---|---|---|---|---|---|---|---|---|---|---|
| PGM1 | PGM1AIR1 | HIST | DENV | 40-60k | DVR | 2013-09-01 | PL | NORM | SRV-01 | A+ | 1 | 1 |
| PGM1 | PGM1AIR1 | HIST | DENV | 40-60k | DVR | 2013-09-01 | PL | NORM | SRV-01 | A+ | 2 | 1 |
| PGM1 | PGM1AIR1 | HIST | DENV | 40-60k | DVR | 2013-09-01 | PL | NORM | SRV-01 | A+ | 3 | 1 |
| PGM1 | PGM1AIR1 | HIST | DENV | 40-60k | DVR | 2013-09-01 | PL | NORM | SRV-01 | A+ | 4 | 1 |
| PGM1 | PGM1AIR1 | HIST | DENV | 40-60k | DVR | 2013-09-01 | PL | NORM | SRV-01 | A+ | 5 | 1 |
| PGM1 | PGM1AIR1 | HIST | DENV | 40-60k | DVR | 2013-09-01 | F1 | NORM | SRV-01 | A+ | 6 | 1 |
| PGM1 | PGM1AIR1 | HIST | DENV | 40-60k | DVR | 2013-09-01 | F1 | NORM | SRV-01 | A+ | 7 | 1 |
| PGM1 | PGM1AIR1 | HIST | DENV | 40-60k | DVR | 2013-09-01 | F1 | NORM | SRV-01 | A+ | 8 | 1 |
| PGM1 | PGM1AIR1 | HIST | DENV | 40-60k | DVR | 2013-09-01 | F1 | NORM | SRV-01 | A+ | 9 | 1 |
| PGM1 | PGM1AIR1 | HIST | DENV | 40-60k | DVR | 2013-09-01 | PL | NORM | SRV-01 | A+ | 10 | 1 |
| PGM1 | PGM1AIR1 | HIST | DENV | 40-60k | DVR | 2013-09-01 | PL | NORM | SRV-01 | A+ | 11 | 1 |
| PGM1 | PGM1AIR1 | HIST | DENV | 40-60k | DVR | 2013-09-01 | PL | NORM | SRV-01 | A+ | 12 | 1 |
| PGM1 | PGM1AIR1 | HIST | DENV | 40-60k | DVR | 2013-09-01 | PL | NORM | SRV-01 | A+ | 13 | 1 |
| PGM1 | PGM1AIR1 | HIST | DENV | 40-60k | DVR | 2013-09-01 | F1 | NORM | SRV-01 | A+ | 14 | 1 |
| PGM1 | PGM1AIR1 | HIST | DENV | 40-60k | DVR | 2013-09-01 | F1 | NORM | SRV-01 | A+ | 15 | 1 |
| PGM1 | PGM1AIR1 | HIST | DENV | 40-60k | DVR | 2013-09-01 | F1 | NORM | SRV-01 | A+ | 16 | 1 |
| PGM1 | PGM1AIR1 | HIST | DENV | 40-60k | DVR | 2013-09-01 | PL | NORM | SRV-01 | A+ | 17 | 1 |
| PGM1 | PGM1AIR1 | HIST | DENV | 40-60k | DVR | 2013-09-01 | PL | NORM | SRV-01 | A+ | 18 | 1 |
| PGM1 | PGM1AIR1 | HIST | DENV | 40-60k | DVR | 2013-09-01 | PL | NORM | SRV-01 | A+ | 19 | 1 |

The record set for DVR: Program 1 Airing 1 House H2, H3, H4 are not included to save space.

FIG. 4F - Sample Data - Continued

DVR: Program 1 Airing 2

| PRO-GRAM | PROGRAM AIRING | CHAN-NEL INFO | GEO-GRAPHIC INFO | DEMO-GRAPHIC INFO | VIEWING TYPE | VIEWING DATE | PLAY-BACK MODE | PRESENT-ATION INFO | VIDEO SERVER INFO | SYSTEM HEALTH INFO | PLAY-BACK POSIT-ION | COUNT OF 1 |
|---|---|---|---|---|---|---|---|---|---|---|---|---|
| 1210 | 1220 | 1230 | 1270 | 1280 | 1290 | 1300 | 1310 | 1350 | 1360 | 1370 | 1380 | 1390 |

This record set is from House H5

| PGM1 | PGM1AIR2 | HIST | DENV | 80-110K | DVR | 2013-09-01 | PL | NORM | SRV-01 | A+ | 3 | 1 |
|---|---|---|---|---|---|---|---|---|---|---|---|---|
| PGM1 | PGM1AIR2 | HIST | DENV | 80-110K | DVR | 2013-09-01 | PL | NORM | SRV-01 | A+ | 4 | 1 |
| PGM1 | PGM1AIR2 | HIST | DENV | 80-110K | DVR | 2013-09-01 | PL | NORM | SRV-01 | A+ | 5 | 1 |
| PGM1 | PGM1AIR2 | HIST | DENV | 80-110K | DVR | 2013-09-01 | PL | NORM | SRV-01 | A+ | 6 | 1 |
| PGM1 | PGM1AIR2 | HIST | DENV | 80-110K | DVR | 2013-09-01 | PL | NORM | SRV-01 | A+ | 7 | 1 |
| PGM1 | PGM1AIR2 | HIST | DENV | 80-110K | DVR | 2013-09-01 | PL | NORM | SRV-01 | A+ | 8 | 1 |
| PGM1 | PGM1AIR2 | HIST | DENV | 80-110K | DVR | 2013-09-01 | R1 | NORM | SRV-01 | A+ | 4 | 1 |
| PGM1 | PGM1AIR2 | HIST | DENV | 80-110K | DVR | 2013-09-01 | R1 | NORM | SRV-01 | A+ | 5 | 1 |
| PGM1 | PGM1AIR2 | HIST | DENV | 80-110K | DVR | 2013-09-01 | R1 | NORM | SRV-01 | A+ | 6 | 1 |
| PGM1 | PGM1AIR2 | HIST | DENV | 80-110K | DVR | 2013-09-01 | R1 | NORM | SRV-01 | A+ | 7 | 1 |
| PGM1 | PGM1AIR2 | HIST | DENV | 80-110K | DVR | 2013-09-01 | PL | NORM | SRV-01 | A+ | 4 | 1 |
| PGM1 | PGM1AIR2 | HIST | DENV | 80-110K | DVR | 2013-09-01 | PL | NORM | SRV-01 | A+ | 5 | 1 |
| PGM1 | PGM1AIR2 | HIST | DENV | 80-110K | DVR | 2013-09-01 | PL | NORM | SRV-01 | A+ | 6 | 1 |
| PGM1 | PGM1AIR2 | HIST | DENV | 80-110K | DVR | 2013-09-01 | PL | NORM | SRV-01 | A+ | 7 | 1 |
| PGM1 | PGM1AIR2 | HIST | DENV | 80-110K | DVR | 2013-09-01 | PL | NORM | SRV-01 | A+ | 8 | 1 |
| PGM1 | PGM1AIR2 | HIST | DENV | 80-110K | DVR | 2013-09-01 | PL | NORM | SRV-01 | A+ | 9 | 1 |
| PGM1 | PGM1AIR2 | HIST | DENV | 80-110K | DVR | 2013-09-01 | PL | NORM | SRV-01 | A+ | 10 | 1 |
| PGM1 | PGM1AIR2 | HIST | DENV | 80-110K | DVR | 2013-09-01 | PL | NORM | SRV-01 | A+ | 11 | 1 |
| PGM1 | PGM1AIR2 | HIST | DENV | 80-110K | DVR | 2013-09-01 | PL | NORM | SRV-01 | A+ | 12 | 1 |
| PGM1 | PGM1AIR2 | HIST | DENV | 80-110K | DVR | 2013-09-01 | PL | NORM | SRV-01 | A+ | 13 | 1 |
| PGM1 | PGM1AIR2 | HIST | DENV | 80-110K | DVR | 2013-09-01 | PL | NORM | SRV-01 | A+ | 14 | 1 |
| PGM1 | PGM1AIR2 | HIST | DENV | 80-110K | DVR | 2013-09-01 | PL | NORM | SRV-01 | A+ | 15 | 1 |
| PGM1 | PGM1AIR2 | HIST | DENV | 80-110K | DVR | 2013-09-01 | PL | NORM | SRV-01 | A+ | 16 | 1 |
| PGM1 | PGM1AIR2 | HIST | DENV | 80-110K | DVR | 2013-09-01 | R1 | NORM | SRV-01 | A+ | 8 | 1 |
| PGM1 | PGM1AIR2 | HIST | DENV | 80-110K | DVR | 2013-09-01 | R1 | NORM | SRV-01 | A+ | 9 | 1 |
| PGM1 | PGM1AIR2 | HIST | DENV | 80-110K | DVR | 2013-09-01 | R1 | NORM | SRV-01 | A+ | 10 | 1 |
| PGM1 | PGM1AIR2 | HIST | DENV | 80-110K | DVR | 2013-09-01 | R1 | NORM | SRV-01 | A+ | 11 | 1 |
| PGM1 | PGM1AIR2 | HIST | DENV | 80-110K | DVR | 2013-09-01 | R1 | NORM | SRV-01 | A+ | 12 | 1 |
| PGM1 | PGM1AIR2 | HIST | DENV | 80-110K | DVR | 2013-09-01 | R1 | NORM | SRV-01 | A+ | 13 | 1 |
| PGM1 | PGM1AIR2 | HIST | DENV | 80-110K | DVR | 2013-09-01 | R1 | NORM | SRV-01 | A+ | 14 | 1 |
| PGM1 | PGM1AIR2 | HIST | DENV | 80-110K | DVR | 2013-09-01 | R1 | NORM | SRV-01 | A+ | 15 | 1 |
| PGM1 | PGM1AIR2 | HIST | DENV | 80-110K | DVR | 2013-09-01 | R2 | NORM | SRV-01 | A+ | 5 | 1 |
| PGM1 | PGM1AIR2 | HIST | DENV | 80-110K | DVR | 2013-09-01 | R2 | NORM | SRV-01 | A+ | 6 | 1 |
| PGM1 | PGM1AIR2 | HIST | DENV | 80-110K | DVR | 2013-09-01 | R2 | NORM | SRV-01 | A+ | 7 | 1 |
| PGM1 | PGM1AIR2 | HIST | DENV | 80-110K | DVR | 2013-09-01 | PL | NORM | SRV-01 | A+ | 5 | 1 |
| PGM1 | PGM1AIR2 | HIST | DENV | 80-110K | DVR | 2013-09-01 | PL | NORM | SRV-01 | A+ | 6 | 1 |
| PGM1 | PGM1AIR2 | HIST | DENV | 80-110K | DVR | 2013-09-01 | PL | NORM | SRV-01 | A+ | 7 | 1 |
| PGM1 | PGM1AIR2 | HIST | DENV | 80-110K | DVR | 2013-09-01 | PL | NORM | SRV-01 | A+ | 8 | 1 |
| PGM1 | PGM1AIR2 | HIST | DENV | 80-110K | DVR | 2013-09-01 | PL | NORM | SRV-01 | A+ | 9 | 1 |

FIG. 4F - Sample Data - Continued

DVR: Program 1 Airing 2 - Continued

| PRO-GRAM | PROGRAM AIRING | CHAN-NEL INFO | GEO-GRAPHIC INFO | DEMO-GRAPHIC INFO | VIEWING TYPE | VIEWING DATE | PLAY-BACK MODE | PRESENT-ATION INFO | VIDEO SERVER INFO | SYSTEM HEALTH INFO | PLAY-BACK POSIT-ION | COUNT OF 1 |
|---|---|---|---|---|---|---|---|---|---|---|---|---|
| 1210 | 1220 | 1230 | 1270 | 1280 | 1290 | 1300 | 1310 | 1350 | 1360 | 1370 | 1380 | 1390 |

This record set is from House H5 continued

| PGM1 | PGM1AIR2 | HIST | DENV | 80-110K | DVR | 2013-09-01 | PL | NORM | SRV-01 | A+ | 10 | 1 |
|---|---|---|---|---|---|---|---|---|---|---|---|---|
| PGM1 | PGM1AIR2 | HIST | DENV | 80-110K | DVR | 2013-09-01 | PL | NORM | SRV-01 | A+ | 11 | 1 |
| PGM1 | PGM1AIR2 | HIST | DENV | 80-110K | DVR | 2013-09-01 | PL | NORM | SRV-01 | A+ | 12 | 1 |
| PGM1 | PGM1AIR2 | HIST | DENV | 80-110K | DVR | 2013-09-01 | PL | NORM | SRV-01 | A+ | 13 | 1 |
| PGM1 | PGM1AIR2 | HIST | DENV | 80-110K | DVR | 2013-09-01 | PL | NORM | SRV-01 | A+ | 14 | 1 |
| PGM1 | PGM1AIR2 | HIST | DENV | 80-110K | DVR | 2013-09-01 | PL | NORM | SRV-01 | A+ | 15 | 1 |
| PGM1 | PGM1AIR2 | HIST | DENV | 80-110K | DVR | 2013-09-01 | PL | NORM | SRV-01 | A+ | 16 | 1 |
| PGM1 | PGM1AIR2 | HIST | DENV | 80-110K | DVR | 2013-09-01 | PL | NORM | SRV-01 | A+ | 17 | 1 |
| PGM1 | PGM1AIR2 | HIST | DENV | 80-110K | DVR | 2013-09-01 | PL | NORM | SRV-01 | A+ | 18 | 1 |
| PGM1 | PGM1AIR2 | HIST | DENV | 80-110K | DVR | 2013-09-01 | PL | NORM | SRV-01 | A+ | 19 | 1 |

This record set is from House H6

| PGM1 | PGM1AIR2 | HIST | DENV | 80-110K | DVR | 2013-09-01 | PL | NORM | SRV-01 | A+ | 2 | 1 |
|---|---|---|---|---|---|---|---|---|---|---|---|---|
| PGM1 | PGM1AIR2 | HIST | DENV | 80-110K | DVR | 2013-09-01 | PL | NORM | SRV-01 | A+ | 3 | 1 |
| PGM1 | PGM1AIR2 | HIST | DENV | 80-110K | DVR | 2013-09-01 | PL | NORM | SRV-01 | A+ | 4 | 1 |
| PGM1 | PGM1AIR2 | HIST | DENV | 80-110K | DVR | 2013-09-01 | PL | NORM | SRV-01 | A+ | 5 | 1 |
| PGM1 | PGM1AIR2 | HIST | DENV | 80-110K | DVR | 2013-09-01 | F1 | NORM | SRV-01 | A+ | 6 | 1 |
| PGM1 | PGM1AIR2 | HIST | DENV | 80-110K | DVR | 2013-09-01 | F1 | NORM | SRV-01 | A+ | 7 | 1 |
| PGM1 | PGM1AIR2 | HIST | DENV | 80-110K | DVR | 2013-09-01 | F1 | NORM | SRV-01 | A+ | 8 | 1 |
| PGM1 | PGM1AIR2 | HIST | DENV | 80-110K | DVR | 2013-09-01 | F1 | NORM | SRV-01 | A+ | 9 | 1 |
| PGM1 | PGM1AIR2 | HIST | DENV | 80-110K | DVR | 2013-09-01 | F1 | NORM | SRV-01 | A+ | 10 | 1 |
| PGM1 | PGM1AIR2 | HIST | DENV | 80-110K | DVR | 2013-09-01 | F2 | NORM | SRV-01 | A+ | 11 | 1 |
| PGM1 | PGM1AIR2 | HIST | DENV | 80-110K | DVR | 2013-09-01 | F2 | NORM | SRV-01 | A+ | 12 | 1 |
| PGM1 | PGM1AIR2 | HIST | DENV | 80-110K | DVR | 2013-09-01 | F2 | NORM | SRV-01 | A+ | 13 | 1 |
| PGM1 | PGM1AIR2 | HIST | DENV | 80-110K | DVR | 2013-09-01 | F2 | NORM | SRV-01 | A+ | 14 | 1 |
| PGM1 | PGM1AIR2 | HIST | DENV | 80-110K | DVR | 2013-09-01 | R1 | NORM | SRV-01 | A+ | 8 | 1 |
| PGM1 | PGM1AIR2 | HIST | DENV | 80-110K | DVR | 2013-09-01 | R1 | NORM | SRV-01 | A+ | 9 | 1 |
| PGM1 | PGM1AIR2 | HIST | DENV | 80-110K | DVR | 2013-09-01 | R1 | NORM | SRV-01 | A+ | 10 | 1 |
| PGM1 | PGM1AIR2 | HIST | DENV | 80-110K | DVR | 2013-09-01 | R1 | NORM | SRV-01 | A+ | 11 | 1 |
| PGM1 | PGM1AIR2 | HIST | DENV | 80-110K | DVR | 2013-09-01 | R1 | NORM | SRV-01 | A+ | 12 | 1 |
| PGM1 | PGM1AIR2 | HIST | DENV | 80-110K | DVR | 2013-09-01 | R1 | NORM | SRV-01 | A+ | 13 | 1 |
| PGM1 | PGM1AIR2 | HIST | DENV | 80-110K | DVR | 2013-09-01 | PL | NORM | SRV-01 | A+ | 8 | 1 |
| PGM1 | PGM1AIR2 | HIST | DENV | 80-110K | DVR | 2013-09-01 | PL | NORM | SRV-01 | A+ | 9 | 1 |
| PGM1 | PGM1AIR2 | HIST | DENV | 80-110K | DVR | 2013-09-01 | PL | NORM | SRV-01 | A+ | 10 | 1 |
| PGM1 | PGM1AIR2 | HIST | DENV | 80-110K | DVR | 2013-09-01 | PL | NORM | SRV-01 | A+ | 11 | 1 |
| PGM1 | PGM1AIR2 | HIST | DENV | 80-110K | DVR | 2013-09-01 | PL | NORM | SRV-01 | A+ | 12 | 1 |
| PGM1 | PGM1AIR2 | HIST | DENV | 80-110K | DVR | 2013-09-01 | PL | NORM | SRV-01 | A+ | 13 | 1 |
| PGM1 | PGM1AIR2 | HIST | DENV | 80-110K | DVR | 2013-09-01 | PL | NORM | SRV-01 | A+ | 14 | 1 |
| PGM1 | PGM1AIR2 | HIST | DENV | 80-110K | DVR | 2013-09-01 | PL | NORM | SRV-01 | A+ | 15 | 1 |

This record set is from House H6 Device D7

| PGM1 | PGM1AIR2 | HIST | DENV | 80-110K | DVR | 2013-09-01 | PL | NORM | SRV-01 | A+ | 16 | 1 |
|---|---|---|---|---|---|---|---|---|---|---|---|---|
| PGM1 | PGM1AIR2 | HIST | DENV | 80-110K | DVR | 2013-09-01 | PL | NORM | SRV-01 | A+ | 17 | 1 |
| PGM1 | PGM1AIR2 | HIST | DENV | 80-110K | DVR | 2013-09-01 | PL | NORM | SRV-01 | A+ | 18 | 1 |

FIG. 4G - Sample Data
VOD: Viewer group 1

| PRO-GRAM | PROGRAM AIRING | CHAN-NEL INFO | GEO-GRAPHIC INFO | DEMO-GRAPHIC INFO | VIEWING TYPE | VIEWING DATE | PLAY-BACK MODE | PRESENT-ATION INFO | VIDEO SERVER INFO | SYSTEM HEALTH INFO | PLAY-BACK POSIT-ION | COUNT OF 1 |
|---|---|---|---|---|---|---|---|---|---|---|---|---|
| 1210 | 1220 | 1230 | 1270 | 1280 | 1290 | 1300 | 1310 | 1350 | 1360 | 1370 | 1380 | 1390 |

This record set is from House H10

| PRO-GRAM | PROGRAM AIRING | CHAN-NEL INFO | GEO-GRAPHIC INFO | DEMO-GRAPHIC INFO | VIEWING TYPE | VIEWING DATE | PLAY-BACK MODE | PRESENT-ATION INFO | VIDEO SERVER INFO | SYSTEM HEALTH INFO | PLAY-BACK POSIT-ION | COUNT OF 1 |
|---|---|---|---|---|---|---|---|---|---|---|---|---|
| PGM1 | | | DENV | 40-60k | VOD | 2013-09-02 | PL | NORM | SRV-02 | A+ | 0 | 1 |
| PGM1 | | | DENV | 40-60k | VOD | 2013-09-02 | PL | NORM | SRV-02 | A+ | 1 | 1 |
| PGM1 | | | DENV | 40-60k | VOD | 2013-09-02 | PL | NORM | SRV-02 | A+ | 2 | 1 |
| PGM1 | | | DENV | 40-60k | VOD | 2013-09-02 | PL | NORM | SRV-02 | A+ | 3 | 1 |
| PGM1 | | | DENV | 40-60k | VOD | 2013-09-02 | PL | NORM | SRV-02 | A+ | 4 | 1 |
| PGM1 | | | DENV | 40-60k | VOD | 2013-09-02 | PL | NORM | SRV-02 | A+ | 5 | 1 |
| PGM1 | | | DENV | 40-60k | VOD | 2013-09-02 | PL | NORM | SRV-02 | A+ | 6 | 1 |
| PGM1 | | | DENV | 40-60k | VOD | 2013-09-02 | PL | NORM | SRV-02 | A+ | 7 | 1 |
| PGM1 | | | DENV | 40-60k | VOD | 2013-09-02 | PL | NORM | SRV-02 | A+ | 8 | 1 |
| PGM1 | | | DENV | 40-60k | VOD | 2013-09-02 | PL | NORM | SRV-02 | A+ | 9 | 1 |
| PGM1 | | | DENV | 40-60k | VOD | 2013-09-02 | PL | NORM | SRV-02 | A+ | 10 | 1 |
| PGM1 | | | DENV | 40-60k | VOD | 2013-09-02 | PL | NORM | SRV-02 | A+ | 11 | 1 |
| PGM1 | | | DENV | 40-60k | VOD | 2013-09-02 | PL | NORM | SRV-02 | A+ | 12 | 1 |
| PGM1 | | | DENV | 40-60k | VOD | 2013-09-02 | F1 | NORM | SRV-02 | A+ | 13 | 1 |
| PGM1 | | | DENV | 40-60k | VOD | 2013-09-02 | F1 | NORM | SRV-02 | A+ | 14 | 1 |
| PGM1 | | | DENV | 40-60k | VOD | 2013-09-02 | F1 | NORM | SRV-02 | A+ | 15 | 1 |
| PGM1 | | | DENV | 40-60k | VOD | 2013-09-02 | F1 | NORM | SRV-02 | A+ | 16 | 1 |
| PGM1 | | | DENV | 40-60k | VOD | 2013-09-02 | PL | NORM | SRV-02 | A+ | 17 | 1 |
| PGM1 | | | DENV | 40-60k | VOD | 2013-09-02 | PL | NORM | SRV-02 | A+ | 18 | 1 |
| PGM1 | | | DENV | 40-60k | VOD | 2013-09-02 | PL | NORM | SRV-02 | A+ | 19 | 1 |

The record set for VOD: Viewer group 1 House H11 and H12 are not included to save space.

The record set for VOD: Viewer group 2 House H13 and H14 and H15 are not included to save space.

FIG. 5A

Summary Information

| Specification Name: | Aggregated Sessionized Linear Viewing Activity (LVA) File 220 |
|---|---|
| Record description: | The Aggregated Sessionized Linear Viewing Activity (LVA) File contains aggregated video program viewing activity from the Sessionized Linear Viewing which has been aggregated by the MapReduce Aggregation Engine 200. |

FIG. 5B
Data Structure

|  | NAME (1600) | TYPE (1602) | SIZE (1604) | DESCRIPTION (1606) |
|---|---|---|---|---|
| 1610~ | PROGRAM_INFO | CHAR | 12 | The Program Information field. See 1010 for definition. |
| 1620~ | PROGRAM_AIRING_INFO | CHAR | 12 | The Program Airing Information field. See 1020 for definition. |
| 1630~ | CHANNEL_INFO | CHAR | 40 | The Channel Information field. See 1030 for definition. |
| 1640~ | HOUSE_INFO | CHAR | 40 | The House Information field. See 1040 for definition. Not included in Sample Data. |
| 1650~ | DEVICE_INFO | CHAR | 40 | The Device Information field. See 1050 for definition. Not included in Sample Data. |
| 1660~ | VIEWER_INFO | CHAR | 40 | The Viewer Information field. See 1060 for definition. Not included in Sample Data. |
| 1670~ | GEOGRAPHIC_INFO | CHAR | 40 | The Geographic Information field. See 1070 for definition. |
| 1680~ | DEMOGRAPHIC_INFO | CHAR | 40 | The Demographic Information field. See 1080 for definition. Not included in Sample Data. |
| 1690~ | VIEWING_TYPE | CHAR | 3 | The Viewing Type. See 1090 for definition. |

FIG. 5B - Data Structure - Continued

| | | | | |
|---|---|---|---|---|
| 1700~ | VIEWING_DATE | DATE | 8 | The Viewing Date.<br>See 1100 for definition. |
| 1710~ | PLAYBACK_MODE | CHAR | 2 | The Playback Mode.<br>See 1110 for definition. |
| 1720~ | PLAYBACK_POSITION | Number | 5 | The Playback Position.<br>See 1380 for definition. |
| 1730~ | PLAYBACK_MODE_COUNT | Number | 8 | The Playback Mode Count records the number of devices that viewed the part of the content represented in PLAYBACK_POSITION 1720 in the mode shown in PLAYBACK_MODE 1710. |
| 1750~ | PRESENTATION_INFO | CHAR | 4 | The Presentation Information.<br>See 1150 for definition.<br>Not included in Sample Data. |
| 1760~ | VIDEO_SERVER_INFO | CHAR | 40 | The Video Server Information.<br>See 1160 for definition.<br>Not included in Sample Data. |
| 1770~ | SYSTEM_HEALTH_INFO | CHAR | 40 | The System Health Information.<br>See 1170 for definition.<br>Not included in Sample Data. |

FIG. 5C - Sample Data

Linear: Program 1 Airing 1

Linear: Program 1 Airing 1, Play Mode Viewing

| PRO-GRAM | PROGRAM AIRING | CHAN-NEL INFO | GEO-GRAPHIC INFO | | VIEWING TYPE | VIEWING DATE | PLAYBACK MODE | PLAY-BACK POSIT-ION | PLAYBACK MODE COUNT |
|---|---|---|---|---|---|---|---|---|---|
| 1610 | 1620 | 1630 | 1670 | | 1690 | 1700 | 1710 | 1720 | 1730 |
| PGM1 | PGM1AIR1 | HIST | DENV | | LIN | 2013-08-31 | PL | 0 | 1 |
| PGM1 | PGM1AIR1 | HIST | DENV | | LIN | 2013-08-31 | PL | 1 | 1 |
| PGM1 | PGM1AIR1 | HIST | DENV | | LIN | 2013-08-31 | PL | 2 | 2 |
| PGM1 | PGM1AIR1 | HIST | DENV | | LIN | 2013-08-31 | PL | 3 | 3 |
| PGM1 | PGM1AIR1 | HIST | DENV | | LIN | 2013-08-31 | PL | 4 | 3 |
| PGM1 | PGM1AIR1 | HIST | DENV | | LIN | 2013-08-31 | PL | 5 | 3 |
| PGM1 | PGM1AIR1 | HIST | DENV | | LIN | 2013-08-31 | PL | 6 | 2 |
| PGM1 | PGM1AIR1 | HIST | DENV | | LIN | 2013-08-31 | PL | 7 | 1 |
| PGM1 | PGM1AIR1 | HIST | DENV | | LIN | 2013-08-31 | PL | 12 | 1 |
| PGM1 | PGM1AIR1 | HIST | DENV | | LIN | 2013-08-31 | PL | 13 | 2 |
| PGM1 | PGM1AIR1 | HIST | DENV | | LIN | 2013-08-31 | PL | 14 | 2 |
| PGM1 | PGM1AIR1 | HIST | DENV | | LIN | 2013-08-31 | PL | 15 | 2 |
| PGM1 | PGM1AIR1 | HIST | DENV | | LIN | 2013-08-31 | PL | 16 | 1 |
| PGM1 | PGM1AIR1 | HIST | DENV | | LIN | 2013-08-31 | PL | 17 | 2 |
| PGM1 | PGM1AIR1 | HIST | DENV | | LIN | 2013-08-31 | PL | 18 | 2 |
| PGM1 | PGM1AIR1 | HIST | DENV | | LIN | 2013-08-31 | PL | 19 | 3 |
| | | | | | | TOTAL | | | 31 |

FIG. 5D Linear: Program 1 Airing 1, Forward 1x Mode Viewing

| PRO-GRAM | PROGRAM AIRING | CHAN-NEL INFO | GEO-GRAPHIC INFO | | VIEWING TYPE | VIEWING DATE | PLAYBACK MODE | PLAY-BACK POSIT-ION | PLAYBACK MODE COUNT |
|---|---|---|---|---|---|---|---|---|---|
| 1610 | 1620 | 1630 | 1670 | | 1690 | 1700 | 1710 | 1720 | 1730 |
| PGM1 | PGM1AIR1 | HIST | DENV | | LIN | 2013-08-31 | F1 | 6 | 1 |
| PGM1 | PGM1AIR1 | HIST | DENV | | LIN | 2013-08-31 | F1 | 7 | 1 |
| PGM1 | PGM1AIR1 | HIST | DENV | | LIN | 2013-08-31 | F1 | 8 | 2 |
| PGM1 | PGM1AIR1 | HIST | DENV | | LIN | 2013-08-31 | F1 | 9 | 2 |
| PGM1 | PGM1AIR1 | HIST | DENV | | LIN | 2013-08-31 | F1 | 10 | 2 |
| PGM1 | PGM1AIR1 | HIST | DENV | | LIN | 2013-08-31 | F1 | 11 | 2 |
| PGM1 | PGM1AIR1 | HIST | DENV | | LIN | 2013-08-31 | F1 | 12 | 1 |
| PGM1 | PGM1AIR1 | HIST | DENV | | LIN | 2013-08-31 | F1 | 16 | 1 |
| PGM1 | PGM1AIR1 | HIST | DENV | | LIN | 2013-08-31 | F1 | 17 | 1 |
| PGM1 | PGM1AIR1 | HIST | DENV | | LIN | 2013-08-31 | F1 | 18 | 1 |
| | | | | | | TOTAL | | | 14 |

FIG. 5E - Sample Data - Continued

Linear: Program 1 Airing 1, Forward 2x Mode Viewing

| PRO-GRAM | PROGRAM AIRING | CHAN-NEL INFO | GEO-GRAPHIC INFO | | VIEWING TYPE | VIEWING DATE | PLAYBACK MODE | PLAY-BACK POSIT-ION | PLAYBACK MODE COUNT |
|---|---|---|---|---|---|---|---|---|---|
| 1610 | 1620 | 1630 | 1670 | | 1690 | 1700 | 1710 | 1720 | 1730 |
| PGM1 | PGM1AIR1 | HIST | DENV | | LIN | 2013-08-31 | F2 | 7 | 1 |
| PGM1 | PGM1AIR1 | HIST | DENV | | LIN | 2013-08-31 | F2 | 8 | 1 |
| PGM1 | PGM1AIR1 | HIST | DENV | | LIN | 2013-08-31 | F2 | 9 | 1 |
| PGM1 | PGM1AIR1 | HIST | DENV | | LIN | 2013-08-31 | F2 | 10 | 1 |
| PGM1 | PGM1AIR1 | HIST | DENV | | LIN | 2013-08-31 | F2 | 11 | 1 |
| PGM1 | PGM1AIR1 | HIST | DENV | | LIN | 2013-08-31 | F2 | 12 | 1 |
| PGM1 | PGM1AIR1 | HIST | DENV | | LIN | 2013-08-31 | F2 | 13 | 1 |
| PGM1 | PGM1AIR1 | HIST | DENV | | LIN | 2013-08-31 | F2 | 14 | 1 |
| PGM1 | PGM1AIR1 | HIST | DENV | | LIN | 2013-08-31 | F2 | 15 | 1 |
| PGM1 | PGM1AIR1 | HIST | DENV | | LIN | 2013-08-31 | F2 | 16 | 1 |
| | | | | | | TOTAL | | | 10 |

FIG. 5F Linear: Program 1 Airing 1, Play Mode Viewing

| PRO-GRAM | PROGRAM AIRING | CHAN-NEL INFO | GEO-GRAPHIC INFO | | VIEWING TYPE | VIEWING DATE | PLAYBACK MODE | PLAY-BACK POSIT-ION | PLAYBACK MODE COUNT |
|---|---|---|---|---|---|---|---|---|---|
| 1610 | 1620 | 1630 | 1670 | | 1690 | 1700 | 1710 | 1720 | 1730 |
| PGM1 | PGM1AIR2 | HIST | DENV | | LIN | 2013-09-01 | PL | 1 | 1 |
| PGM1 | PGM1AIR2 | HIST | DENV | | LIN | 2013-09-01 | PL | 2 | 1 |
| PGM1 | PGM1AIR2 | HIST | DENV | | LIN | 2013-09-01 | PL | 3 | 2 |
| PGM1 | PGM1AIR2 | HIST | DENV | | LIN | 2013-09-01 | PL | 4 | 4 |
| PGM1 | PGM1AIR2 | HIST | DENV | | LIN | 2013-09-01 | PL | 5 | 4 |
| PGM1 | PGM1AIR2 | HIST | DENV | | LIN | 2013-09-01 | PL | 6 | 4 |
| PGM1 | PGM1AIR2 | H24 | DENV | | LIN | 2013-09-01 | PL | 7 | 4 |
| PGM1 | PGM1AIR2 | HIST | DENV | | LIN | 2013-09-01 | PL | 8 | 3 |
| PGM1 | PGM1AIR2 | HIST | DENV | | LIN | 2013-09-01 | PL | 9 | 3 |
| PGM1 | PGM1AIR2 | HIST | DENV | | LIN | 2013-09-01 | PL | 10 | 3 |
| PGM1 | PGM1AIR2 | HIST | DENV | | LIN | 2013-09-01 | PL | 11 | 3 |
| PGM1 | PGM1AIR2 | HIST | DENV | | LIN | 2013-09-01 | PL | 12 | 3 |
| PGM1 | PGM1AIR2 | HIST | DENV | | LIN | 2013-09-01 | PL | 13 | 2 |
| PGM1 | PGM1AIR2 | HIST | DENV | | LIN | 2013-09-01 | PL | 14 | 2 |
| PGM1 | PGM1AIR2 | HIST | DENV | | LIN | 2013-09-01 | PL | 15 | 2 |
| PGM1 | PGM1AIR2 | HIST | DENV | | LIN | 2013-09-01 | PL | 16 | 1 |
| PGM1 | PGM1AIR2 | HIST | DENV | | LIN | 2013-09-01 | PL | 17 | 1 |
| | | | | | | | | TOTAL | 43 |

FIG. 5G - Sample Data - Continued

Linear: Program 1 Airing 2, Forward 1x Mode Viewing

| PRO-GRAM | PROGRAM AIRING | CHAN-NEL INFO | GEO-GRAPHIC INFO | | VIEWING TYPE | VIEWING DATE | PLAYBACK MODE | PLAY-BACK POSIT-ION | PLAYBACK MODE COUNT |
|---|---|---|---|---|---|---|---|---|---|
| 1610 | 1620 | 1630 | 1670 | | 1690 | 1700 | 1710 | 1720 | 1730 |
| PGM1 | PGM1AIR2 | HIST | DENV | | LIN | 2013-09-01 | F1 | 8 | 1 |
| PGM1 | PGM1AIR2 | HIST | DENV | | LIN | 2013-09-01 | F1 | 9 | 1 |
| PGM1 | PGM1AIR2 | HIST | DENV | | LIN | 2013-09-01 | F1 | 10 | 1 |
| PGM1 | PGM1AIR2 | HIST | DENV | | LIN | 2013-09-01 | F1 | 11 | 1 |
| PGM1 | PGM1AIR2 | HIST | DENV | | LIN | 2013-09-01 | F1 | 12 | 1 |

TOTAL 5

FIG. 5H Linear: Program 1 Airing 2, Forward 2x Mode Viewing

| PRO-GRAM | PROGRAM AIRING | CHAN-NEL INFO | GEO-GRAPHIC INFO | | VIEWING TYPE | VIEWING DATE | PLAYBACK MODE | PLAY-BACK POSIT-ION | PLAYBACK MODE COUNT |
|---|---|---|---|---|---|---|---|---|---|
| 1610 | 1620 | 1630 | 1670 | | 1690 | 1700 | 1710 | 1720 | 1730 |
| PGM1 | PGM1AIR2 | HIST | DENV | | LIN | 2013-09-01 | F2 | 13 | 1 |
| PGM1 | PGM1AIR2 | HIST | DENV | | LIN | 2013-09-01 | F2 | 14 | 1 |
| PGM1 | PGM1AIR2 | HIST | DENV | | LIN | 2013-09-01 | F2 | 15 | 1 |
| PGM1 | PGM1AIR2 | HIST | DENV | | LIN | 2013-09-01 | F2 | 16 | 1 |

TOTAL 4

FIG. 5I Linear: Program 1 Airing 2, Reverse 1x Mode Viewing

| PRO-GRAM | PROGRAM AIRING | CHAN-NEL INFO | GEO-GRAPHIC INFO | | VIEWING TYPE | VIEWING DATE | PLAYBACK MODE | PLAY-BACK POSIT-ION | PLAYBACK MODE COUNT |
|---|---|---|---|---|---|---|---|---|---|
| 1610 | 1620 | 1630 | 1670 | | 1690 | 1700 | 1710 | 1720 | 1730 |
| PGM1 | PGM1AIR2 | HIST | DENV | | LIN | 2013-09-01 | R1 | 3 | 1 |
| PGM1 | PGM1AIR2 | HIST | DENV | | LIN | 2013-09-01 | R1 | 4 | 1 |
| PGM1 | PGM1AIR2 | HIST | DENV | | LIN | 2013-09-01 | R1 | 5 | 1 |
| PGM1 | PGM1AIR2 | HIST | DENV | | LIN | 2013-09-01 | R1 | 6 | 1 |
| PGM1 | PGM1AIR2 | H24 | DENV | | LIN | 2013-09-01 | R1 | 7 | 2 |
| PGM1 | PGM1AIR2 | HIST | DENV | | LIN | 2013-09-01 | R1 | 8 | 2 |
| PGM1 | PGM1AIR2 | HIST | DENV | | LIN | 2013-09-01 | R1 | 9 | 2 |
| PGM1 | PGM1AIR2 | HIST | DENV | | LIN | 2013-09-01 | R1 | 10 | 2 |
| PGM1 | PGM1AIR2 | HIST | DENV | | LIN | 2013-09-01 | R1 | 11 | 2 |
| PGM1 | PGM1AIR2 | HIST | DENV | | LIN | 2013-09-01 | R1 | 12 | 1 |
| PGM1 | PGM1AIR2 | HIST | DENV | | LIN | 2013-09-01 | R1 | 13 | 1 |
| PGM1 | PGM1AIR2 | HIST | DENV | | LIN | 2013-09-01 | R1 | 14 | 1 |
| PGM1 | PGM1AIR2 | HIST | DENV | | LIN | 2013-09-01 | R1 | 15 | 1 |

TOTAL 18

FIG. 5J - Sample Data - Continued

Linear: Program 1 Airing 2, Reverse 2x Mode Viewing

| PRO-GRAM | PROGRAM AIRING | CHAN-NEL INFO | GEO-GRAPHIC INFO | | VIEWING TYPE | VIEWING DATE | PLAYBACK MODE | PLAY-BACK POSIT-ION | PLAYBACK MODE COUNT |
|---|---|---|---|---|---|---|---|---|---|
| 1610 | 1620 | 1630 | 1670 | | 1690 | 1700 | 1710 | 1720 | 1730 |
| PGM1 | PGM1AIR2 | HIST | DENV | | LIN | 2013-09-01 | R2 | 3 | 1 |
| PGM1 | PGM1AIR2 | HIST | DENV | | LIN | 2013-09-01 | R2 | 4 | 1 |
| PGM1 | PGM1AIR2 | HIST | DENV | | LIN | 2013-09-01 | R2 | 5 | 1 |
| PGM1 | PGM1AIR2 | HIST | DENV | | LIN | 2013-09-01 | R2 | 6 | 1 |

TOTAL 4

FIG. 5K - Linear Program 1 Airing 1 and Linear Program 1 Airing 2 Combined, Play Mode

Note: Because this combines across multiple program airings and viewing dates, the program airing is blank and the viewing date is blank.

| PRO-GRAM | | CHAN-NEL INFO | GEO-GRAPHIC INFO | | VIEWING TYPE | VIEWING DATE | PLAYBACK MODE | PLAY-BACK POSIT-ION | PLAYBACK MODE COUNT |
|---|---|---|---|---|---|---|---|---|---|
| 1610 | 1620 | 1630 | 1670 | | 1690 | 1700 | 1710 | 1720 | 1730 |
| PGM1 | | HIST | DENV | | LIN | | PL | 0 | 1 |
| PGM1 | | HIST | DENV | | LIN | | PL | 1 | 2 |
| PGM1 | | HIST | DENV | | LIN | | PL | 2 | 3 |
| PGM1 | | HIST | DENV | | LIN | | PL | 3 | 5 |
| PGM1 | | HIST | DENV | | LIN | | PL | 4 | 7 |
| PGM1 | | HIST | DENV | | LIN | | PL | 5 | 7 |
| PGM1 | | HIST | DENV | | LIN | | PL | 6 | 6 |
| PGM1 | | HIST | DENV | | LIN | | PL | 7 | 5 |
| PGM1 | | HIST | DENV | | LIN | | PL | 8 | 3 |
| PGM1 | | HIST | DENV | | LIN | | PL | 9 | 3 |
| PGM1 | | HIST | DENV | | LIN | | PL | 10 | 3 |
| PGM1 | | HIST | DENV | | LIN | | PL | 11 | 3 |
| PGM1 | | HIST | DENV | | LIN | | PL | 12 | 4 |
| PGM1 | | HIST | DENV | | LIN | | PL | 13 | 4 |
| PGM1 | | HIST | DENV | | LIN | | PL | 14 | 4 |
| PGM1 | | HIST | DENV | | LIN | | PL | 15 | 4 |
| PGM1 | | HIST | DENV | | LIN | | PL | 16 | 2 |
| PGM1 | | HIST | DENV | | LIN | | PL | 17 | 3 |
| PGM1 | | HIST | DENV | | LIN | | PL | 18 | 2 |
| PGM1 | | HIST | DENV | | LIN | | PL | 19 | 3 |

TOTAL 74

FIG. 5L - Sample Data - Continued

Linear Program 1 Airing 1 and Linear Program 1 Airing 2 Combined, Forward 1x

| PRO-GRAM | | CHAN-NEL INFO | GEO-GRAPHIC INFO | | VIEWING TYPE | VIEWING DATE | PLAYBACK MODE | PLAY-BACK POSIT-ION | PLAYBACK MODE COUNT |
|---|---|---|---|---|---|---|---|---|---|
| 1610 | 1620 | 1630 | 1670 | | 1690 | 1700 | 1710 | 1720 | 1730 |
| PGM1 | | HIST | DENV | | LIN | | F1 | 6 | 1 |
| PGM1 | | HIST | DENV | | LIN | | F1 | 7 | 1 |
| PGM1 | | HIST | DENV | | LIN | | F1 | 8 | 3 |
| PGM1 | | HIST | DENV | | LIN | | F1 | 9 | 3 |
| PGM1 | | HIST | DENV | | LIN | | F1 | 10 | 3 |
| PGM1 | | HIST | DENV | | LIN | | F1 | 11 | 3 |
| PGM1 | | HIST | DENV | | LIN | | F1 | 12 | 2 |
| PGM1 | | HIST | DENV | | LIN | | F1 | 16 | 1 |
| PGM1 | | HIST | DENV | | LIN | | F1 | 17 | 1 |
| PGM1 | | HIST | DENV | | LIN | | F1 | 18 | 1 |
| | | | | | | | | TOTAL | 19 |

FIG. 5M - Linear Program Airing 1 and Linear Program Airing 2 Combined, Forward 2x

| PRO-GRAM | | CHAN-NEL INFO | GEO-GRAPHIC INFO | | VIEWING TYPE | VIEWING DATE | PLAYBACK MODE | PLAY-BACK POSIT-ION | PLAYBACK MODE COUNT |
|---|---|---|---|---|---|---|---|---|---|
| 1610 | 1620 | 1630 | 1670 | | 1690 | 1700 | 1710 | 1720 | 1730 |
| PGM1 | | HIST | DENV | | LIN | | F2 | 7 | 1 |
| PGM1 | | HIST | DENV | | LIN | | F2 | 8 | 1 |
| PGM1 | | HIST | DENV | | LIN | | F2 | 9 | 1 |
| PGM1 | | HIST | DENV | | LIN | | F2 | 10 | 1 |
| PGM1 | | HIST | DENV | | LIN | | F2 | 11 | 1 |
| PGM1 | | HIST | DENV | | LIN | | F2 | 12 | 1 |
| PGM1 | | HIST | DENV | | LIN | | F2 | 13 | 2 |
| PGM1 | | HIST | DENV | | LIN | | F2 | 14 | 2 |
| PGM1 | | HIST | DENV | | LIN | | F2 | 15 | 2 |
| PGM1 | | HIST | DENV | | LIN | | F2 | 16 | 2 |
| | | | | | | | | TOTAL | 14 |

FIG. 5N - Sample Data - Continued

Linear Program 1 Airing 1 and Linear Program 1 Airing 2 Combined, Reverse 1x

| PRO-GRAM | | CHAN-NEL INFO | GEO-GRAPHIC INFO | | VIEWING TYPE | VIEWING DATE | PLAYBACK MODE | PLAY-BACK POSIT-ION | PLAYBACK MODE COUNT |
|---|---|---|---|---|---|---|---|---|---|
| 1610 | 1620 | 1630 | 1670 | | 1690 | 1700 | 1710 | 1720 | 1730 |
| PGM1 | | HIST | DENV | | LIN | | R1 | 3 | 1 |
| PGM1 | | HIST | DENV | | LIN | | R1 | 4 | 1 |
| PGM1 | | HIST | DENV | | LIN | | R1 | 5 | 1 |
| PGM1 | | HIST | DENV | | LIN | | R1 | 6 | 1 |
| PGM1 | | HIST | DENV | | LIN | | R1 | 7 | 2 |
| PGM1 | | HIST | DENV | | LIN | | R1 | 8 | 2 |
| PGM1 | | HIST | DENV | | LIN | | R1 | 9 | 2 |
| PGM1 | | HIST | DENV | | LIN | | R1 | 10 | 2 |
| PGM1 | | HIST | DENV | | LIN | | R1 | 11 | 2 |
| PGM1 | | HIST | DENV | | LIN | | R1 | 12 | 1 |
| PGM1 | | HIST | DENV | | LIN | | R1 | 13 | 1 |
| PGM1 | | HIST | DENV | | LIN | | R1 | 14 | 1 |
| PGM1 | | HIST | DENV | | LIN | | R1 | 15 | 1 |
| | | | | | | | | TOTAL | 18 |

FIG. 5O - Linear Program Airing 1 and Linear Program Airing 2 Combined, Reverse 2x

| PRO-GRAM | | CHAN-NEL INFO | GEO-GRAPHIC INFO | | VIEWING TYPE | VIEWING DATE | PLAYBACK MODE | PLAY-BACK POSIT-ION | PLAYBACK MODE COUNT |
|---|---|---|---|---|---|---|---|---|---|
| 1610 | 1620 | 1630 | 1670 | | 1690 | 1700 | 1710 | 1720 | 1730 |
| PGM1 | | HIST | DENV | | LIN | | R2 | 3 | 1 |
| PGM1 | | HIST | DENV | | LIN | | R2 | 4 | 1 |
| PGM1 | | HIST | DENV | | LIN | | R2 | 5 | 1 |
| PGM1 | | HIST | DENV | | LIN | | R2 | 6 | 1 |
| | | | | | | | | TOTAL | 4 |

FIG. 6A

Summary Information

| | |
|---|---|
| Specification Name: | Aggregated DVR Viewing Activity (DVR) File 230 |
| Record description: | The Aggregated Digital Video Recorder Viewing Activity (DVR) File contains aggregated video program viewing activity from the Digital Video Recorder Viewing which has been aggregated by the MapReduce Aggregation Engine 200.<br><br>This record provides second-by-second viewing activity for video program viewing done using a digital video recorder. |

FIG. 6B
Data Structure

|  | NAME (1800) | TYPE (1802) | SIZE (1804) | DESCRIPTION (1806) |
|---|---|---|---|---|
| 1810~ | PROGRAM_INFO | CHAR | 12 | The Program Information field.<br>See 1010 for definition. |
| 1820~ | PROGRAM_AIRING_INFO | CHAR | 12 | The Program Airing Information field.<br>See 1020 for definition. |
| 1830~ | CHANNEL_INFO | CHAR | 40 | The Channel Information field.<br>See 1030 for definition. |
| 1840~ | HOUSE_INFO | CHAR | 40 | The House Information field.<br>See 1040 for definition.<br>Not included in Sample Data |
| 1850~ | DEVICE_INFO | CHAR | 40 | The Device Information field.<br>See 1050 for definition.<br>Not included in Sample Data |
| 1860~ | VIEWER_INFO | CHAR | 40 | The Viewer Information field.<br>See 1060 for definition.<br>Not included in Sample Data |
| 1870~ | GEOGRAPHIC_INFO | CHAR | 40 | The Geographic Information field.<br>See 1070 for definition. |
| 1880~ | DEMOGRAPHIC_INFO | CHAR | 40 | The Demographic Information field.<br>See 1080 for definition. |
| 1890~ | VIEWING_TYPE | CHAR | 3 | The Viewing Type.<br>See 1090 for definition. |

FIG. 6C - Data Structure - Continued

| | | | | |
|---|---|---|---|---|
| 1900~ | VIEWING_DATE | DATE | 8 | The Viewing Date.<br>See 1100 for definition. |
| 1910~ | PLAYBACK_MODE | CHAR | 2 | The Playback Mode.<br>See 1110 for definition. |
| 1920~ | PLAYBACK_POSITION | Number | 5 | The Playback Position.<br>See 1380 for definition. |
| 1930~ | PLAYBACK_MODE_COUNT | Number | 8 | The Playback Mode Count.<br>See 1730 for definition. |
| 1950~ | PRESENTATION_INFO | CHAR | 4 | The Presentation Information.<br>See 1150 for definition.<br>Not included in Sample Data. |
| 1960~ | VIDEO_SERVER_INFO | CHAR | 40 | The Video Server Information.<br>See 1160 for definition.<br>Not included in Sample Data. |
| 1970~ | SYSTEM_HEALTH_INFO | CHAR | 40 | The System Health Information.<br>See 1170 for definition.<br>Not included in Sample Data. |

FIG. 6C - Sample Data - Continued

DVR: Program 1 Airing 1, Play Mode Viewing

| PRO- GRAM | PROGRAM AIRING | CHAN- NEL INFO | GEO- GRAPHIC INFO | | VIEWING TYPE | VIEWING DATE | PLAYBACK MODE | PLAY- BACK POSIT- ION | PLAYBACK MODE COUNT |
|---|---|---|---|---|---|---|---|---|---|
| 1810 | 1820 | 1830 | 1870 | | 1890 | 1900 | 1910 | 1920 | 1930 |
| PGM1 | PGM1AIR1 | HIST | DENV | | DVR | 2013-09-01 | PL | 0 | 4 |
| PGM1 | PGM1AIR1 | HIST | DENV | | DVR | 2013-09-01 | PL | 1 | 4 |
| PGM1 | PGM1AIR1 | HIST | DENV | | DVR | 2013-09-01 | PL | 2 | 4 |
| PGM1 | PGM1AIR1 | HIST | DENV | | DVR | 2013-09-01 | PL | 3 | 4 |
| PGM1 | PGM1AIR1 | HIST | DENV | | DVR | 2013-09-01 | PL | 4 | 3 |
| PGM1 | PGM1AIR1 | HIST | DENV | | DVR | 2013-09-01 | PL | 5 | 3 |
| PGM1 | PGM1AIR1 | HIST | DENV | | DVR | 2013-09-01 | PL | 6 | 2 |
| PGM1 | PGM1AIR1 | HIST | DENV | | DVR | 2013-09-01 | PL | 7 | 2 |
| PGM1 | PGM1AIR1 | HIST | DENV | | DVR | 2013-09-01 | PL | 8 | 1 |
| PGM1 | PGM1AIR1 | HIST | DENV | | DVR | 2013-09-01 | PL | 9 | 1 |
| PGM1 | PGM1AIR1 | HIST | DENV | | DVR | 2013-09-01 | PL | 10 | 2 |
| PGM1 | PGM1AIR1 | HIST | DENV | | DVR | 2013-09-01 | PL | 11 | 2 |
| PGM1 | PGM1AIR1 | HIST | DENV | | DVR | 2013-09-01 | PL | 12 | 2 |
| PGM1 | PGM1AIR1 | HIST | DENV | | DVR | 2013-09-01 | PL | 13 | 2 |
| PGM1 | PGM1AIR1 | HIST | DENV | | DVR | 2013-09-01 | PL | 14 | 1 |
| PGM1 | PGM1AIR1 | HIST | DENV | | DVR | 2013-09-01 | PL | 15 | 2 |
| PGM1 | PGM1AIR1 | HIST | DENV | | DVR | 2013-09-01 | PL | 16 | 2 |
| PGM1 | PGM1AIR1 | HIST | DENV | | DVR | 2013-09-01 | PL | 17 | 4 |
| PGM1 | PGM1AIR1 | HIST | DENV | | DVR | 2013-09-01 | PL | 18 | 4 |
| PGM1 | PGM1AIR1 | HIST | DENV | | DVR | 2013-09-01 | PL | 19 | 4 |
| | | | | | | | TOTAL | | 53 |

Note: DVR: Program Airing 1 F1, F2, R1, R2 Mode Viewing not shown to conserve space. The pattern follows that shown for the Linear Viewing.

FIG. 6D - Sample Data - Continued
DVR: Program 1 Airing 2, Play Mode Viewing

| PRO-GRAM | PROGRAM AIRING | CHAN-NEL INFO | GEO-GRAPHIC INFO | | VIEWING TYPE | VIEWING DATE | PLAYBACK MODE | PLAY-BACK POSIT-ION | PLAYBACK MODE COUNT |
|---|---|---|---|---|---|---|---|---|---|
| 1810 | 1820 | 1830 | 1870 | | 1890 | 1900 | 1910 | 1920 | 1930 |
| PGM1 | PGM1AIR2 | HIST | DENV | | DVR | 2013-09-01 | PL | 0 | |
| PGM1 | PGM1AIR2 | HIST | DENV | | DVR | 2013-09-01 | PL | 1 | |
| PGM1 | PGM1AIR2 | HIST | DENV | | DVR | 2013-09-01 | PL | 2 | 1 |
| PGM1 | PGM1AIR2 | HIST | DENV | | DVR | 2013-09-01 | PL | 3 | 2 |
| PGM1 | PGM1AIR2 | HIST | DENV | | DVR | 2013-09-01 | PL | 4 | 3 |
| PGM1 | PGM1AIR2 | HIST | DENV | | DVR | 2013-09-01 | PL | 5 | 4 |
| PGM1 | PGM1AIR2 | HIST | DENV | | DVR | 2013-09-01 | PL | 6 | 3 |
| PGM1 | PGM1AIR2 | HIST | DENV | | DVR | 2013-09-01 | PL | 7 | 3 |
| PGM1 | PGM1AIR2 | HIST | DENV | | DVR | 2013-09-01 | PL | 8 | 4 |
| PGM1 | PGM1AIR2 | HIST | DENV | | DVR | 2013-09-01 | PL | 9 | 3 |
| PGM1 | PGM1AIR2 | HIST | DENV | | DVR | 2013-09-01 | PL | 10 | 3 |
| PGM1 | PGM1AIR2 | HIST | DENV | | DVR | 2013-09-01 | PL | 11 | 3 |
| PGM1 | PGM1AIR2 | HIST | DENV | | DVR | 2013-09-01 | PL | 12 | 3 |
| PGM1 | PGM1AIR2 | HIST | DENV | | DVR | 2013-09-01 | PL | 13 | 3 |
| PGM1 | PGM1AIR2 | HIST | DENV | | DVR | 2013-09-01 | PL | 14 | 3 |
| PGM1 | PGM1AIR2 | HIST | DENV | | DVR | 2013-09-01 | PL | 15 | 3 |
| PGM1 | PGM1AIR2 | HIST | DENV | | DVR | 2013-09-01 | PL | 16 | 3 |
| PGM1 | PGM1AIR2 | HIST | DENV | | DVR | 2013-09-01 | PL | 17 | 2 |
| PGM1 | PGM1AIR2 | HIST | DENV | | DVR | 2013-09-01 | PL | 18 | 2 |
| PGM1 | PGM1AIR2 | HIST | DENV | | DVR | 2013-09-01 | PL | 19 | 1 |
| | | | | | | | TOTAL | | 49 |

Note: DVR: Program Airing 2 F1, F2, R1, R2 Mode Viewing not shown to conserve space.

FIG. 6E
DVR: Program 1 Airing 1 and 2, Combined Play Mode Viewing

| PRO-GRAM | | CHAN-NEL INFO | GEO-GRAPHIC INFO | | VIEWING TYPE | VIEWING DATE | PLAYBACK MODE | PLAY-BACK POSIT-ION | PLAYBACK MODE COUNT |
|---|---|---|---|---|---|---|---|---|---|
| 1810 | 1820 | 1830 | 1870 | | 1890 | 1900 | 1910 | 1920 | 1930 |
| PGM1 | | HIST | DENV | | DVR | 2013-09-01 | | 0 | 4 |
| PGM1 | | HIST | DENV | | DVR | 2013-09-01 | | 1 | 4 |
| PGM1 | | HIST | DENV | | DVR | 2013-09-01 | | 2 | 5 |
| PGM1 | | HIST | DENV | | DVR | 2013-09-01 | | 3 | 6 |
| PGM1 | | HIST | DENV | | DVR | 2013-09-01 | | 4 | 6 |
| PGM1 | | HIST | DENV | | DVR | 2013-09-01 | | 5 | 7 |
| PGM1 | | HIST | DENV | | DVR | 2013-09-01 | | 6 | 5 |
| PGM1 | | HIST | DENV | | DVR | 2013-09-01 | | 7 | 5 |
| PGM1 | | HIST | DENV | | DVR | 2013-09-01 | | 8 | 5 |
| PGM1 | | HIST | DENV | | DVR | 2013-09-01 | | 9 | 4 |
| PGM1 | | HIST | DENV | | DVR | 2013-09-01 | | 10 | 5 |
| PGM1 | | HIST | DENV | | DVR | 2013-09-01 | | 11 | 5 |
| PGM1 | | HIST | DENV | | DVR | 2013-09-01 | | 12 | 5 |
| PGM1 | | HIST | DENV | | DVR | 2013-09-01 | | 13 | 5 |
| PGM1 | | HIST | DENV | | DVR | 2013-09-01 | | 14 | 4 |
| PGM1 | | HIST | DENV | | DVR | 2013-09-01 | | 15 | 5 |
| PGM1 | | HIST | DENV | | DVR | 2013-09-01 | | 16 | 5 |
| PGM1 | | HIST | DENV | | DVR | 2013-09-01 | | 17 | 6 |
| PGM1 | | HIST | DENV | | DVR | 2013-09-01 | | 18 | 6 |
| PGM1 | | HIST | DENV | | DVR | 2013-09-01 | | 19 | 5 |
| | | | | | | | TOTAL | | 102 |

Note: DVR: Program Airing 1 and 2, Combined F1, F2, R1, R2 Mode Viewing not shown to conserve space.

FIG. 7A

Summary Information

| Specification Name: | Aggregated VOD Viewing Activity (VOD) File 240 |
|---|---|
| Record description: | The Aggregated Video On Demand Viewing Activity (VOD) File contains aggregated video on demand viewing activity from the Video On Demand Viewing which has been aggregated by the MapReduce Aggregation Engine 200.<br><br>This record provides second-by-second viewing activity for video program viewing as a result of a video on demand lease. |

FIG. 7B
Data Structure

|  | NAME (2000) | TYPE (2002) | SIZE (2004) | DESCRIPTION (2006) |
|---|---|---|---|---|
| 2010~ | PROGRAM_INFO | CHAR | 12 | The Program Information field.<br>See 1010 for definition. |
| 2040~ | HOUSE_INFO | CHAR | 40 | The House Information field.<br>See 1040 for definition.<br>Not included in Sample Data. |
| 2050~ | DEVICE_INFO | CHAR | 40 | The Device Information field.<br>See 1050 for definition.<br>Not included in Sample Data. |
| 2060~ | VIEWER_INFO | CHAR | 40 | The Viewer Information field.<br>See 1060 for definition.<br>Not included in Sample Data. |
| 2070~ | GEOGRAPHIC_INFO | CHAR | 40 | The Geographic Information field.<br>See 1070 for definition. |
| 2080~ | DEMOGRAPHIC_INFO | CHAR | 40 | Not shown in sample data.<br>The Demographic Information field.<br>See 1080 for definition. |
| 2090~ | VIEWING_TYPE | CHAR | 3 | The Viewing Type.<br>See 1090 for definition. |
| 2100~ | VIEWING_DATE | DATE | 8 | The Viewing Date.<br>See 1100 for definition. |

FIG. 7B - Data Structure - Continued

| | | | | |
|---|---|---|---|---|
| 2110~ | PLAYBACK_MODE | CHAR | 2 | The Playback Mode.<br>See 1110 for definition. |
| 2120~ | PLAYBACK_POSITION | Number | 5 | The Playback Position.<br>See 1380 for definition. |
| 2130~ | PLAYBACK_MODE_COUNT | Number | 8 | The Playback Mode Count.<br>See 1730 for definition. |
| 2150~ | PRESENTATION_INFO | CHAR | 4 | The Presentation Information.<br>See 1150 for definition.<br>Not included in Sample Data. |
| 2160~ | VIDEO_SERVER_INFO | CHAR | 40 | The Video Server Information.<br>See 1160 for definition.<br>Not included in Sample Data. |
| 2170~ | SYSTEM_HEALTH_INFO | CHAR | 40 | The System Health Information.<br>See 1170 for definition.<br>Not included in Sample Data. |

FIG. 7C - Sample Data

VOD: VOD Program 1 (all qualifying VOD leases), Play Mode Viewing

| PRO-GRAM | GEO-GRAPHIC INFO | VIEWING TYPE | VIEWING_DATE | PLAYBACK MODE | PLAY-BACK POSIT-ION | PLAYBACK MODE COUNT |
|---|---|---|---|---|---|---|
| 2010 | 2070 | 2090 | 2100 | 2110 | 2120 | 2130 |
| PGM1 | DENV | VOD | 2013-09-02 | PL | 0 | 6 |
| PGM1 | DENV | VOD | 2013-09-02 | PL | 1 | 6 |
| PGM1 | DENV | VOD | 2013-09-02 | PL | 2 | 7 |
| PGM1 | DENV | VOD | 2013-09-02 | PL | 3 | 8 |
| PGM1 | DENV | VOD | 2013-09-02 | PL | 4 | 8 |
| PGM1 | DENV | VOD | 2013-09-02 | PL | 5 | 8 |
| PGM1 | DENV | VOD | 2013-09-02 | PL | 6 | 9 |
| PGM1 | DENV | VOD | 2013-09-02 | PL | 7 | 8 |
| PGM1 | DENV | VOD | 2013-09-02 | PL | 8 | 8 |
| PGM1 | DENV | VOD | 2013-09-02 | PL | 9 | 9 |
| PGM1 | DENV | VOD | 2013-09-02 | PL | 10 | 8 |
| PGM1 | DENV | VOD | 2013-09-02 | PL | 11 | 8 |
| PGM1 | DENV | VOD | 2013-09-02 | PL | 12 | 6 |
| PGM1 | DENV | VOD | 2013-09-02 | PL | 13 | 4 |
| PGM1 | DENV | VOD | 2013-09-02 | PL | 14 | 4 |
| PGM1 | DENV | VOD | 2013-09-02 | PL | 15 | 4 |
| PGM1 | DENV | VOD | 2013-09-02 | PL | 16 | 3 |
| PGM1 | DENV | VOD | 2013-09-02 | PL | 17 | 3 |
| PGM1 | DENV | VOD | 2013-09-02 | PL | 18 | 1 |
| PGM1 | DENV | VOD | 2013-09-02 | PL | 19 | 2 |
| | | | | TOTAL | | 120 |

Note: VOD: Program 1 F1, F2, R1, R2 Mode Viewing not shown to conserve space. The pattern follows that shown for the Linear Viewing.

FIG. 8A
Summary Information

| Specification Name: | Aggregated Video Program Viewing File 250 |
|---|---|
| Record description: | The Aggregated Video Program Viewing File contains aggregated video program viewing activity derived from sessionized linear viewing activity (LVA), digital video recording viewing activity (DVR), or video on demand viewing activity (VOD) where this viewing activity has been aggregated by the MapReduce Aggregation Engine 200.<br><br>This record provides aggregated video viewing activity summarized to the various fields shown in the record (Program, Geographic, Demographic, Playback Mode) for each second of the aggregation period. |

FIG. 8B
Data Structure

|  | NAME 2200 | TYPE 2202 | SIZE 2204 | DESCRIPTION 2206 |
|---|---|---|---|---|
| 2210~ | PROGRAM_INFO | CHAR | 12 | The Program Information field.<br>See 1010 for definition. |
| 2270~ | GEOGRAPHIC_INFO | CHAR | 40 | The Geographic Information field.<br>See 1070 for definition. |
| 2280~ | DEMOGRAPHIC_INFO | CHAR | 40 | Not shown in sample data.<br>The Demographic Information field.<br>See 1080 for definition. |
| 2310~ | PLAYBACK_MODE | CHAR | 2 | The Playback Mode.<br>See 1110 for definition. |
| 2320~ | PLAYBACK_POSITION | Number | 5 | The Playback Position.<br>See 1380 for definition. |
| 2330~ | PLAYBACK_MODE_COUNT | Number | 8 | The Playback Mode Count.<br>See 1730 for definition. |

FIG. 8C - Sample Data

LVA, DVR, and VOD Program 1 Combined, All Play Mode Viewing, across viewing type and viewing date, so those fields are not included.

| PROGRAM | GEOGRAPHIC INFO | PLAYBACK MODE | PLAYBACK POSITION | PLAYBACK MODE COUNT |
|---|---|---|---|---|
| 2210 | 2270 | 2310 | 2320 | 2330 |
| PGM1 | DENV | PL | 0 | 11 |
| PGM1 | DENV | PL | 1 | 12 |
| PGM1 | DENV | PL | 2 | 15 |
| PGM1 | DENV | PL | 3 | 19 |
| PGM1 | DENV | PL | 4 | 21 |
| PGM1 | DENV | PL | 5 | 22 |
| PGM1 | DENV | PL | 6 | 20 |
| PGM1 | DENV | PL | 7 | 18 |
| PGM1 | DENV | PL | 8 | 16 |
| PGM1 | DENV | PL | 9 | 16 |
| PGM1 | DENV | PL | 10 | 16 |
| PGM1 | DENV | PL | 11 | 16 |
| PGM1 | DENV | PL | 12 | 15 |
| PGM1 | DENV | PL | 13 | 13 |
| PGM1 | DENV | PL | 14 | 12 |
| PGM1 | DENV | PL | 15 | 13 |
| PGM1 | DENV | PL | 16 | 10 |
| PGM1 | DENV | PL | 17 | 12 |
| PGM1 | DENV | PL | 18 | 9 |
| PGM1 | DENV | PL | 19 | 10 |
| | | | TOTAL | 296 |

Note: Combined Program 1 F1, F2, R1, R2 Mode Viewing not shown to conserve space. The pattern follows that shown for the Linear Viewing.

MEASURING VIDEO-PROGRAM VIEWING

CROSS-REFERENCE TO RELATED APPLICATIONS

This application is a related to U.S. Pat. No. 8,365,212 B1 issued on Jan. 29, 2013 entitled "SYSTEM AND METHOD FOR ANALYZING HUMAN INTERACTION WITH ELECTRONIC DEVICES THAT ACCESS A COMPUTER SYSTEM THROUGH A NETWORK" by the present inventor which is incorporated by reference in its entirety but is not admitted to be prior art.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

This application is also related to U.S. Pat. No. 8,365,213 B1 issued on Jan. 29, 2013 entitled "SYSTEM AND METHOD FOR MEASURING TELEVISION ADVERTISING AND PROGRAM VIEWING AT A SECOND-BY-SECOND LEVEL AND FOR MEASURING EFFECTIVENESS OF TARGETED ADVERTISING" by the present inventor which is incorporated by reference in its entirety but is not admitted to be prior art.

This application is also related to the co-pending application U.S. application Ser. No. 13/360,704 filed on Jan. 28, 2012 entitled "SYSTEM AND METHOD FOR MEASURING LONGITUDINAL VIDEO ASSET VIEWING AT A SECOND-BY-SECOND LEVEL TO UNDERSTAND BEHAVIOR OF VIEWERS AS THEY INTERACT WITH VIDEO ASSET VIEWING DEVICES THAT ACCESS A COMPUTER SYSTEM THROUGH A NETWORK" by the present inventor which is incorporated by reference in its entirety but is not admitted to be prior art.

This application is also related to the co-pending application U.S. application Ser. No. 13/567,073 filed on Aug. 5, 2012 entitled "SYSTEM AND METHOD FOR MEASURING LINEAR, DVR, AND VOD VIDEO PROGRAM VIEWING AT A SECOND-BY-SECOND LEVEL TO UNDERSTAND BEHAVIOR OF VIEWERS AS THEY INTERACT WITH VIDEO ASSET VIEWING DEVICES DELIVERING CONTENT THROUGH A NETWORK" by the present inventor which is incorporated by reference in its entirety but is not admitted to be prior art.

This application is also related to the co-pending application U.S. application Ser. No. 13/740,199 filed on Jan. 13, 2013 entitled "SYSTEM AND METHOD FOR MEASURING DEMOGRAPHIC-BASED HOUSEHOLD ADVERTISING REACH; IMPRESSIONS, SHARE, HUT, RATING, AND CUMULATIVE AUDIENCE; AND VIDEO PROGRAM VIEWING, BASED ON SECOND-BY-SECOND HOUSE LEVEL VIEWING ACTIVITY, TO UNDERSTAND BEHAVIOR OF VIEWERS AS THEY INTERACT WITH VIDEO ASSET VIEWING DEVICES DELIVERING CONTENT THROUGH A NETWORK" by the present inventor which is incorporated by reference in its entirety but is not admitted to be prior art.

This application is also related to the co-pending application U.S. application Ser. No. 14/013,031 filed on Aug. 29, 2013 entitled "SYSTEM AND METHOD FOR USING THE HADOOP MAPREDUCE FRAMEWORK TO MEASURE VIDEO CONTENT VIEWING ON SECOND-BY-SECOND LEVEL TO UNDERSTAND BEHAVIOR OF VIEWERS AS THEY INTERACT WITH VIDEO ASSET VIEWING DEVICES DELIVERING CONTENT THROUGH A NETWORK" by the present inventor which is incorporated by reference in its entirety but is not admitted to be prior art.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND—PRIOR ART

I have not found any relevant prior art at the present time.

BACKGROUND INFORMATION

General Statement of Problem

With the ever increasing number of consumer choices for television viewing, it is important for advertisers, content producers, and service providers such as cable television and satellite television and internet protocol television companies to be able to accurately measure audience viewership. I have discussed this problem extensively in my prior applications. This application teaches how to analyze video viewing activity related to sessionized or program-based linear viewing, digital video recording playback viewing, and video on demand viewing using the Hadoop MapReduce distributed computing framework. The reader will readily recognize that video on demand encompasses a wide range of video content including, but not limited to, cable and/or satellite television video on demand, all variety of video content delivered electronically across a network, and online educational videos.

Existing Tools for Data Analysis

In my prior application U.S. application Ser. No. 13/567,073 filed on Aug. 5, 2012 I taught how to analyze sessionized or program-based linear viewing, digital video recording playback viewing, and video on demand viewing by loading the viewing activity data into arrays in the memory of a computer and then running algorithms against that data. In certain cases, an analyst may wish to use the Hadoop MapReduce distributed computing framework to analyze sessionized or program-based linear viewing, digital video recording playback viewing, and video on demand viewing. I have not identified any patents that teach how to use MapReduce to solve this problem.

SUMMARY

In accordance with one embodiment, I disclose a computer-implemented method of aggregating sessionized or program-based linear viewing, digital video recording playback viewing, and video on demand viewing using the Hadoop MapReduce distributed computing framework. This will allow an analyst to aggregate second-by-second video viewing activity for this kind of viewing. Once this data has been aggregated, it can be used in any number of downstream analytic processes to provide detailed information on customer viewing behavior which can be used to drive business decisions for service providers, advertisers, and content producers.

Advantages

By using the Hadoop MapReduce distributed computing framework to aggregate sessionized or program-based linear viewing, digital video recording playback viewing, and video on demand viewing, an analyst can harness the power of hundreds or even thousands of processors working in parallel to solve the problem of aggregating this video viewing activity data. This will allow an analyst to work with data sets of all sizes including extremely large data sets. The resulting files can be loaded to a relational database for various analytics similar to what I have taught in my other patent applications referenced previously. Additionally, the resulting files can be used in other Hadoop processes to correlate video viewing activity with other social media activity, with weather, with other programming content, and similar uses.

Definitions

The following are definitions that will aid in understanding one or more of the embodiments presented herein:

Aggregated Video viewing activity means any measurements or aggregations produced by the MapReduce distributed computing framework as it aggregates video program viewing detail records or any value calculated by a Data Analysis Program as part of this process.

Computer readable format means any data format that can be read by a computer program or a human being as necessary. Nonlimiting examples include:
(i) formatted text files,
(ii) pipe delimited text files,
(iii) data base tables,
(iv) Extensible Markup Language (XML) messages,
(v) a printed report,
(vi) JavaScript Object Notation messages.

Data analysis computer system means a combination of one or more computers on which a Data Analysis Program or Programs or Hadoop or MapReduce processes can be executed. Nonlimiting examples include:
(i) one or more computers where video program viewing activity data can be used to create video program viewing detail records,
(ii) a single computer running the MapReduce distributed computing framework for parallel processing,
(iii) a cluster of many computers running the MapReduce distributed computing framework for parallel processing where many means a few to hundreds or even thousands,
(iv) a Hadoop cluster of computers.

Data analysis computer of known type means any commonly available computer system running a commonly known operating system. Nonlimiting examples include:
(i) a standard personal computer running WINDOWS 7 Professional operating system from MICROSOFT® Corporation,
(ii) a computer running the UNIX operating system,
(iii) a computer running the Linux operating system,
(iv) a computer in a cloud computing environment,
(v) a mainframe computer with its operating system.

Data analysis program means a computer program or programs that are able to execute on a Data analysis computer of known type. Nonlimiting examples include:
(i) a Pig Latin script running MapReduce,
(ii) a JAVA program running MapReduce,
(iii) a Python script running MapReduce,
(iv) a COBOL program.

Demographic information means any data item that can describe a characteristic of a viewer or a subscriber or a household associated with a viewer who is operating the video asset viewing device. Nonlimiting examples include income, ethnicity, gender, age, marital status, location, geographic area, postal code, census data, occupation, social grouping, family status, any proprietary demographic grouping, segmentation, credit score, dwelling type, homeownership status, property ownership status, rental status, vehicle ownership, tax rolls, credit card usage, religious affiliation, sports interest, political party affiliation, cable television subscriber type, cable television subscriber package level, and cell phone service level.

Device Characteristic means any feature or capability or aspect or descriptive qualifier or identifier of a video viewing device. Nonlimiting examples include that this may identify the type of device such as a set-top box, a tablet, a smart phone; a capability of the device such as the ability to record video or to support multiple viewing windows, or a manufacturer identifier.

Device Type is a subset of Device Characteristic where device type may, as a nonlimiting example, identify the type of device such as a set-top box, a tablet, a smart phone.

Digital Video Recorder means a device that records video content from a network for later playback. This includes but is not limited to set-top box DVR, network DVR, and cloud DVR.

DVR—see Digital Video Recorder.

Digital Video Recording (DVR) Playback is when the viewer plays back content that was previously recorded on their DVR. DVR content can be viewed using various Trick Play features.

Geographic information means any service area or any network hierarchy designation or marketing area or other designated area used by a cable television company or a satellite television company or IP Television delivery company or educational service provider or video asset delivery system. The boundary or description of a geographic area is defined based on the needs of the service provider. Nonlimiting examples include a Market in a cable company network, a Headend in a cable company network, a Hub in a cable company network, a census tract, a cell tower identifier, a service area for satellite TV, advertising zone, a zip code, or some other geographic identifier. The geographic information may then be used to identify the location of a video asset viewing device or geographic information about the about the house associated with the device or the location of the device at the time of the viewer interaction in the event that the viewer interaction occurs in a location different than the location of the house associated with the device.

Network means any computer network. Nonlimiting examples include:
(i) a cable television network,
(ii) a cellular telephony network,
(iii) hybrid fiber coax system,
(iv) a satellite television network,
(v) a wi-fi network,
(vi) any means that supports communication among video asset viewing devices or electronic devices or computers or computer systems.

Pipe delimited text files means data files where the fields are separated by the "l" character.

Sessionized Linear Viewing is linear tuning activity which has been transformed into program based viewing. A simple linear tuning event may cross program boundaries. That simple linear tuning event can be split into multiple program based linear viewing activity records by creating separate tuning records for each program that is viewed during the linear tuning event. The viewer may use "trick plays" when viewing this content. Additionally, the sessionized linear viewing may represent live viewing activity or time shifted viewing activity.

Set-top box means a video asset viewing device that receives external signals and decodes those signals into content that can be viewed on a television screen or similar display device.

The signals may come from a cable television system, a satellite television system, a network, or any other suitable means. A set-top box may have one or more tuners. The set-top box allows the user to interact with it to control what is displayed on the television screen. The set-top box is able to capture the commands given by the user and then transmit those commands to another computer system. For purposes of this application, stating that a set-top box tunes to a channel is equivalent to stating that a tuner in a set-top box has tuned to a channel. A set-top box may also play back previously recorded video content.

STB means Set-top box.

Trick Play means using features of the video viewing device to execute operations such as Play, Fast Forward at various speeds (1×, 2×, 3×, 4×), Pause, Skip, Reverse at various speeds (1×, 2×, 3×, 4×), Slow play, slow reverse, and similar activities.

Tuner means a tuner in a Set-top box.

Tuner index means an identifier of a tuner in a Set-top box.

Video On Demand (VOD) a video service whereby previously recorded video content is made available for viewing. VOD content can be viewed using various Trick Play features. The content may include, but is not limited to, cable and/or satellite television video on demand, all variety of video content delivered electronically across a network, and online educational videos.

Video asset means any programming content that may be viewed and/or heard. A Video Program may contain multiple Video Assets. Nonlimiting examples of Video Asset include:
(i) advertisements or commercials,
(ii) movies,
(iii) sports programs,
(iv) news casts,
(v) music,
(vi) television programs,
(vii) video recordings.

Video asset viewing device means any electronic device that may be used either directly or indirectly by a human being to interact with video content where the video content is provided by a cable television system or a satellite television system or a computer system accessed through a network. Nonlimiting examples include: Gaming station, web browser, MP3 Player, Internet Protocol phone, Internet Protocol television, mobile device, mobile smart phone, set-top box, satellite television receiver, set-top box in a cable television network, set-top box in a satellite television system, cell phone, personal communication device, personal video recorder, personal video player, two-way interactive service platforms, personal computer, tablet device.

Video server delivering video content through a network means any computer system, any individual piece of computer equipment or electronic gear, or any combination of computer equipment or electronic gear which enables or facilitates the viewer interaction with the video asset viewing device. Nonlimiting examples include:
(i) cable television system,
(ii) cable television switched digital video system,
(iii) cellular phone network,
(iv) satellite television system,
(v) web server,
(vi) any individual piece of computer equipment or electronic gear,
(vii) any combination of computer equipment or electronic gear.

Video viewing activity means any identifiable activity that a Video asset viewing device operator may do in regard to a Video asset viewing device and where such activity can be captured by the video asset viewing device or by the video server delivering video content through a network that supports the device. Nonlimiting examples include:
(i) power on/power off, open web page, close web page,
(ii) channel up/channel down/channel selection, play video content on web browser,
(iii) volume up/volume down/mute/unmute,
(iv) any trick play such as fast forward, rewind, pause
(v) recording video content,
(vi) playing back recorded video content,
(vii) invoking a menu, choosing a menu option,
(viii) any response to a screen prompt
(ix) playing live video content.

Viewer means the human being causing a Viewer interaction; the user of a Set-top box or a Video asset viewing device.

BRIEF DESCRIPTION OF THE DRAWINGS

FIGS. 3A-3B illustrate example record layouts for a Video Program Viewing Activity Data File 130 record and corresponding data structure.

FIGS. 3C-3H illustrate example sample data associated with record layouts for a Video Program Viewing Activity Data File 130 record.

FIGS. 4A-4B illustrate example record layouts for a Video Program Viewing Detail Data File 150 record and corresponding data structure.

FIGS. 4C-4G illustrate example sample data associated with record layouts for a Video Program Viewing Detail Data File 150 record.

FIGS. 5A-5B illustrate example record layouts for an Aggregated Sessionized Linear Viewing Activity (LVA) File 220 record and corresponding data structure.

FIGS. 5C-5O illustrate example sample data associated with record layouts for an Aggregated Sessionized Linear Viewing Activity (LVA) File 220 record.

FIGS. 6A-6B Illustrate example record layouts for an Aggregated DVR Viewing Activity (DVR) File 230 record and corresponding data structure.

FIGS. 6C-6E illustrate example sample data associated with record layouts for an Aggregated DVR Viewing Activity (DVR) File 230 record.

FIGS. 7A-7B Illustrate example record layouts for an Aggregated VOD Viewing Activity (VOD) File 240 record and corresponding data structure.

FIG. 7C illustrates example sample data associated with record layouts for an Aggregated VOD Viewing Activity (VOD) File 240 record.

FIGS. 8A-8B Illustrate example record layouts for an Aggregated Video Program Viewing File 250 record and corresponding data structure.

FIG. 8C illustrates example sample data associated with record layouts for an Aggregated Video Program Viewing File 250 record.

DETAILED DESCRIPTION OF THE DRAWINGS

Figure 1:
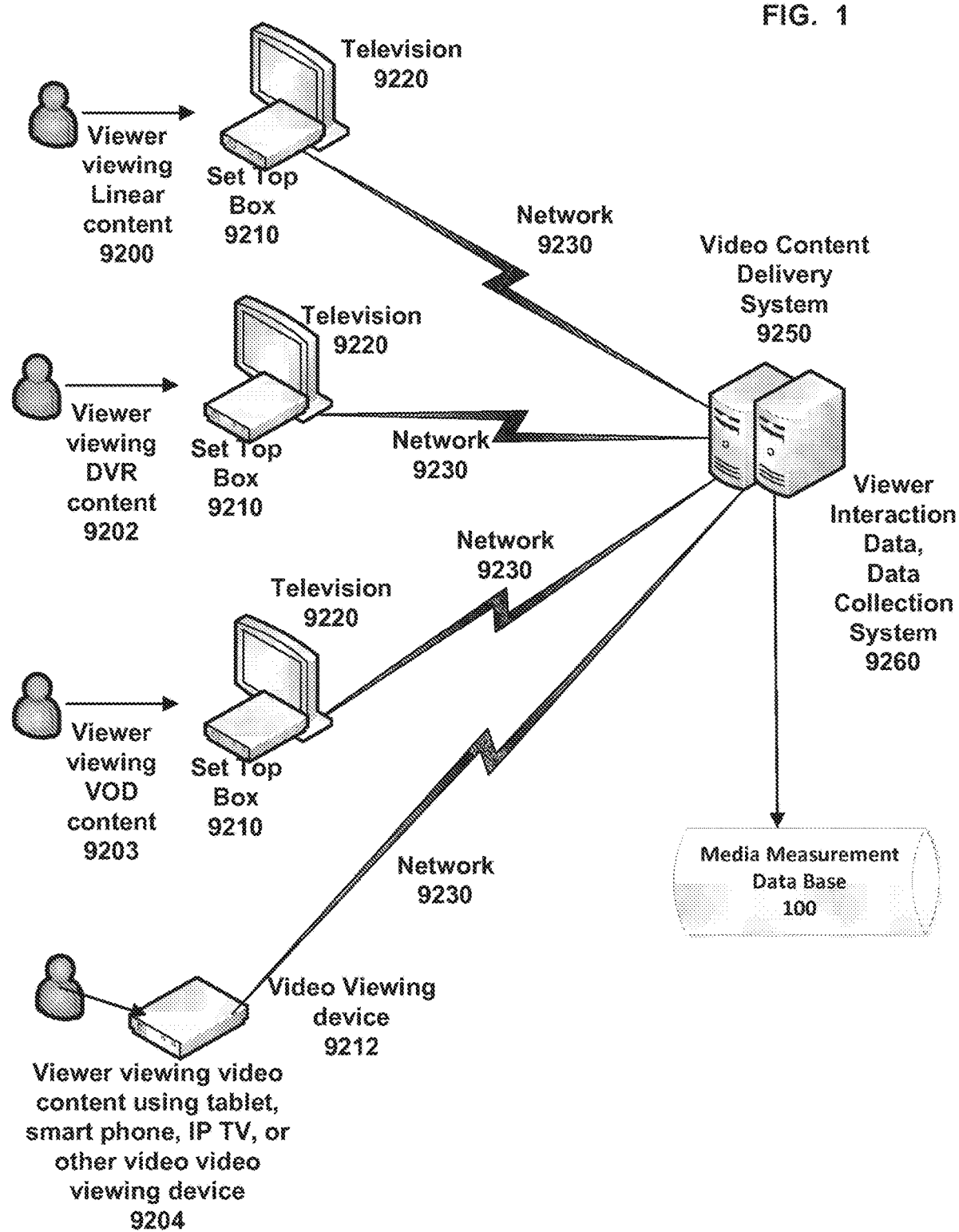
FIG. 1 provides an overview of an exemplary process for collecting viewer interaction data derived from a plurality of viewers interacting with video content that was delivered on a plurality of video asset viewing devices delivering content through a network and then loading that data to a Media Measurement Data Base.

When reading the information below, it can be appreciated that these are merely samples of table layouts, format and content, and many aspects of these tables may be varied or expanded within the scope of the embodiment. The table layouts, field formats and content, algorithms, and other aspects are what I presently contemplate for this embodiment, but other table layouts, field formats and content, algorithms, etc. can be used. The algorithms are samples and various aspects of the algorithms may be varied or expanded within the scope of the embodiment.

In one embodiment the MapReduce Aggregation Engine 200 can be implemented on computer clusters running a standard Hadoop distribution from Apache under the Linux operating system. The MapReduce Aggregation Engine 200 can be implemented in JAVA or Pig. The reader may find more information about various Apache open source projects from The Apache Software Foundation at http://apache.org. Pig is a dataflow scripting language used to run data flows on Hadoop. Pig uses the Hadoop Distributed File System and the Hadoop processing system which is MapReduce. Pig is an Apache open source project. The reader may find more information about Pig at http://pig.apache.org. Those skilled in the art will readily recognize these tools.
Note on Media Measurement Data Model Cable Television Laboratories, Inc. has published an "Audience Data Measurement Specification" as "Open-Cable™ Specifications, Audience Measurement, Audience Measurement Data Specification" having Document Control Number "OC-SP-AMD-I01-130502" copyright© Cable Television Laboratories, Inc. 2013 which describes a Media Measurement Data Model (MMDM) database design which can be used as a source of data for the MapReduce Aggregation Engine 200 which I teach how to build in this Application. The teaching in my present application can be implemented in conjunction with that Media Measurement Data Model or with any number of data models as long as the required input data is provided as described herein.

Additionally, my MapReduce Aggregation Engine 200 creates files which may be used to load additional tables in a Media Measurement Data Model such as the one published by Cable Television Laboratories, Inc. These files are described in FIGS. 5 to 8.

Note: Numbering in the Drawings—The numbers in the drawings are usually, but not always, in sequential order.

FIG. 1 provides an overview of an exemplary process for collecting viewer interaction data derived from a plurality of viewers interacting with video content that was delivered on a plurality of video asset viewing devices delivering content through a network and then loading that data to a Media Measurement Data Base 100. This figure illustrates several viewers interacting with video asset viewing devices to view content which was delivered to those devices across a network and then to collect viewing activity from those devices.

In this nonlimiting example, the purpose is not to describe in detail the operations of a video content delivery network or a data collection process, but simply to show how the data that is collected from that system can be made available to my MapReduce Aggregation Engine 200.

It begins with Viewer Viewing Linear Content 9200 who is interacting with a set-top box 9210 and television 9220 as he views linear content. The set-top box 9210 interacts with a Video Content Delivery System 9250 which delivers the content across a Network 9230.

It continues with Viewer Viewing DVR Content 9202 who is interacting with a set-top box 9210 and television 9220 as he interacts with DVR content, recording content and playing back recorded content using various modes including trick plays. The set-top box 9210 interacts with a Video Content Delivery System 9250 which delivers the content across a Network 9230.

It continues with Viewer Viewing VOD Content 9203 who is interacting with a set-top box 9210 and television 9220 as he interacts with VOD content, playing the content using various modes including trick plays. The set-top box 9210 interacts with a Video Content Delivery System 9250 which delivers the content across a Network 9230.

It continues with Viewer viewing video content using tablet, smart phone, IP TV, or other video video viewing device 9204 who is interacting with a variety of Video Viewing Devices 9212, including but not limited to tablet, smart phone, IP TV, PC, etc. The video viewing device interacts with a Video Content Delivery System 9250 which delivers the content across a Network 9230.

Video Content Delivery System 9250 then interacts with a Viewer Interaction Data, Data Collection System 9260 which collects all manner of viewer interaction data including Linear viewing including time-shifted linear viewing, Digital Video Recorder recording and playback/viewing, and Video on Demand viewing. The Viewer Interaction Data, Data Collection System 9260 then processes the data as needed to load it to a Media Measurement Data Base 100. The data in the Media Measurement Data Base 100 can then be used as input to my Aggregation Engine 200 as described in FIG. 2.

Figure 2:
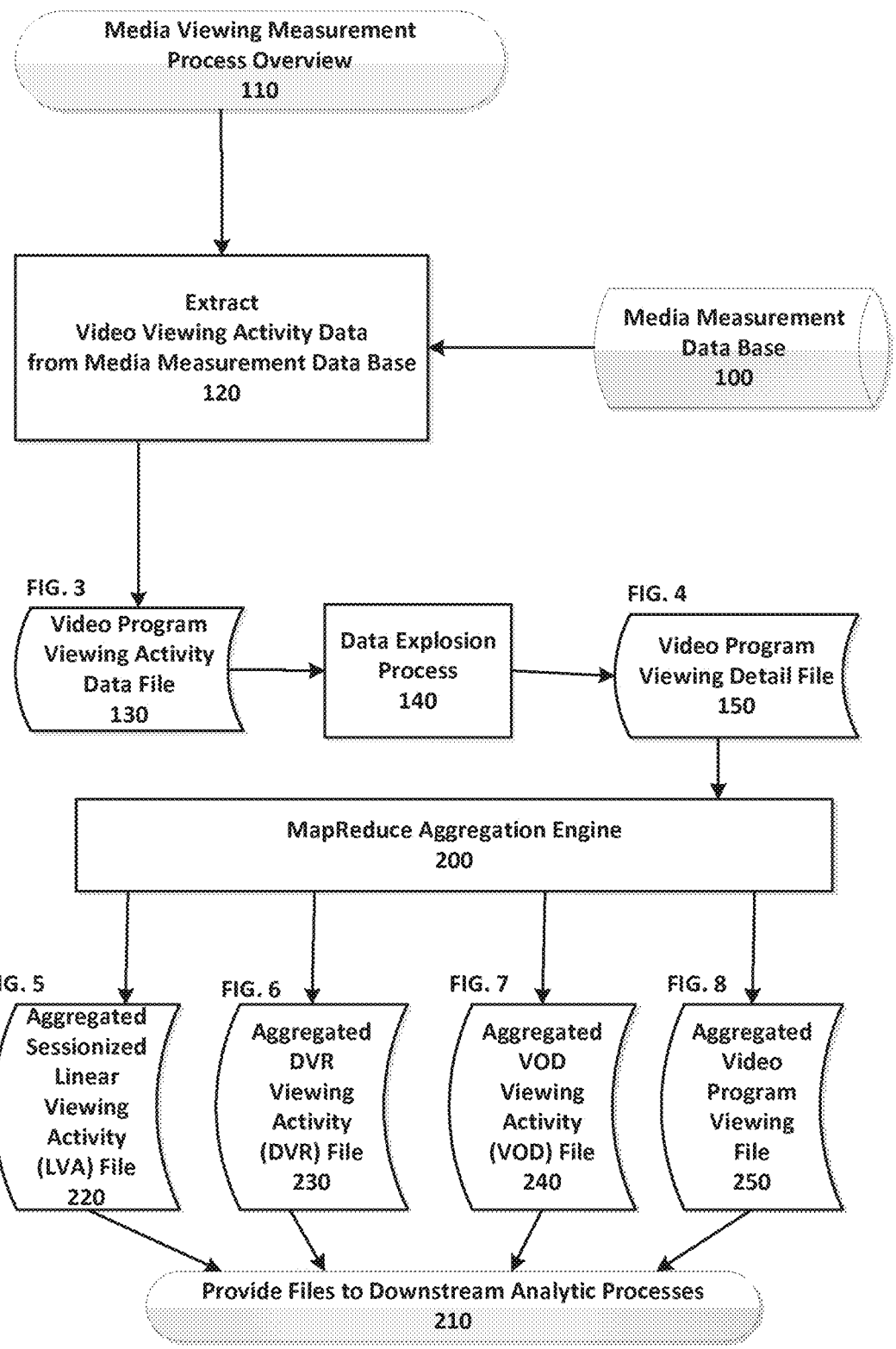
FIG. 2 illustrates an exemplary media measurement process from creation of the video program viewing activity data file to creation of the various aggregated viewing activity files which can then be used in downstream analytic processes.

FIG. 2 illustrates an exemplary media measurement process from creation of the Video Program Viewing Activity Data File 130 to creation of the various aggregated viewing activity files (Parts 220, 230, 240, 250) which can then be provided to downstream analytic processes as shown by Provide Files to Downstream Analytic Processes 210.

As noted previously, the video program viewing activity may be sourced from a Media Measurement Database such as the one described in the Cable Television Laboratories, Inc. specification. The populating of the Media Measurement Database 100 is beyond the scope of this application and so only brief remarks will be made in reference to that. There are video viewing data collection systems that are commonly used in the industry for collecting channel tuning or video viewing activity data including switched digital video systems, set top box applications, internet protocol video viewing applications, and other video viewing applications. I have discussed these in detail in my prior applications. These systems enable the collection of the video viewing events which can be loaded to a Media Measurement Database 100. From such a database, Video Program Viewing Activity Data can be extracted in a format similar to that shown in FIG. 3 Video Program Viewing Activity Data File 130.

Proceeding with the review of FIG. 2, the process begins with Media Viewing Measurement Process Overview 110. The first step is to extract the video viewing events as per Extract Video Viewing Activity Data from Media Measurement Data Base 120. Those skilled in the art will have no difficulty creating a database query or similar process to extract data from a Media Measurement Database 100 or other source and making it available in a format similar to that defined in Video Program Viewing Activity Data File 130. The file structure is defined in Video Program Viewing Activity Data File 130, as shown in FIGS. 3A-3H, which describes example formats for the input video program viewing activity data.

This data file may contain three types of viewing activity depending on the query defined by the analyst. The three types are:

a) Sessionized linear viewing activity (LVA)
b) Digital video recording viewing activity (DVR)
c) Video on demand viewing activity (VOD)

These are Defined Next:

Sessionized Linear Viewing Activity (LVA)—Sessionized linear viewing activity is derived from linear tuning events. For linear tuning events which fit within program boundaries, the tuning event may be enriched as described in the Cable Television Laboratories, Inc. specification. For linear tuning events which cross program boundaries, the tuning event is divided into shorter duration tuning events as needed to fit within program boundaries as described in the specification; they are also enriched with additional fields. Because the viewing activity has been transformed to fit within program boundaries, I refer to it as program-based viewing. Linear viewing activity may be extracted from the Cable Television Laboratories, Inc. MMDM or from any source that is able to provide the data in a format suitable for this process.

A non-limiting example will help to explain this:

Device 100 has a linear tuning event consisting of a Tune to ABC at 6:55:00 PM and tune away from ABC at 8:07:59 PM. Assume a program schedule on ABC of News from 6:30:00 PM to 6:59:59 PM, followed by Action Show from 7:00:00 PM to 7:59:59 PM, followed by Sports Show from 8:00:00 PM to 8:29:59 PM. Using this sample data set, we see that the linear tuning event from Device 100 can be sessionized as follows:

i. Session 1: Channel ABC from 6:55:00 PM to 6:59:59 PM tuned to Program 'News'.
ii. Session 2: Channel ABC from 7:00:00 PM to 7:59:59 PM tuned to Program 'Action Show'.
iii. Session 3: Channel ABC from 8:00:00 PM to 8:07:59 PM tuned to Program 'Sports Show.'

This is defined in more detail in the specification that Cable Television Laboratories, Inc. has published as "Audience Data Measurement Specification" referred to previously.

The same video content may air multiple times, so when viewing is being measured it is necessary to track the Program information, Program Airing information, and Channel information along with other fields.

Digital Video Recording Viewing Activity (DVR)—DVR viewing activity may be extracted from the Cable Television Laboratories, Inc. MMDM or from any source that is able to provide the data in a format suitable for this process. As a non-limiting example, a PROGRAM may be a baseball game and a PROGRAM_AIRING may be the initial airing of the game followed by a replay later that day (thus two airings). Because a DVR asset airs on a certain channel at a certain time, DVR assets are also linked with Channel.

When the viewer records a program, they may record any of several airings. Also the program my air on different channels for the original and the replay. For these reasons, the DVR recording and subsequent playback must identify the Program information, Program Airing information, and Channel information along with other fields.

Video on Demand Viewing Activity (VOD)—VOD viewing activity is extracted from the Cable Television Laboratories, Inc. MMDM or from any source that is able to provided the data in a format suitable for this process. As a non-limiting example, a program may be any VOD asset, a movie, a sporting event, an online class, etc. The concept of a PROGRAM_AIRING does not apply to VOD. As to channel, because a VOD Program airs on the preassigned VOD channel, the channel information is not particularly informative in the context of VOD, so it is ignored for purposes of this Application.

These three types of viewing, LVA, DVR, and VOD, all share the characteristic that for measurement purposes, the measuring activity must be based on position in the content rather than a time element such as UTC time or local time. Measuring viewing activity based on position in the content enables creation of metrics having the same basis across LVA, DVR, and VOD viewing. Furthermore, when measuring based on position in the content, it is necessary to use a fixed reference point such as the actual start of the content. To illustrate, for a DVR recording, not every viewer will record the content beginning at the start of the program. So using position in the recording for measurement would not yield comparable results. Instead it is required to use a fixed reference point (the start of the content), in the actual content, not the start of the recording, and measure viewing from that fixed reference point. By using this fixed reference point, we can measure consistently regardless of whether the user begins recording at the beginning or some other point in the content. The same concept is applicable to LVA and VOD viewing.

Resuming with the review of FIG. 2, those with reasonable skill in the art will readily recognize how to create the Video Program Viewing Activity Data File 130 (FIGS. 3A-3H). Note that there is a single record layout for LVA and DVR and VOD. In the case of VOD, the PROGRAM_AIRING_INFO 1020 and the CHANNEL_INFO 1030 may be left blank because these fields are not applicable to VOD.

Proceeding with the review of FIG. 2, the Video Program Viewing Activity Data File 130 is then passed to a Data Explosion Process 140. In this process the individual viewing events are exploded such that there is one record created for every second of the viewing duration represented in the video program viewing activity record. Depending on the criteria by which the analyst is aggregating the data, various fields can be omitted from the Video Program Viewing Activity Data File 130 file because the MapReduce process will not use them. I have included these additional fields to provide a comprehensive picture recognizing that one can always drop the fields that they choose not to use.

The computer algorithm that the Data Explosion Process 140 runs to create the Video Program Viewing Detail File 150 is as follows:

Looping Process to Create the Video Program Viewing Detail Records:

```
For each input record in Video Program Viewing Activity Data File 130
  PERFORM VARYING SUB
    FROM PLAYBACK_BEG_POSITION 1120
    BY 1
    UNTIL SUB > PLAYBACK_END_POSITION 1130
      MOVE PROGRAM_INFO           1010 to PROGRAM_INFO           1210
      MOVE PROGRAM_AIRING_INFO    1020 to PROGRAM_AIRING_INFO    1220
      MOVE CHANNEL_INFO           1030 to CHANNEL INFO           1230
      MOVE HOUSE_INFO             1040 to HOUSE_INFO             1240
      MOVE DEVICE_INFO            1050 to DEVICE_INFO            1250
      MOVE VIEWER_INFO            1060 to VIEWER_INFO            1260
      MOVE GEOGRAPHIC_INFO        1070 to GEOGRAPHIC_INFO        1270
      MOVE DEMOGRAPHIC_INFO       1080 to DEMOGRAPHIC_INFO       1280
      MOVE VIEWING_TYPE           1090 to VIEWING_TYPE           1290
      MOVE VIEWING_DATE           1100 to VIEWING_DATE           1300
      MOVE PLAYBACK_MODE          1110 to PLAYBACK_MODE          1310
      MOVE PRESENTATION_INFO      1150 to PRESENTATION_INFO      1350
      MOVE VIDEO_SERVER_INFO      1160 to VIDEO_SERVER_INFO      1360
      MOVE SYSTEM_HEALTH_INFO     1170 to SYSTEM_HEALTH_INFO     1370
      MOVE SUB                         to PLAYBACK_POSITION      1380
      MOVE 1                           to COUNT_OF_1             1390
      WRITE Video Viewing Detail File 150
End Loop
```

The explosion process can be run in an alternative manner to achieve the same result. I have included this alternative embodiment.

Alternative Embodiment #1

If the activity duration is provided, the looping construct can be done as follows:

```
For each input record in Video Program Viewing Activity Data File 130
  PERFORM VARYING SUB
    FROM PLAYBACK_BEG_POSITION 1120
    BY 1
    UNTIL SUB > (PLAYBACK_BEG_POSITION     1120  +
                 ACTIVITY_DURATION_SECONDS 1140)
      Populate the fields in the same manner as described above
      WRITE Video Program Viewing Detail File 150
End Loop
```

Note: In each case the Video Program Viewing Detail File 150 records can be written directly to the Hadoop Distributed File System (HDFS) so that the video program viewing detail records are ready for use by the MapReduce distributed computing framework.

Note:

The Video Program Viewing Activity Data File 130 can be provided by the Extract 120 process in any computer readable format including, but not limited to, database tables, flat files, JSON messages, and XML messages. Alternatively, such video viewing events can be collected directly from the source without the need for a Media Measurement Database 100. In such a case, those events can still be provided as video viewing activity in a format similar to that shown in FIGS. 3C-3H for use by the Data Explosion Process 140.

For each of these embodiments, at the completion of Data Explosion Process 140, one record has been written to the Video Program Viewing Detail File 150 for each second of the viewing duration represented in the video program viewing activity record. The Sample Data in FIGS. 3C-3H shows a non-limiting example of the input data for the Data Explosion Process 140. The Sample Data in FIGS. 4C-4G shows a non-limiting example of a partial set of the data produced by the Data Explosion Process 140. The reader will note that FIGS. 4G-4G sample data contains one record for every second of the viewing activity represented in the input data.

Those skilled in the art will readily recognize that the Data Explosion Process 140 is suitable for running in parallel on multiple computers simultaneously with each process creating Video Program Viewing Detail File records that can be fed into the MapReduce Aggregation Engine 200.

Proceeding with the review of FIG. 2, the Video Program Viewing Detail File 150 data residing in HDFS is now ready for use by the MapReduce Aggregation Engine 200. The MapReduce Aggregation Engine 200 runs various word count algorithms against the incoming data. Each word count algorithm will aggregate the data to a separate level as shown in FIG. 2 (Parts 220, 230, 240, 250) with the details shown in FIGS. 5A-8C.

The MapReduce process can be coded in JAVA or in Pig. I have coded this in Pig. The code below can be used to create the four output files reviewed in the Drawings (FIGS. 5A to 8C):

Aggregated Sessionized Linear Viewing Activity (LVA) File 220
Aggregated DVR Viewing Activity (DVR) File 230
Aggregated VOD Viewing Activity (VOD) File 240
Aggregated Video Program Viewing File 250.

Using these outputs, the reader will have a comprehensive set of aggregated video viewing metrics. The reader should recognize that the aggregation logic shown below provides several illustrations of what can be done. Additional aggregation combinations will be obvious to those skilled in the art.

Creating the Aggregated Sessionized Linear Viewing Activity (LVA) File 220

The Pig Latin coding to create the Aggregated Sessionized Linear Viewing Activity (LVA) File 220 is shown next.

This summarization aggregates Sessionized Linear Viewing Activity for each combination of Program, Program Airing, Channel, Geographic, Demographic, and Date by the Playback Mode. The result provides a summary of Sessionized Linear viewing for each second of the program content with the viewing activity broken out by the playback mode (PL, F1, F2, R1, R2, etc.).

As a nonlimiting example, if a program was 1800 seconds (30 minutes) duration, the analyst would have counts of how many devices viewed second 0 in PL mode, then second 1 in PL mode, etc. to second 1799. Additionally, he would have similar data for each of the other playback modes (F1, F2, R1, R2, etc.) for each of the 1800 seconds of the program. By matching this data with the content being shown, the analyst can now chart how many devices saw each second of the content in the respective playback modes.

```
LVA_A = LOAD 'Video-Program-Viewing-Detail-File' 150 as
    (PROGRAM_INFO:chararray,                      1210
     PROGRAM_AIRING_INFO:chararray,               1220
     CHANNEL_INFO:chararray,                      1230
     HOUSE_INFO:chararray,                        1240
     DEVICE_INFO:chararray,                       1250
     VIEWER_INFO:chararray,                       1260
     GEOGRAPHIC_INFO:chararray,                   1270
     DEMOGRAPHIC_INFO:chararray,                  1280
     VIEWING_TYPE:chararray,                      1290
     VIEWING_DATE:chararray,                      1300
     PLAYBACK_MODE:chararray,                     1310
     PRESENTATION_INFO:chararray,                 1350
     VIDEO_SERVER_INFO:chararray,                 1360
     SYSTEM_HEALTH_INFO:chararray,                1370
     PLAYBACK_POSITION:chararray,                 1380
     COUNT_OF_1:chararray) ;                      1390
LVA_B =
    FOREACH LVA_A
      GENERATE
        PROGRAM_INFO,              1210
        PROGRAM_AIRING_INFO,       1220
        CHANNEL_INFO,              1230
        GEOGRAPHIC_INFO,           1270
        DEMOGRAPHIC_INFO,          1280
        VIEWING_TYPE,              1290
        VIEWING_DATE,              1300
        PLAYBACK_MODE,             1310
        PLAYBACK_POSITION,         1380
        COUNT_OF_1;                1390
LVA_C = FILTER LVA_B by VIEWING_TYPE == 'LVA';
LVA_D =
    GROUP LVA_C
        by (PROGRAM_INFO,                1610
            PROGRAM_AIRING_INFO,         1620
            CHANNEL_INFO,                1630
            GEOGRAPHIC_INFO,             1670
            DEMOGRAPHIC_INFO,            1680
            VIEWING_TYPE,                1690
            VIEWING_DATE,                1700
            PLAYBACK_MODE,               1710
            PLAYBACK_POSITION);          1720
LVA_E =
    FOREACH LVA_D
      GENERATE
        group,
        COUNT(LVA_C) as PLAYBACK_MODE_COUNT;   1730
STORE
    LVA_E
    INTO 'AggregatedSessionizedLinearViewingActivity(LVA)File';  220
```

Note: VIEWING_TYPE 1290 is carried forward to identify the type of viewing when files are combined downstream.

Note: A sample of the file created by the aggregation is shown in FIGS. 5C-5O Sample Data.

LVA Alternative Query 1—Aggregate Across Demographic Groups.

By changing LVA_D statement above to the following, the analyst can aggregate across demographic groups. As a non-limiting example, this may omit any details related to demographic breakouts such as age or income.

```
LVA_D =
    GROUP LVA_C
        by (PROGRAM_INFO,             1610
            PROGRAM_AIRING_INFO,      1620
            CHANNEL_INFO,             1630
            GEOGRAPHIC_INFO,          1670
            VIEWING_TYPE,             1690
            VIEWING_DATE,             1700
            PLAYBACK_MODE,            1710
            PLAYBACK_POSITION);       1720
```

LVA Alternative Query 2—Aggregate Across Geographic Groups.

By changing LVA_D statement above to the following, the analyst can aggregate across geographic groups. As a non-limiting example, this may omit any details related to geographic breakouts such as zip code or marketing area.

```
LVA_D =
    GROUP LVA_C
        by (PROGRAM_INFO,             1610
            PROGRAM_AIRING_INFO,      1620
            CHANNEL_INFO,             1630
            DEMOGRAPHIC_INFO,         1680
            VIEWING_TYPE,             1690
            VIEWING_DATE,             1700
            PLAYBACK_MODE,            1710
            PLAYBACK_POSITION);       1720
```

LVA Alternative Query 3—Aggregate Across Demographic and Geographic Groups.

By changing LVA_D statement above to the following, the analyst can aggregate across demographic and geographic groups.

```
LVA_D =
    GROUP LVA_C
        by (PROGRAM_INFO,             1610
            PROGRAM_AIRING_INFO,      1620
            CHANNEL_INFO,             1630
            VIEWING_TYPE,             1690
            VIEWING_DATE,             1700
            PLAYBACK_MODE,            1710
            PLAYBACK_POSITION);       1720
```

LVA Alternative Query 4—Aggregate Across Demographic and Geographic Groups and Dates.

By changing LVA_D statement above to the following, the analyst can aggregate across demographic and geographic groups and viewing dates and program airings. As a non-limiting example, this may aggregate viewing across the two airings of a baseball game that occur on different dates with no detail breakouts for demographic or geographic groupings.

```
LVA_D =
    GROUP LVA_C
        by (PROGRAM_INFO,             1610
            CHANNEL_INFO,             1630
            VIEWING_TYPE,             1690
            PLAYBACK_MODE,            1710
            PLAYBACK_POSITION);       1720
```

Recap of Alternative Queries

Those skilled in the art will have no difficulty creating addition aggregation groupings as needed.

Creating the Aggregated DVR Viewing Activity (DVR) File 230

The Pig Latin coding to create the Aggregated DVR Viewing Activity (DVR) File 230 is shown next.

This summarization aggregates Digital Video Recording Viewing Activity for each combination of Program, Program Airing, Channel, Geographic, Demographic, and Date by the Playback Mode.

The result provides a summary of DVR viewing for each second of the program content with the viewing activity broken out by the playback mode (PL, F1, F2, R1, R2, etc.).

As a nonlimiting example, if a recorded program on the DVR was 1800 seconds (30 minutes) duration, the analyst would have counts of how many devices played back second 0 in PL mode, then second 1 in PL mode, etc. to second 1799. Additionally, he would have similar data for each of the other playback modes (F1, F2, R1, R2, etc.) for each of the 1800 seconds of the recorded program and the corresponding viewing. By matching this data with the content being shown, the analyst can now chart how many devices saw each second of the content in the respective playback modes.

Note: VIEWING_TYPE 1890 is carried forward to identify the type of viewing when files are combined downstream.

Note: A sample of the file created by the aggregation is shown in FIGS. 6C-6E Sample Data.

DVR Alternative Query 1—Aggregate Across Demographic Groups.

By changing DVR_D statement above to the following, the analyst can aggregate across demographic groups. As a non-limiting example, this may omit any details related to demographic breakouts such as age or income.

```
DVR_D =
   GROUP DVR_C
      by (PROGRAM_INFO,              1810
          PROGRAM_AIRING_INFO,       1820
          CHANNEL_INFO,              1830
          GEOGRAPHIC_INFO,           1870
          VIEWING_TYPE,              1890
          VIEWING_DATE,              1900
```

```
DVR_A = LOAD 'Video-Program-Viewing-Detail-File' 150 as
    (PROGRAM_INFO:chararray,                    1210
     PROGRAM_AIRING_INFO:chararray,             1220
     CHANNEL_INFO:chararray,                    1230
     HOUSE_INFO:chararray,                      1240
     DEVICE_INFO:chararray,                     1250
     VIEWER_INFO:chararray,                     1260
     GEOGRAPHIC_INFO:chararray,                 1270
     DEMOGRAPHIC_INFO:chararray,                1280
     VIEWING_TYPE:chararray,                    1290
     VIEWING_DATE:chararray,                    1300
     PLAYBACK_MODE:chararray,                   1310
     PRESENTATION_INFO:chararray,               1350
     VIDEO_SERVER_INFO:chararray,               1360
     SYSTEM_HEALTH_INFO:chararray,              1370
     PLAYBACK_POSITION:chararray,               1380
     COUNT_OF_1:chararray);                     1390
DVR_B =
    FOREACH DVR_A
       GENERATE
           PROGRAM_INFO,                  1210
           PROGRAM_AIRING_INFO,           1220
           CHANNEL_INFO,                  1230
           GEOGRAPHIC_INFO,               1270
           DEMOGRAPHIC_INFO,              1280
           VIEWING_TYPE,                  1290
           VIEWING_DATE,                  1300
           PLAYBACK_MODE,                 1310
           PLAYBACK_POSITION,             1380
           COUNT_OF_1;                    1390
DVR_C = FILTER DVR_B by VIEWING_TYPE == 'DVR';
DVR_D =
    GROUP DVR_C
           by (PROGRAM_INFO,                    1810
               PROGRAM_AIRING_INFO,             1820
               CHANNEL_INFO,                    1830
               GEOGRAPHIC_INFO,                 1870
               DEMOGRAPHIC_INFO,                1880
               VIEWING_TYPE,                    1890
               VIEWING_DATE,                    1900
               PLAYBACK_MODE,                   1910
               PLAYBACK_POSITION);              1920
DVR_E =
   FOREACH DVR_D
      GENERATE
         group,
         COUNT (DVR_C) as PLAYBACK_MODE_COUNT;   1930
STORE
 DVR_E
    INTO 'AggregatedDigitalVideoRecorderViewingActivity(DVR)';   230
```

-continued

```
        PLAYBACK_MODE,           1910
        PLAYBACK_POSITION);      1920
```

DVR Alternative Query 2—Aggregate Across Geographic Groups.

By changing LVA_D statement above to the following, the analyst can aggregate across geographic groups. As a non-limiting example, this may omit any details related to geographic breakouts such as zip code or marketing area.

```
DVR_D =
    GROUP DVR_C
        by (PROGRAM_INFO,              1810
            PROGRAM_AIRING_INFO,       1820
            CHANNEL_INFO,              1830
            DEMOGRAPHIC_INFO,          1880
            VIEWING_TYPE,              1890
            VIEWING_DATE,              1900
            PLAYBACK_MODE,             1910
            PLAYBACK_POSITION);        1920
```

DVR Alternative Query 3—Aggregate Across Demographic and Geographic Groups.

By changing LVA_D statement above to the following, the analyst can aggregate across demographic and geographic groups.

```
DVR_D =
    GROUP DVR_C
        by (PROGRAM_INFO,              1810
            PROGRAM_AIRING_INFO,       1820
            CHANNEL_INFO,              1830
            VIEWING_TYPE,              1890
            VIEWING_DATE,              1900
            PLAYBACK_MODE,             1910
            PLAYBACK_POSITION);        1920
```

DVR Alternative Query 4—Aggregate Across Demographic and Geographic Groups and Dates.

By changing LVA_D statement above to the following, the analyst can aggregate across demographic and geographic groups and viewing dates and program airings. As a non-limiting example, this may aggregate viewing across the two recorded airings of a baseball game that occur on different dates with no detail breakouts for demographic or geographic groupings.

```
DVR_D =
    GROUP DVR_C
        by (PROGRAM_INFO,              1810
            CHANNEL_INFO,              1830
            VIEWING_TYPE,              1890
            PLAYBACK_MODE,             1910
            PLAYBACK_POSITION);        1920
```

Recap of Alternative Queries

Those skilled in the art will have no difficulty creating addition aggregation groupings as needed.

Creating the Aggregated VOD Viewing Activity (VOD) File 240

The Pig Latin coding to create the Aggregated VOD Viewing Activity (VOD) File 240 is shown next.

This summarization aggregates Video On Demand Viewing Activity for each combination of Program, Geographic, Demographic, and Date by the Playback Mode. Note: VOD does not use Program Airing or Channel in the same way that linear and DVR use this, so those fields are not included in VOD. The result provides a summary of VOD viewing for each second of the program content with the viewing activity broken out by the playback mode (PL, F1, F2, R1, R2, etc.).

As a nonlimiting example, if a Video On Demand lease was for a program that was 1800 seconds (30 minutes) duration, the analyst would have counts of how many devices played second 0 in PL mode, then second 1 in PL mode, etc. to second 1799. Additionally, he would have similar data for each of the other playback modes (F1, F2, R1, R2, etc.) for each of the 1800 seconds of the VOD program and the corresponding viewing. By matching this data with the content being shown, the analyst can now chart how many devices saw each second of the content in the respective playback modes.

```
VOD_A = LOAD 'Video-Program-Viewing-Detail-File' 150 as
        (PROGRAM_INFO:chararray,              1210
         PROGRAM_AIRING_INFO:chararray,       1220
         CHANNEL_INFO:chararray,              1230
         HOUSE_INFO:chararray,                1240
         DEVICE_INFO:chararray,               1250
         VIEWER_INFO:chararray,               1260
         GEOGRAPHIC_INFO:chararray,           1270
         DEMOGRAPHIC_INFO:chararray,          1280
         VIEWING_TYPE:chararray,              1290
         VIEWING_DATE:chararray,              1300
         PLAYBACK_MODE:chararray,             1310
         PRESENTATION_INFO:chararray,         1350
         VIDEO_SERVER_INFO:chararray,         1360
         SYSTEM_HEALTH_INFO:chararray,        1370
         PLAYBACK_POSITION:chararray,         1380
         COUNT_OF_1:chararray);               1390
VOD_B =
    FOREACH VOD_A
        GENERATE
            PROGRAM_INFO,              1210
            GEOGRAPHIC_INFO,           1270
            DEMOGRAPHIC_INFO,          1280
            VIEWING_TYPE,              1290
            VIEWING_DATE,              1300
            PLAYBACK_MODE,             1310
```

-continued

```
        PLAYBACK_POSITION,              1380
        COUNT_OF_1;                     1390
VOD_C = FILTER VOD_B by VIEWING_TYPE == 'VOD';
VOD_D =
    GROUP VOD_C
        by (PROGRAM_INFO,               2010
            GEOGRAPHIC_INFO,            2070
            DEMOGRAPHIC_INFO,           2080
            VIEWING_TYPE,               2090
            VIEWING_DATE,               2100
            PLAYBACK_MODE,              2110
            PLAYBACK_POSITION);         2120
VOD_E =
    FOREACH VOD_D
        GENERATE
            group,
            COUNT (VOD_C) as PLAYBACK_MODE_COUNT;   2130
STORE
 VOD_E
    INTO 'AggregatedVODViewingActivity(VOD)File';   240
```

Note: VIEWING_TYPE 1290 is carried forward to identify the type of viewing when files are combined downstream.

Note: A sample of the file created by the aggregation is shown in FIG. 7C Sample Data.

VOD Alternative Query 1—Aggregate Across Demographic Groups.

By changing VOD_D statement above to the following, the analyst can aggregate across demographic groups. As a non-limiting example, this may omit any details related to demographic breakouts such as age or income.

```
VOD_D =
    GROUP VOD_C
        by (PROGRAM_INFO,               2010
            GEOGRAPHIC_INFO,            2070
            VIEWING_TYPE,               2090
            VIEWING_DATE,               2100
            PLAYBACK_MODE,              2110
            PLAYBACK_POSITION);         2120
```

VOD Alternative Query 2—Aggregate Across Geographic Groups.

By changing VOD_D statement above to the following, the analyst can aggregate across geographic groups. As a non-limiting example, this may omit any details related to geographic breakouts such as zip code or marketing area.

```
VOD_D =
    GROUP VOD_C
        by (PROGRAM_INFO,               2010
            DEMOGRAPHIC_INFO,           2080
            VIEWING_TYPE,               2090
            VIEWING_DATE,               2100
            PLAYBACK_MODE,              2110
            PLAYBACK_POSITION);         2120
```

VOD Alternative Query 3—Aggregate Across Demographic and Geographic Groups.

By changing VOD_D statement above to the following, the analyst can aggregate across demographic and geographic groups.

```
VOD_D =
    GROUP VOD_C
```

-continued

```
        by (PROGRAM_INFO,               2010
            VIEWING_TYPE,               2090
            VIEWING_DATE,               2100
            PLAYBACK_MODE,              2110
            PLAYBACK_POSITION);         2120
```

VOD Alternative Query 4—Aggregate Across Demographic and Geographic Groups and Dates.

By changing VOD_D statement above to the following, the analyst can aggregate across demographic and geographic groups and viewing dates. As a non-limiting example, this will aggregate all the Program's VOD viewing activity as represented in the input file with no detail breakouts.

```
VOD_D =
    GROUP VOD_C
        by (PROGRAM_INFO,               2010
            VIEWING_TYPE,               2090
            PLAYBACK_MODE,              2110
            PLAYBACK_POSITION);         2120
```

Recap of Alternative Queries

Those skilled in the art will have no difficulty creating addition aggregation groupings as needed.

Creating the Aggregated Video Program Viewing File 250

The Pig Latin coding to create the Aggregated Video Program Viewing File 250 is shown next. This summarization aggregates viewing activity across sessionized linear viewing activity (LVA), digital video recording viewing activity (DVR), and video on demand viewing activity (VOD) as these are provided in the input data. The viewing can then be grouped by each combination of Program, Geographic, Demographic, and Date by the Playback Mode. The result provides a summary of overall viewing from the various sources (LVA, DVR, VOD) for each second of the program content with the viewing activity broken out by the playback mode (PL, F1, F2, R1, R2, etc.) for the data as represented in the input data. As a nonlimiting example, this aggregation will provide insight into total viewing activity during each second of the program content.

This data can be used to create an overall picture of the viewing activity. It can also be used to determine as the denominator in calculations which compare the percentage of LVA viewing or DVR viewing or VOD viewing to overall viewing of this content.

In this example (in part TOTAL_C) viewing date is omitted to allow aggregation across all the viewing dates.

```
TOTAL_A = LOAD 'Video-Program-Viewing-Detail-File' 150 as
    (PROGRAM_INFO:chararray,                    1210
     PROGRAM_AIRING_INFO:chararray,             1220
     CHANNEL_INFO:chararray,                    1230
     HOUSE_INFO:chararray,                      1240
     DEVICE_INFO:chararray,                     1250
     VIEWER_INFO:chararray,                     1260
     GEOGRAPHIC_INFO:chararray,                 1270
     DEMOGRAPHIC_INFO:chararray,                1280
     VIEWING_TYPE:chararray,                    1290
     VIEWING_DATE:chararray,                    1300
     PLAYBACK_MODE:chararray,                   1310
     PRESENTATION_INFO:chararray,               1350
     VIDEO_SERVER_INFO:chararray,               1360
     SYSTEM_HEALTH_INFO:chararray,              1370
     PLAYBACK_POSITION:chararray,               1380
     COUNT_OF_1:chararray);                     1390
TOTAL_B =
    FOREACH TOTAL_A
        GENERATE
            PROGRAM_INFO,                       1210
            GEOGRAPHIC_INFO,                    1270
            DEMOGRAPHIC_INFO,                   1280
            VIEWING_DATE,                       1300
            PLAYBACK_MODE,                      1310
            PLAYBACK_POSITION,                  1380
            COUNT_OF_1;                         1390
TOTAL_C =
    GROUP TOTAL_B
            by (PROGRAM_INFO,                   2210
                GEOGRAPHIC_INFO,                2270
                DEMOGRAPHIC_INFO,               2280
                PLAYBACK_MODE,                  2310
                PLAYBACK_POSITION);             2320
TOTAL_D =
    FOREACH TOTAL_C
        GENERATE
            group,
            COUNT (TOTAL_B) as PLAYBACK_MODE_COUNT; 2330
STORE
 TOTAL_D
    INTO 'AggregatedVideoProgramViewingFile';   250
```

Note: A sample of the file created by the aggregation is shown in FIG. 8C Sample Data.

TOTAL Alternative Query 1—Aggregate Across Demographic Groups.

By changing TOTAL_C statement above to the following, the analyst can aggregate across demographic groups. As a non-limiting example, this may omit any details related to demographic breakouts such as age or income.

```
TOTAL_C =
    GROUP TOTAL_B
        by (PROGRAM_INFO,                       2210
            GEOGRAPHIC_INFO,                    2270
            PLAYBACK_MODE,                      2310
            PLAYBACK_POSITION);                 2320
```

VOD Alternative Query 2—Aggregate Across Geographic Groups.

By changing TOTAL_C statement above to the following, the analyst can aggregate across geographic groups. As a non-limiting example, this may omit any details related to geographic breakouts such as zip code or marketing area.

```
TOTAL_C =
    GROUP TOTAL_B
        by (PROGRAM_INFO,                       2210
            DEMOGRAPHIC_INFO,                   2280
            PLAYBACK_MODE,                      2310
            PLAYBACK_POSITION);                 2320
```

VOD Alternative Query 3—Aggregate Across Demographic and Geographic Groups.

By changing TOTAL_C statement above to the following, the analyst can aggregate across demographic and geographic groups.

```
TOTAL_C =
    GROUP TOTAL_B
        by (PROGRAM_INFO,                       2210
            PLAYBACK_MODE,                      2310
            PLAYBACK_POSITION);                 2320
```

Recap of Alternative Queries

Those skilled in the art will have no difficulty creating addition aggregation groupings as needed.

This Concludes Discussion on FIG. 2.

FIGS. 3A-3B illustrate example record layouts for a Video Program Viewing Activity Data File 130 record, formatted for use as input to the Data Explosion Process 140, and corresponding Data structure according to one embodiment. There is Summary Information followed by the Data Structure including field definitions, as shown in FIG. 3B. After the Data Structure there is a set of Sample Data, as shown for example in FIGS. 3C-3H.

Discussion of FIGS. 3C-3H Sample Data

The FIGS. 3C-3H Sample Data contains the following breakouts:

Linear: Program 1 Airing 1
Linear: Program 1 Airing 2
DVR: Program 1 Airing 1
DVR: Program 1 Airing 2
VOD: Viewer group 1
VOD: Viewer group 2

In each case, the top row of the data table contains an abbreviated version of the field name. The second row of the chart contains the field number reference.

I have included enough sample data to clearly teach how the computer driven data explosion process will perform its task to generate the various detail records needed to represent the second-by-second viewing activity that is represented in the viewing activity data. Thus the reader will observe a variety of playback modes with varying durations.

Additionally, I have included two different program airings that are applicable to linear and DVR so that the aggregation process will then be able to aggregate across these to demonstrate what the computer is doing to achieve aggregation.

The FIGS. 3C-3H Sample Data will be carried forward to the other figures, where applicable, in this application.

FIGS. 4A-4B illustrate example record layouts for a Video Program Viewing Detail File 150 record, which is output from the Data Explosion Process 140, and corresponding Data structure according to one embodiment. This file is then ready for input to the MapReduce Aggregation Engine 200.

There is Summary Information followed by the Data Structure including field definitions, as shown in FIG. 4B. After the Data Structure there is a set of Sample Data, as shown for example in FIGS. 4C-4G.

Discussion of FIGS. 4C-4G Sample Data

The FIGS. 4C-4G Sample Data contains the following breakouts:

Linear: Program 1 Airing 1
Linear: Program 1 Airing 2
DVR: Program 1 Airing 1
DVR: Program 1 Airing 2
VOD: Viewer group 1

This sample data does not contain all of the Program Viewing Detail records that are created by the Data Explosion Process based on the inputs in FIGS. 3A-3H. I have included enough sample data so that those skilled in the art will readily envision what the computer is doing to create this sample data. I have identified in FIGS. 4C-4G when data is not included.

Overview of FIGS. 5A to 8C

FIGS. 5A to 8C review several outputs which are created by the MapReduce Aggregation Engine 200. There are multiple ways to aggregate the data depending upon the desired result. In FIGS. 5A to 8C I have shown several options. A person skilled in the art will readily identify additional aggregations options that fall within the spirit and scope of this Application.

FIGS. 5A-5B illustrate example record layouts for an Aggregated Sessionized Linear Viewing Activity (LVA) File 220 record, which is output from the MapReduce Aggregation Engine 200, and corresponding Data structure according to one embodiment. This file is ready for input to downstream analytics processes. There is Summary Information followed by the Data Structure including field definitions, as shown in FIG. 5B. After the Data Structure there is a set of Sample Data, as shown for example in FIGS. 5C-5O.

Discussion of FIGS. 5A-5O Sample Data

The FIG. 5C-5O Sample Data is organized to follow the pattern of the FIG. 4C-4G Sample Data. The reader will note the sample data is organized by Program 1 Airing 1 and then Program 1 Airing 2 and then Program 1 Airing 1 and Airing 2 combined. Within these groupings, there are sections for the various playback modes of PL, F1, F2, R1, R2 as they occur. The groupings are listed here:

Linear: Program 1 Airing 1, Play Mode Viewing
Linear: Program 1 Airing 1, Forward 1× Mode Viewing
Linear: Program 1 Airing 1, Forward 2× Mode Viewing
Linear: Program 1 Airing 2, Play Mode Viewing
Linear: Program 1 Airing 2, Forward 1× Mode Viewing
Linear: Program 1 Airing 2, Forward 2× Mode Viewing
Linear: Program 1 Airing 2, Reverse 1× Mode Viewing
Linear: Program 1 Airing 2, Reverse 2× Mode Viewing
Linear Program 1 Airing 1 and Linear Program 1 Airing 2 Combined, Play Mode
Linear Program 1 Airing 1 and Linear Program 1 Airing 2 Combined, Forward 1×
Linear Program 1 Airing 1 and Linear Program 1 Airing 2 Combined, Forward 2×
Linear Program 1 Airing 1 and Linear Program 1 Airing 2 Combined, Reverse 1×
Linear Program 1 Airing 1 and Linear Program 1 Airing 2 Combined, Reverse 2×

The reader will observe that for each set of aggregated viewing activity, along with the identifying fields, there are PLAYBACK_MODE 1710, PLAYBACK_POSITION 1720, and PLAYBACK_MODE COUNT 1730. As noted in the definitions, the Playback Mode identifies the type of viewing activity, the position identifies the location within the content, and the count identifies the number of devices viewing that second of content in that mode.

The reader will observe that for each Playback Mode 1710 there is a complete list of the Playback Positions 1720 or viewing seconds when that content was viewed along with the number of devices viewing the content as shown in Playback mode count 1730. Thus, the computer has aggregated the Video Program Viewing Detail data 150 to create this Aggregated Sessionized Linear Viewing Activity (LVA) File 220. This output file has value on its own, or it can be loaded to a data store for additional downstream analytics.

The reader will also observe that the Linear Viewing data can be aggregated across program airings in order to create a higher level aggregation of viewing activity. This is shown under the title Linear Program 1 Airing 1 and Linear Program 1 Airing 2 Combined. This aggregation, as a non-limiting example, provides insight into viewing of the content across multiple airings.

FIGS. 6A-6B Illustrate example record layouts for an Aggregated DVR Viewing Activity (DVR) File 230 record, which is output from the MapReduce Aggregation Engine 200, and corresponding Data structure according to one embodiment. This file is ready for input to downstream analytics processes.

There is Summary Information followed by the Data Structure including field definitions, as shown in FIG. 6B. After the Data Structure there is a set of Sample Data, as shown for example in FIGS. 6C-6E.

Discussion of FIGS. 6C-6E Sample Data

The FIGS. 6C-6E Sample Data is organized to follow the pattern of the FIG. 4C-4G Sample Data.

The reader will note the sample data is organized by Program 1 Airing 1 and then Program 1 Airing 2 and then Program 1 Airing 1 and 2 combined. Within these groupings, there are sections for only playback mode of PL to conserve space (playback modes F1, F2, R1, R2 are not shown). The pattern of how to aggregate this data is very similar to that shown in FIGS. 5C-5O, so the reader should have no difficulty in understanding this process. The groupings are listed here:

DVR: Program 1 Airing 1, Play Mode Viewing
DVR: Program 1 Airing 2, Play Mode Viewing
DVR: Program 1 Airing 1 and 2, Combined Play Mode Viewing The reader will observe that for each set of aggregated viewing activity, along with the identifying fields, there are PLAYBACK_MODE 1910, PLAYBACK_POSITION 1920, and PLAYBACK_MODE COUNT 1930. As noted in the definitions, the Playback Mode identifies the type of viewing activity, the position identifies the location within the content, and the count identifies the number of devices viewing that second of content in that mode.

The Program Airing based examples (Program 1 Airing 1 and Program 1 Airing 2) illustrate how the computer would aggregate DVR viewing across multiple homes and/or devices to produce the aggregated second-by-second DVR viewing activity for a program airing for each playback mode.

The Program 1 Airing 1 and 2, Combined example illustrates how the computer will aggregate viewing activity across program airings to produce a total DVR viewing for the program for each playback mode.

This output file has value on its own, or it can be loaded to a data store for additional downstream analytics.

FIGS. 7A-7B Illustrate example record layouts for an Aggregated VOD Viewing Activity (VOD) File 240 record, which is output from the MapReduce Aggregation Engine 200, and corresponding Data structure according to one embodiment. This file is ready for input to downstream analytics processes.

There is Summary Information followed by the Data Structure including field definitions, as shown in FIG. 7B. After the Data Structure there is a set of Sample Data, as shown for example in FIG. 7C.

Discussion of FIG. 7C Sample Data

The FIG. 7C Sample Data is organized to follow the pattern of the FIG. 4C-4G Sample Data. The reader will note the sample data is organized to show VOD Program 1 (all qualifying VOD leases) which illustrates how the computer would aggregate VOD viewing for a program across multiple homes and/or devices to produce the aggregated second-by-second viewing activity for a program for each playback mode.

This output file has value on its own, or it can be loaded to a data store for additional downstream analytics.

FIGS. 8A-8B Illustrate example record layouts for an Aggregated Video Program Viewing File 250 record, which is output from the MapReduce Aggregation Engine 200, and corresponding Data structure according to one embodiment. This file is ready for input to downstream analytics processes.

There is Summary Information followed by the Data Structure including field definitions, as shown in FIG. 8B. After the Data Structure there is a set of Sample Data, as shown for example in FIG. 8C.

Discussion of FIG. 8C Sample Data

The FIG. 8C Sample Data is organized to follow the pattern of the FIG. 4C-4G Sample Data. The reader will note the sample data is organized to show LVA, DVR, and VOD Program 1 Combined which illustrates how the computer would aggregate LVA, DVR, and VOD viewing for a program across multiple homes and/or devices to produce the aggregated second-by-second viewing activity for a program for each playback mode.

This output file has value on its own, or it can be loaded to a data store for additional downstream analytics.

Alternative Embodiments

Although the description above contains much specificity, this should not be construed as limiting the scope of the embodiments but as merely providing illustrations of some of several embodiments. As a nonlimiting example, additional qualifiers may be added along with those provided. Additional aggregations can be done using other combinations of these identifiers.

Scope of Viewer Interaction Data Loaded

I presently contemplate that the MapReduce Aggregation Engine 200 will process viewer interaction data for whatever set of viewing activity is provided to it. This may be one Video Program at a time, one hour of the day, a primetime television viewing period, an entire 24 hour day of viewing, a week of viewing, a weekly program schedule time slot, or another time period decided by the analyst. Another embodiment may simply process viewing activity within the context of a single program, or a single advertisement, or some other combination.

Use of Hadoop and MapReduce

I presently contemplate that the MapReduce Aggregation Engine 200 will take advantage of Hadoop MapReduce technology. Another embodiment may load the Video Program Viewing Detail records to a relational database and run various SQL queries to produce results similar to those shown.

Data Explosion Process

I presently contemplate that the Data Explosion Process 140 will generate one record for each second of viewing activity with the field Count_of_1 1390 having a value of 1. This method provides flexibility in terms of possible data aggregation, but it does consume more resources to process all the records. In another embodiment logic could be added to the Data Explosion Process 140 so that various records end up with a count of 2 or 3 or some higher number reflecting that multiple devices were viewing that content. The outcome is that fewer records would be sent into the MapReduce Aggregation Engine 200 thus reducing the load on the system.

Identifiers for Data

I presently contemplate using a combination of numeric and mnemonics for the various fields such as program info, program airing info, channel info, house info, device info, viewer info, geographic info, demographic info, viewing type, video server identifiers, system health info, and other similar fields, but another embodiment could use only numeric values as identifiers with links to reference tables for the descriptions of the numeric identifiers or only mnemonic identifiers.

Data Explosion Process

I presently contemplate that the Data Explosion Process 140 will generate one record for each second of the tuning activity. Another embodiment may generate one record for each video frame of viewing activity. In this case, the playback begin position and playback end position would be replaced by a frame number for each of these fields.

Yet another embodiment may generate records at a one minute level with the count being the number of seconds tuned to the content during that minute (in this case there would be 1,440 possible one minute intervals during a 24 hour day).

Yet another embodiment may generate records at a 10-second level with the count being the number of seconds tuned to the content during that 10-second interval (in this case there would be 8,640 possible 10-second intervals during a 24 hour day).

Programming Algorithm Scope

I presently contemplate executing the algorithms described herein separately in some sequence, but another embodiment could combine multiple simple algorithms into fewer complex algorithms.

Receiving Date and Time Information

I presently contemplate receiving all of the date and time values in local time, but another embodiment may provide these in Coordinated Universal Time (UTC time).

General Information

I presently contemplate using variables having the data types and field sizes shown, but another embodiment may use variables with different data types and field sizes to accomplish a similar result.

I presently contemplate tracking viewing activity at the granularity of one second, but another embodiment may track viewing activity at a finer granularity, perhaps half-second, or tenth-second, or millisecond. Yet another embodiment may receive data at a granularity finer than one second and round to the nearest second for use by the MapReduce Aggregation Engine 200.

I presently contemplate using record layouts similar to those defined herein, but another embodiment may use a different record layout or record layouts to accomplish a similar result. As a nonlimiting example, another embodiment may use database tables or other objects instead of record layouts similar to those I have defined herein to accomplish a similar result while still working within the spirit and scope of this disclosure.

Implementation Information

I presently contemplate using the generic Apache Hadoop distribution, but another embodiment may use a different Hadoop distribution.

I presently contemplate using Linux operating system, but another embodiment may use a different operating system.

I presently contemplate using the Pig along with the Pig Latin dataflow language, but another embodiment may use Java or Python or some other language alone or in combination with Pig Latin.

GENERAL REMARKS

It will be apparent to those of ordinary skill in the art that various changes and modifications may be made which clearly fall within the scope of the embodiments revealed herein. In describing an embodiment illustrated in the drawings, specific terminology has been used for the sake of clarity. However, the embodiments are not intended to be limited to the specific terms so selected, and it is to be understood that each specific term includes all technical equivalents which operate in a similar manner to accomplish a similar purpose.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present embodiment. For example, the embodiments described hereinabove may be implemented in computer software using any suitable computer software language type such as, for example, Python or JAVA using, for example, conventional or object-oriented techniques. Such software may be stored on any type of suitable computer-readable medium or media such as, for example, a magnetic or optical storage medium. Thus, the operation and behavior of the embodiments are described in Pig Latin dataflow language purely as a matter of convenience. It is clearly understood that artisans of ordinary skill would be able to design software and control hardware to implement the embodiments presented in the language of their choice based on the description herein with only a reasonable effort and without undue experimentation.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, a compact disk, an optical disk, magnetic tape, or magnetic disk. Furthermore, some of the processes may be programmed when the computer system is manufactured or via a computer-readable medium.

It can also be appreciated that certain process aspects disclosed herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, memory sticks, and hard disk drives. A computer-readable medium may also include memory storage that may be physical, virtual, permanent, temporary, semi-permanent and/or semi-temporary.

In various embodiments disclosed herein, a single component or algorithm may be replaced by multiple components or algorithms, and multiple components or algorithms may be replaced by a single component or algorithm, to perform a given function or functions. Except where such substitution would not be operative to implement the embodiments disclosed herein, such substitution is within the scope presented herein. Thus any element expressed herein as a means or a method for performing a specified function is intended to encompass any way of performing that function including, for example, a combination of elements that performs that function. Therefore, any means or method that can provide such functionalities may be considered equivalents to the means or methods shown herein.

It can be appreciated that the "data analysis computer system" may be, for example, any computer system capable of running MapReduce, whether it be a one node system or a system with thousands of nodes. In an alternative embodiment, it may be a relational database server.

While various embodiments have been described herein, it should be apparent, however, that various modifications, alterations and adaptations to those embodiments may occur to persons skilled in the art with the attainment of some or all of the advantages described herein. The disclosed embodiments are therefore intended to include all such modifications, alterations and adaptations without departing from the scope and spirit of the embodiments presented herein as set forth in the appended claims.

Accordingly, the scope should be determined not by the embodiments illustrated, but by the appended claims and their legal equivalents.

CONCLUSIONS, RAMIFICATIONS, AND SCOPE

In my previous Applications, I have identified numerous Conclusions, Ramifications, and Scope items. Many of those are similar for this application. The Conclusions, Ramifications, and Scope items from my U.S. Pat. No. 8,365,212 B1 issued on Jan. 29, 2013, and my U.S. Pat. No. 8,365,213 B1 issued on Jan. 29, 2013, and my U.S. application Ser. No. 13/360,704 filed on Jan. 28, 2012, and my U.S. application Ser. No. 13/567,073 filed on Aug. 5, 2012 and my U.S. application Ser. No. 13/740,199 filed on Jan. 13, 2013 are included herein by reference but not admitted to be prior art.

In this discussion below, I will focus on new ramifications introduced by this application.

From the description above, a number of advantages of some embodiments of my MapReduce Aggregation Engine 200 and its supporting processes become evident:

In this specification I have taught how to measure or analyze video program viewing activity at a second-by-second level using the Hadoop MapReduce framework. This teaching allows measurement of linear program viewing, DVR viewing, and VOD viewing with the ability to understand how the viewer uses "trick plays" when viewing this content. This insight gained from this can be valuable to advertisers, content producers, and content providers. As a non-limiting example, this provides detailed measurements into the amount of fast forward activity that occurs during commercials. Additionally, by teaching how to include numerous identifiers and then aggregate the detailed viewing activity to various combinations of those identifiers, an analyst will now be able to slice-and-dice the data in numerous ways to understand how different content is consumed by various people in various geographic locations.

Once the metrics are calculated, the resulting files can be loaded to a database for longitudinal analysis. As a nonlimiting example, the program level metrics can be tracked to identify week-to-week activity such as, for example, total seconds viewed in Play mode. Then the more detailed metrics can provide additional insight into the causes behind the overall trends.

The ability to produce these metrics using the Hadoop MapReduce framework provides a new tool for data analysts to use in understanding viewing behavior.

This method of using the Hadoop MapReduce framework to calculate second-by-second viewing activity for program based viewing such as linear, DVR, and VOD by aggregating individual viewing records that were created by exploding the viewing period into individual records where each record represents one second of viewing activity is contrary to the teaching of those who work with start time and duration (seconds viewed). Thus I am able to solve problems previously found insolvable when limited to using the existing techniques. I am able to provide metrics that could not be produced using existing techniques.

Additionally, I have shown how this teaching is application to online education for use in analyzing video viewing in that context.

Subsequent Usage of the Metrics

The metrics produced by the MapReduce Aggregation Engine 200 readily lend themselves to dimensional analysis using contemporary data warehouse methods. I have reviewed this extensively in my prior applications.

The metrics produced by the MapReduce Aggregation Engine 200 can be loaded to a data warehouse to support additional longitudinal analysis beyond what is done by the Engine 200. Thus we can readily envision a myriad of uses for the metrics produced by the MapReduce Aggregation Engine 200.

Numerous additional metrics can readily be identified by those skilled in the art. Additionally, numerous additional uses for the metrics identified herein will be readily evident to those skilled in the art.

SUMMARY

In accordance with one embodiment, I have disclosed a computer-implemented method of using video program viewing activity data as input to an aggregation engine built on the Hadoop MapReduce framework which calculates second-by-second video viewing activity for Linear, DVR, and VOD program level viewing including measuring trick play activity with results aggregated to the analyst's choice of program, program airing, channel, house attributes, device attributes, geographic area, demographic attributes, viewing date, or any combination of these fields, for each second of program content represented in the video program viewing data. The source data may be extracted from a database defined according to the Cable Television Laboratories, Inc. Media Measurement Data Model defined in "Audience Data Measurement Specification" as "Open-Cable™ Specifications, Audience Measurement, Audience Measurement Data Specification" document OC-SP-AMD-I01-130502 or any similar format. These metrics provide detailed data needed to calculate information on customer viewing behavior that can drive business decisions for service providers, advertisers, and content producers. The ability to use the Hadoop MapReduce framework to aggregate this data will meet pressing needs for detailed audience viewership information that is not presently available and thus the metrics will be of great value to the industry.

I claim:

1. A method comprising:
creating, by a computing system, a data structure comprising data records representing discrete time periods associated with video-viewing activity;
receiving, by the computing system and from a plurality of video-asset-viewing devices distributed among a plurality of geographic regions, video-viewing-activity data associated with outputting, via a plurality of video-viewing types, a video asset;
based on the video-viewing-activity data, assigning by the computing system, to one or more data records of the data structure, values indicating at least one of a video-viewing mode or a video-viewing type of the plurality of video-viewing types;
determining, by the computing system, a fixed reference point in the video asset for each of the plurality of video-viewing types;
using the data structure to determine, by the computing system and based on the video-viewing-activity data and for each video-asset-viewing device of the plurality of video-asset-viewing devices, a time range during which the video-asset-viewing device outputted the video asset, wherein the time range is further determined, for each of the plurality of video-viewing types, based on the fixed reference point in the video asset;

for each video-asset-viewing device of the plurality of video-asset-viewing devices:

determining, by the computing system and based on the fixed reference point, a plurality of time intervals of the time range determined for the video-asset-viewing device;

using the data structure to determine, by the computing system and for each time interval of the plurality of time intervals determined for the video-asset-viewing device, a video-viewing mode via which the video-asset-viewing device outputted the video asset during the time interval;

using the data structure to determine, by the computing system and for each time interval of the plurality of time intervals determined for the video-asset-viewing device, a video-viewing type of the plurality of video-viewing types via which the video-asset-viewing device outputted the video asset during the time interval; and using the data structure to determine, by the computing system and based on the video-viewing type and the video-viewing mode determined for each of the plurality of time intervals determined for the video-asset-viewing device, a subset plurality of time intervals associated with a first video-viewing type and a first video-viewing mode;

determining, by the computing system and based on data records, of the data structure, associated with the subset plurality of time intervals determined for each video-asset-viewing device of the plurality of video-asset-viewing devices, a video-viewing-activity metric indicating a quantity of video-asset-viewing devices that outputted, during one or more intervals of a plurality of intervals of the video asset, the video asset using the first video-viewing type and the first video-viewing mode; and outputting, by the computing system and to a monitoring system, an output file comprising the determined video-viewing-activity metric.

2. The method of claim 1, wherein using the data structure to determine the video-viewing type comprises determining whether the video asset was outputted from a linear source, from a digital video recorder (DVR) source proximate to the video-asset-viewing device, or from a video on demand (VOD) source remote from the video-asset-viewing device.

3. The method of claim 1, further comprising:

grouping, by the computing system, the subset plurality of time intervals determined for each video-asset-viewing device of the plurality of video-asset-viewing devices with a group of time intervals; and determining, by the computing system, that each time interval in a portion of the group corresponds to the one or more intervals of the plurality of intervals of the video asset, wherein determining the video-viewing-activity metric is based on the portion.

4. The method of claim 3, wherein determining the video-viewing-activity metric comprises determining a quantity of time intervals in the portion.

5. The method of claim 4, further comprising:

based on determining whether the video-viewing mode determined for each time interval of the plurality of time intervals determined for each video-asset-viewing device of the plurality of video-asset-viewing devices corresponds to the first video-viewing mode, filtering, by the computing system, the plurality of time intervals determined for each video-asset-viewing device of the plurality of video-asset-viewing devices;

determining, by the computing system and based on data records, of the data structure, associated with the filtered plurality of time intervals determined for each video-asset-viewing device of the plurality of video-asset-viewing devices, a second video-viewing-activity metric; and determining a ratio of the video-viewing-activity metric to the second video-viewing-activity metric.

6. The method of claim 1, wherein using the data structure to determine the video-viewing mode comprises determining, for each time interval of the plurality of time intervals determined for the video-asset-viewing device, one of a playback mode, a fast-forward mode, or a rewind mode.

7. The method of claim 1, further comprising:

determining, by the computing system, each time interval of the plurality of time intervals determined for a first video-asset-viewing device of the plurality of video-asset-viewing devices is associated with the first video-viewing mode; and determining, by the computing system, each time interval of the plurality of time intervals determined for a second video-asset-viewing device of the plurality of video-asset-viewing devices is associated with a second video-viewing mode different from the first video-viewing mode.

8. The method of claim 1, further comprising:

using the data structure to determine, by the computing system and based on the plurality of time intervals determined for each video-asset-viewing device of the plurality of video-asset-viewing devices, a quantity of video-asset-viewing devices that outputted, during the one or more intervals of the plurality of intervals of the video asset, the video asset using the first video-viewing type and a second video-viewing mode.

9. The method of claim 1, wherein the computing system comprises a plurality of computing devices remotely located from the plurality of video-asset-viewing devices, and wherein determining the plurality of time intervals comprises determining, by a first computing device of the plurality of computing devices, at least a first portion of the plurality of time intervals determined for a first video-asset-viewing device of the plurality of video-asset-viewing devices, and determining, by a second computing device of the plurality of computing devices, at least a second portion of the plurality of time intervals determined for the first video-asset-viewing device.

10. The method of claim 1, wherein:

each time interval of the plurality of time intervals determined for a first video-asset-viewing device of the plurality of video-asset-viewing devices is associated with the first video-viewing type; and each time interval of the plurality of time intervals determined for a second video-asset-viewing device of the plurality of video-asset-viewing devices is associated with a second video-viewing type different from the first video-viewing type.

11. The method of claim 1, wherein:

the time range determined for a first video-asset-viewing device of the plurality of video-asset-viewing devices is associated with a first airing of the video asset; and the time range determined for a second video-asset-viewing device of the plurality of video-asset-viewing devices is associated with a second airing of the video asset.

12. The method of claim 1, wherein each time interval of the plurality of time intervals determined for each video-asset-viewing device of the plurality of video-asset-viewing devices is associated with a same time duration, and wherein two or more time intervals of the plurality of time intervals determined for each video-asset-viewing device of the plurality of video-asset-viewing devices are associated with a continuous period of time.

13. The method of claim 1, wherein the video-viewing type comprises at least one of linear viewing, digital video recorder (DVR) viewing, or video on demand (VOD) viewing.

14. The method of claim 1, wherein a video-viewing type, of the plurality of video-viewing types, comprises digital video recorder viewing, and wherein the fixed reference point comprises a starting point of the video asset.

15. The method of claim 1, wherein a video-viewing type, of the plurality of video-viewing types, comprises linear viewing, and wherein a starting point of the viewing is different from the fixed reference point.

16. An apparatus comprising:
one or more processors; and
memory storing instructions that, when executed by the one or more processors, cause the apparatus to:
create a data structure comprising data records representing discrete time periods associated with video-viewing activity;
receive, from a plurality of video-asset-viewing devices distributed among a plurality of geographic regions, video-viewing-activity data associated with outputting, via a plurality of video-viewing types, a video asset;
based on the video-viewing-activity data, assign, to one or more data records of the data structure, values indicating at least one of a video-viewing mode or a video-viewing type of the plurality of video-viewing types;
determine a fixed reference point in the video asset for each of the plurality of video-viewing types;
use the data structure to determine, based on the video-viewing-activity data and for each video-asset-viewing device of the plurality of video-asset-viewing devices, a time range during which the video-asset-viewing device outputted the video asset, wherein the time range is further determined, for each of the plurality of video-viewing types, based on the fixed reference point in the video asset;
for each video-asset-viewing device of the plurality of video-asset-viewing devices:
determine, based on the fixed reference point, a plurality of time intervals of the time range determined for the video-asset-viewing device;
use the data structure to determine, for each time interval of the plurality of time intervals determined for the video-asset-viewing device, a video-viewing mode via which the video-asset-viewing device outputted the video asset during the time interval;
use the data structure to determine, for each time interval of the plurality of time intervals determined for the video-asset-viewing device, a video-viewing type of the plurality of video-viewing types via which the video-asset-viewing device outputted the video asset during the time interval; and
use the data structure to determine, based on the video-viewing type and the video-viewing mode determined for each of the plurality of time intervals determined for the video-asset-viewing device, a subset plurality of time intervals associated with a first video-viewing type and a first video-viewing mode;
determine, based on data records, of the data structure, associated with the subset plurality of time intervals determined for each video-asset-viewing device of the plurality of video-asset-viewing devices, a video-viewing-activity metric indicating a quantity of video-asset-viewing devices that outputted, during one or more intervals of a plurality of intervals of the video asset, the video asset using the first video-viewing type and the first video-viewing mode; and
output, to a monitoring system, an output file comprising the determined video-viewing-activity metric.

17. The apparatus of claim 16, wherein the instructions, when executed by the one or more processors, cause the apparatus to use the data structure to determine the video-viewing type by determining whether the video asset was outputted from a linear source, from a digital video recorder (DVR) source proximate to the video-asset-viewing device, or from a video on demand (VOD) source remote from the video-asset-viewing device.

18. The apparatus of claim 16, wherein the instructions, when executed by the one or more processors, cause the apparatus to use the data structure to determine the video-viewing mode by determining, for each time interval of the plurality of time intervals determined for the video-asset-viewing device, one of a playback mode, a fast-forward mode, or a rewind mode.

19. The apparatus of claim 16, wherein the instructions, when executed by the one or more processors, further cause the apparatus to:
use the data structure to determine, based on the plurality of time intervals determined for each video-asset-viewing device of the plurality of video-asset-viewing devices, a quantity of video-asset-viewing devices that outputted, during the one or more intervals of the plurality of intervals of the video asset, the video asset using the first video-viewing type and a second video-viewing mode.

20. A system comprising:
a computing device comprising:
one or more first processors; and
first memory storing first instructions that, when executed by the one or more first processors, cause the computing device to:
create a data structure comprising data records representing discrete time periods associated with video-viewing activity;
receive, from a plurality of video-asset-viewing devices distributed among a plurality of geographic regions, video-viewing-activity data associated with outputting, via a plurality of video-viewing types, a video asset;
based on the video-viewing-activity data, assign, to one or more data records of the data structure, values indicating at least one of a video-viewing mode or a video-viewing type of the plurality of video-viewing types;
determine a fixed reference point in the video asset for each of the plurality of video-viewing types;
using the data structure to determine, based on the video-viewing-activity data and for each video-asset-viewing device of the plurality of video-asset-viewing devices, a time range during which the video-asset-viewing device outputted the video asset, wherein the time range is further determined, for each of the plurality of video-viewing types, based on the fixed reference point in the video asset;

for each video-asset-viewing device of the plurality of video-asset-viewing devices:
  determine, based on the fixed reference point, a plurality of time intervals of the time range determined for the video-asset-viewing device;
  use the data structure to determine, for each time interval of the plurality of time intervals determined for the video-asset-viewing device, a video-viewing mode via which the video-asset-viewing device outputted the video asset during the time interval;
  use the data structure to determine, for each time interval of the plurality of time intervals determined for the video-asset-viewing device, a video-viewing type of the plurality of video-viewing types via which the video-asset-viewing device outputted the video asset during the time interval; and
  use the data structure to determine, based on the video-viewing type and the video-viewing mode determined for each of the plurality of time intervals determined for the video-asset-viewing device, a subset plurality of time intervals associated with a first video-viewing type and a first video-viewing mode;
determine, based on data records, of the data structure, associated with the subset plurality of time intervals determined for each video-asset-viewing device of the plurality of video-asset-viewing devices, a video-viewing-activity metric indicating a quantity of video-asset-viewing devices that outputted, during one or more intervals of a plurality of intervals of the video asset, the video asset using the first video-viewing type and the first video-viewing mode; and
output, to a monitoring system, an output file comprising the determined video-viewing-activity metric; and a second video-asset-viewing device comprising:
  one or more second processors; and
  second memory storing second instructions that, when executed by the one or more second processors, cause the second video-asset-viewing device to send at least a portion of the video-viewing-activity data.

21. The system of claim 20, wherein the first instructions, when executed by the one or more first processors, cause the computing device to use the data structure to determine the video-viewing type by determining whether the video asset was outputted from a linear source, from a digital video recorder (DVR) source proximate to the video-asset-viewing device, or from a video on demand (VOD) source remote from the video-asset-viewing device.

22. The system of claim 20, wherein the first instructions, when executed by the one or more first processors, cause the computing device to use the data structure to determine the video-viewing mode by determining, for each time interval of the plurality of time intervals determined for the video-asset-viewing device, one of a playback mode, a fast-forward mode, or a rewind mode.

* * * * *